US012640277B2

(12) United States Patent
Abbott et al.

(10) Patent No.: US 12,640,277 B2
(45) Date of Patent: May 26, 2026

(54) REACTOR SYSTEMS HAVING AN EXTERNAL FUEL SALT LOOP

(71) Applicant: TerraPower, LLc, Bellevue, WA (US)

(72) Inventors: Ryan Abbott, Woodinville, WA (US); Darryl Appelgate, Woodinville, WA (US); Haley Barsa, Issaquah, WA (US); Michael T. Blatnik, Seattle, WA (US); Karl Britsch, Mukilteo, WA (US); Anselmo T. Cisneros, Jr., Seattle, WA (US); Brian C. Kelleher, Edmonds, WA (US); Samuel S. Goodrich, Richland, WA (US); Ramesh Rajasekaran, Bellevue, WA (US); Daniel J. Walter, North Bend, WA (US); Kent E. Wardle, Renton, WA (US); Matthew D. Wargon, Seattle, WA (US)

(73) Assignee: TerraPower, LLC, Bellevue, WA (US)

( * ) Notice: Subject to any disclaimer, the term of this patent is extended or adjusted under 35 U.S.C. 154(b) by 621 days.

(21) Appl. No.: 18/045,398

(22) Filed: Oct. 10, 2022

(65) Prior Publication Data

US 2023/0127207 A1 Apr. 27, 2023

Related U.S. Application Data

(63) Continuation-in-part of application No. 17/388,824, filed on Jul. 29, 2021, now abandoned, which is a (Continued)

(51) Int. Cl.

*G21C 11/06* (2006.01)
*G21C 13/024* (2006.01)

(Continued)

(52) U.S. Cl.

CPC ............ *G21C 11/06* (2013.01); *G21C 13/024* (2013.01); *G21C 1/03* (2013.01); *G21C 3/54* (2013.01); *G21C 13/02* (2013.01); *G21C 15/247* (2013.01)

(58) Field of Classification Search

CPC ...... G21C 13/02; G21C 11/06; G21C 13/024; G21C 1/03; G21C 3/54; G21C 15/247; G21D 1/04

(Continued)

(56) References Cited

U.S. PATENT DOCUMENTS 2,375,009 A 5/1945 Lepsoe et al.
2,874,106 A 2/1959 Hammond et al.

(Continued)

FOREIGN PATENT DOCUMENTS

CA 631890 A 11/1961
CN 1150310 A 5/1997

(Continued)

OTHER PUBLICATIONS

Abbott et al, Thermal and Mechanical Design Aspects of the LIFE Engine, Fusion Science and Technology Dec. 2008; 56(2).

(Continued)

*Primary Examiner* — Jack W Keith
*Assistant Examiner* — Daniel Wasil
(74) *Attorney, Agent, or Firm* — Merchant and Gould, PC

(57) ABSTRACT

Disclosed herein is a nuclear reactor system comprising a vessel encompassing a reactor core. An external loop line is connected to top and bottom portions of the vessel. A pump can circulate molten fuel through the reactor core and the external loop line. An external neutron reflector encompasses the vessel. External heaters heat the loop line and the reflector. The loop line, the reactor, or both, may be covered with insulation.

17 Claims, 61 Drawing Sheets

Related U.S. Application Data continuation-in-part of application No. 17/132,168, filed on Dec. 23, 2020, now abandoned.

(60) Provisional application No. 63/075,655, filed on Sep. 8, 2020, provisional application No. 62/953,065, filed on Dec. 23, 2019.

(51) Int. Cl.
*G21C 1/03* (2006.01)
*G21C 3/54* (2006.01)
*G21C 13/02* (2006.01)
*G21C 15/247* (2006.01)

(58) Field of Classification Search
USPC ........................................ 376/402, 458, 216
See application file for complete search history.

(56) References Cited

U.S. PATENT DOCUMENTS 2,920,024 A 1/1960 Barton et al.
2,945,794 A 7/1960 Winters et al.
3,010,889 A 11/1961 Fortescue et al.
3,018,239 A 1/1962 Happell et al.
3,029,130 A 4/1962 Moore
3,046,212 A 7/1962 Anderson
3,136,700 A 6/1964 Poppendiek et al.
3,178,356 A 4/1965 Wheelock
3,216,901 A 11/1965 Teitel
3,218,160 A 11/1965 Knighton et al.
3,259,766 A * 7/1966 Beckjord ................. G21D 7/04 376/321
3,262,856 A 7/1966 Bettis
3,275,422 A 9/1966 Cathers et al.
3,287,225 A 11/1966 Ackroyd et al.
3,368,945 A 2/1968 Keller et al.
3,383,285 A 5/1968 Ackroyd et al.
3,450,198 A 6/1969 Brunner
3,743,577 A 7/1973 Bettis et al.
3,785,924 A 1/1974 Notari
3,909,351 A 9/1975 Tilliette
3,996,099 A 12/1976 Faugeras et al.
3,997,413 A 12/1976 Fougner
4,039,377 A 8/1977 Andrieu et al.
4,045,286 A 8/1977 Blum et al.
4,056,435 A 11/1977 Carlier et al.
4,216,821 A 8/1980 Robin
4,284,473 A 8/1981 Kasama
4,309,252 A 1/1982 Gilroy
4,342,721 A 8/1982 Pomie
4,397,778 A 8/1983 Lloyd
4,511,532 A * 4/1985 Pierart ................. G21C 13/024 376/461
4,639,350 A 1/1987 Malaval
4,762,667 A 8/1988 Sharbaugh
4,786,464 A 11/1988 Bardot
4,820,476 A 4/1989 Popalis
5,185,120 A 2/1993 Fennern
5,196,159 A 3/1993 Kawashima et al.
5,223,210 A 6/1993 Hunsbedt et al.
5,380,406 A 1/1995 Horton et al.
5,421,855 A 6/1995 Hayden et al.
5,596,611 A 1/1997 Ball
5,730,874 A 3/1998 Wai et al.
5,770,085 A 6/1998 Wai et al.
5,792,357 A 8/1998 Wai et al.
5,910,971 A 6/1999 Ponomarev-Stepnoy et al.
6,181,759 B1 1/2001 Heibel
7,217,402 B1 5/2007 Miller et al.
8,132,410 B2 3/2012 Oh et al.
8,416,908 B2 4/2013 Mann
8,529,713 B2 9/2013 Ahlfeld et al.
8,594,268 B2 11/2013 Shu
8,734,738 B1 5/2014 Herrmann
9,171,646 B2 10/2015 Moses et al.
9,721,678 B2 8/2017 Cheatham et al.
10,043,594 B2 8/2018 Scott
10,141,079 B2 11/2018 Czerwinski et al.
10,438,705 B2 10/2019 Cheatham
10,497,479 B2 12/2019 Abbott et al.
10,734,122 B2 8/2020 Cisneros et al.
10,867,710 B2 12/2020 Cisneros et al.
10,878,969 B2 12/2020 Huke et al.
11,367,536 B2 6/2022 Abbott et al.
2004/0114703 A1 6/2004 Bolton et al.
2005/0220251 A1 10/2005 Yokoyama et al.
2008/0232533 A1 9/2008 Blanovsky
2008/0273650 A1 11/2008 Yokoyama et al.
2008/0310575 A1 12/2008 Cinotti
2009/0207963 A1* 8/2009 Van Uitert ............. G21C 11/08 376/402
2009/0225926 A1* 9/2009 Carelli ................. G21C 15/182 376/290
2009/0279658 A1 11/2009 LeBlanc
2010/0226471 A1 9/2010 Cinotti
2011/0131991 A1 6/2011 Kamei et al.
2011/0222642 A1 9/2011 Gautier
2011/0286563 A1 11/2011 Moses et al.
2011/0286565 A1 11/2011 Tsang
2011/0305309 A1 12/2011 Brown
2012/0027156 A1 2/2012 Peterson
2012/0051481 A1 3/2012 Shu
2012/0056125 A1 3/2012 Raade et al.
2012/0069946 A1 3/2012 Hamill et al.
2012/0183112 A1 7/2012 Leblanc
2012/0275558 A1 11/2012 Cinotti
2012/0288048 A1 11/2012 Mann
2012/0314829 A1 12/2012 Greene
2013/0083878 A1 4/2013 Massie et al.
2013/0177126 A1* 7/2013 Runkle .................... G21G 1/02 376/342
2013/0180520 A1 7/2013 Raade et al.
2013/0272470 A1 10/2013 Whitten et al.
2014/0023172 A1 1/2014 Leblanc
2014/0166924 A1 6/2014 Raade et al.
2014/0348287 A1 11/2014 Huke
2015/0010875 A1 1/2015 Raade et al.
2015/0036779 A1 2/2015 LeBlanc
2015/0078504 A1 3/2015 Woolley
2015/0117589 A1 4/2015 Kamei
2015/0170766 A1 6/2015 Singh et al.
2015/0228363 A1 8/2015 Dewan et al.
2015/0243376 A1 8/2015 Wilson
2015/0310943 A1 10/2015 Kielb et al.
2015/0357056 A1 12/2015 Shayer
2016/0005497 A1 1/2016 Scott
2016/0189806 A1 6/2016 Cheatham, III et al.
2016/0189812 A1 6/2016 Czerwinski et al.
2016/0189813 A1 6/2016 Cisneros et al.
2016/0189816 A1 6/2016 Czerwinski et al.
2016/0196885 A1 7/2016 Singh
2016/0217874 A1 7/2016 Dewan et al.
2016/0232995 A1* 8/2016 Heibel ................... G21C 11/06
2016/0260505 A1 9/2016 Cadell et al.
2016/0260509 A1 9/2016 Kim et al.
2016/0300628 A1 10/2016 Fortino et al.
2017/0084355 A1 3/2017 Scott
2017/0092381 A1 3/2017 Cisneros et al.
2017/0117065 A1 4/2017 Scott
2017/0213610 A1 7/2017 Sumita et al.
2017/0216840 A1 8/2017 Branch et al.
2017/0301413 A1 10/2017 Cisneros et al.
2017/0301418 A1 10/2017 Dodson et al.
2017/0301421 A1 10/2017 Abbott et al.
2017/0316840 A1 11/2017 Abbott et al.
2017/0316841 A1 11/2017 Abbott et al.
2018/0019025 A1 1/2018 Abbott et al.
2018/0047467 A1 2/2018 Czerwinski et al.
2018/0068750 A1 3/2018 Cisneros et al.
2018/0075931 A1* 3/2018 Arafat .................. G21C 15/257
2018/0137944 A1 5/2018 Abbott et al.
2018/0277260 A1 9/2018 Marcille et al.
2019/0139665 A1 5/2019 Czerwinski et al.

(56) References Cited

U.S. PATENT DOCUMENTS

| | | | | |
|---|---|---|---|---|
| 2019/0172594 | A1 | 6/2019 | Lyons et al. | |
| 2019/0237205 | A1 | 8/2019 | Abbott et al. | |
| 2019/0311816 | A1 | 10/2019 | Sumita et al. | |
| 2020/0027590 | A1 | 1/2020 | Cisneros et al. | |
| 2020/0118698 | A1 | 4/2020 | Cheatham et al. | |
| 2020/0122109 | A1 | 4/2020 | Kruizenga et al. | |
| 2020/0185114 | A1 | 6/2020 | Abbott et al. | |
| 2020/0211724 | A1 | 7/2020 | Cisneros et al. | |
| 2020/0357531 | A1 | 11/2020 | Inman et al. | |
| 2021/0202117 | A1 | 7/2021 | Nelson | |
| 2022/0076854 | A1 * | 3/2022 | Ougouag | G21C 15/12 |
| 2023/0298773 | A1 * | 9/2023 | Kim | G21C 11/06 |

FOREIGN PATENT DOCUMENTS

| | | | | | |
|---|---|---|---|---|---|
| CN | 1922695 | B | | 2/2007 | |
| CN | 101606204 | A | | 12/2009 | |
| CN | 101939793 | B | | 1/2011 | |
| CN | 104145309 | A | | 11/2014 | |
| CN | 105684090 | A | | 6/2016 | |
| CN | 207489486 | U | | 6/2018 | |
| CN | 108352200 | A | | 7/2018 | |
| CN | 107112055 | B | | 9/2020 | |
| DE | 1112791 | B | | 10/1963 | |
| DE | 1439107 | A1 | | 2/1969 | |
| EP | 0617430 | B1 | | 9/1994 | |
| EP | 3357068 | A0 | | 8/2018 | |
| FR | 2296248 | A1 | | 11/1977 | |
| FR | 2636769 | A1 | * | 3/1990 | G21C 13/024 |
| GB | 739968 | A | | 11/1955 | |
| GB | 835266 | A | | 5/1960 | |
| GB | 853051 | A | * | 11/1960 | G21C 11/06 |
| GB | 964841 | A | | 7/1964 | |
| GB | 2073938 | B | | 7/1984 | |
| GB | 2511113 | A | | 8/2014 | |
| GB | 2508537 | A | | 12/2014 | |
| GB | 2516046 | A | | 1/2015 | |
| JP | 35013995 | B | | 9/1960 | |
| JP | 571991 | A | | 1/1982 | |
| JP | 1991282397 | A | | 12/1991 | |
| JP | 06174882 | A | | 6/1994 | |
| JP | H06174883 | A | | 6/1994 | |
| JP | 11174194 | A | | 7/1999 | |
| JP | 2001133572 | A | | 5/2001 | |
| JP | 2003063801 | A | | 3/2003 | |
| JP | 2010223942 | A | | 10/2010 | |
| JP | 2012047531 | A | | 3/2012 | |
| JP | 2014119429 | A | | 12/2012 | |
| JP | 2014534413 | A | | 12/2014 | |
| JP | 2015510588 | A | | 4/2015 | |
| JP | 2017062158 | A | | 3/2017 | |
| RU | 57040 | U1 | | 9/2006 | |
| RU | 2424587 | C1 | | 7/2011 | |
| WO | 200003399 | A1 | | 1/2000 | |
| WO | 2009135286 | A1 | | 11/2009 | |
| WO | 2013085383 | A1 | | 6/2013 | |
| WO | 2013116942 | A1 | | 8/2013 | |
| WO | 2013180029 | A1 | | 12/2013 | |
| WO | 2014039641 | A2 | | 3/2014 | |
| WO | 2014074930 | A1 | | 5/2014 | |
| WO | 2014111950 | A2 | | 7/2014 | |
| WO | 2014128457 | A1 | | 8/2014 | |
| WO | 2014196338 | A1 | | 12/2014 | |
| WO | 2015140495 | A1 | | 9/2015 | |
| WO | 2016109565 | A2 | | 7/2016 | |
| WO | 2016197807 | A1 | | 12/2016 | |
| WO | 2018013317 | A1 | | 1/2018 | |
| WO | 2018026429 | A2 | | 2/2018 | |
| WO | 2021133952 | A2 | | 7/2021 | |

OTHER PUBLICATIONS

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

Andreades, Design Summary of the Mark-I Pebble-Bed, Fluoride Salt-Cooled, High-Temperature Reactor Commercial Power Plant, Nuclear Technology, vol. 195(3), 223-238, Sep. 2016.

Ashraf-Khorassani, Mehdi, Michael T. Combs, and Larry T. Taylor. "Solubility of metal chelates and their extraction from an aqueous environment via supercritical CO2." Talanta 44.5 (1997): 755-763.

ASTM International, Designation: B898-11, Standard Specification for Reactive and Refractory Metal Clad Plate (Sep. 2011), 15 pages.

Bertch, T.C., Selective Gaseous Extraction Research, Development and Training for Isotope Production, Final Technical Report for the Period Apr. 1, 2012 through Mar. 31, 2014, General Atomics, 27 pgs.

Borts, B., et al. "The study of supercritical extraction of complexes of molybdenum with carbon dioxide." 6 (6) (2016): 57-63.

Chapter 20, Creeping Flow, Physics of Continuous Matter, Exotic and Everyday Phenomena in the Macroscopic World, Lautrup, B., The Niels Bohr Institute, Copenhagen, Denmark, 2004.

Chou, Wei-Lung, et al., "Removal of gallium (iii) ions from acidic aqueous solution by supercritical carbon dioxide extraction in the green separation process." Journal of hazardous materials 160.1 (2008): 6-12.

Clarno, K.T. et al., "Trade studies for the liquid-salt-cooled very high-temperature reactor. fiscal year 2006 progress report", ORNL/TM-2006 140 (2007), 35 pgs.

Cohen et al., "Vanadium-Lined HT9 Cladding Tubes", Argonne National Lab ANL/ET/CP-80384, (Feb. 1994), 12 pgs.

Donnelly et al., Fabrication of Heat Exchanger Tube Bundle for the Molten-Salt Reactor Experiment, ORNL-3500, Dec. 9, 1963.

EESR EP15875826.8 European Extended Search Report in European Application EP15875826.8, mailed Sep. 6, 2018, 7 pages.

EP15876187.4 European Extended Search Report for EP 15876187.4 dated Sep. 11, 2018, 10 pages.

ESR20211581.2 European Extended Search Report in European Application EP 20 21 1581.2, mailed Mar. 24, 2021, 8 pages.

Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.

Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.

Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.

Freeman et al., "Archimedes Plasma Mass Filter," AIP Conf. Proc. 694, 403 (2003).

GEN IV International Forum, Molten Salt Reactor (MSR), https://www.gen-4.org/gif/jcms/c_9359/msr, accessed Feb. 26, 2016, 3 pgs.

Grimes, W. R., "Molten-Salt Reactor Chemistry," Nucl. Appl. Technol. vol 8, 137-155 (1970).

Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.

Holcomb, et al. Fast Spectrum Molten Salt Reactor Options, Jul. 2011, 46 pages. Available at: http://info.ornl.gov/sites/publications/files/Pub29596.pdf.

Hung, Laurence, et al. "Supercritical CO2 extraction of molybdenum-ligand complexes from sulfuric solutions." The Journal of Supercritical Fluids 111 (2016): 97-103.

Kimura-Neutron Spectrum in Small Iron Pile Surrounded by Lead Reflector, Journal of Nuclear Science and Technology, 15(3), pp. 183-191 (Mar. 1978).

(56) References Cited

OTHER PUBLICATIONS

Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Kuznetsov et al., Electrochemical Behavior and Some Thermodynamic Properties of UC1 [sub 4] and UC1 [sub 3] Dissolved in a LiC1-KC1 Eutectic Melt, Journal of the Electrochemical Society, vol. 152, No. 4, Jan. 2005, 11 pages.
Li, et al., "Affinity Extraction into CO2. 2. Extraction of Heavy Metals into C02 from Low-pH Aqueous Solutions", Ind. Eng. Chem. Res. 37:4763-4773 (1998).
Lin et al., "Supercritical fluid extraction and chromatography of metal chelates and organometallic compounds" trends in analytical chemistry 14(3):123-133 (1995).
Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.
Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).
Merle-Lucotte, E., Introduction to the Physics of the Molten Salt Fast Reactor, Thorium Energy Conference 2013 (ThEC13), 2013.
Molten Salt Reactor (MSR) Review: Feasibility Study of developing a pilot scale molten salt reactor in the UK, Jul. 2015, Energy Process Development, LTD (available at www.energyprocessdevelopments.com).
Mourogov et al., Potentialities of the fast spectrum molten salt reactor concept: REBUS-3700, Energy Conversion and Management, Mar. 30, 2006, vol. 47, No. 17, pp. 2761-2771.
MSR-FUJI General Information, Technical Features, and Operating Characteristics, 30 pages.
ORNL-2474 (Oak Ridge National Laboratory), Molten-Salt Reactor Program Quarterly Progress Report for Period Ending Jan. 31, 1958, H.G. MacPherson, Program Director, Date Issued May 1, 1958, pp. 41-44.
Ottewitte, E. H. , "Configuration of a Molten Chloride Fast Reactor on a Thorium Fuel Cycle to Current Nuclear Fuel Cycle Concerns," Ph.D. dissertation, University of California at Los Angeles, 1982, 410 pages.
Ottewitte, E. H., "Cursory First Look at the Molten Chloride Fast Reactor as an Alternative to the Conventional BATR Concept", Apr. 1992, 75 pages.
Patent Search Report, Eurasian Patent Office, Eurasian application No. 202193104, May 19, 2022, 2 pages.
PCT/US2015/000499 IPRP+WO—International Preliminary Report on Patentability and Written Opinion in International Application PCT/US2015/000499, mailed Jul. 4, 2017, 9 pages.
PCT/US2015/000499 ISR+WO—International Search Report and Written Opinion in International Application PCT/US2015/000499, mailed Jul. 22, 2016, 11 pages.
PCT/US2015/067704 IPRP+WO—International Preliminary Report on Patentability and Written Opinion mailed Jul. 4, 2017, 7 pages.
PCT/US2015/067704 ISR+WO—International Search Report and Written Opinion, Apr. 28, 2016, 9 pages.
PCT/US2015/067905 IPRP—International Preliminary Report on Patentability mailed Jul. 4, 2017, 14 pages.
PCT/US2015/067905 ISR+WO—International Search Report and Written Opinion in International Application PCT/US2015/067905 mailed Aug. 5, 2016, 18 pages.
PCT/US2015/067923 IPRP—International Preliminary Report on Patentability mailed Jul. 4, 2017, 7 pages.
PCT/US2015/067923 ISR+WO—International Search Report and Written Opinion in International Application PCT/US2015/067923, mailed Apr. 19, 2016, 14 pages.
PCT/US2016/055001 ISR and WO—International Preliminary Report on Patentability and Written Opinion mailed Jan. 25, 2017, 14 pages.
PCT/US2016/055001 PRP—International Preliminary Report on Patentability issued Mar. 4, 2018, 8 pages.
PCT/US2017/030455 IPRP—International Preliminary Report on Patentability mailed Nov. 6, 2018, 17 pages.
PCT/US2017/030455 ISR+WO—International Search Report and Written Opinion mailed Jan. 30, 2018, 23 pages.
PCT/US2017/030457 IPRP—International Preliminary Report on Patentability mailed Nov. 15, 2018, 15 pages.
PCT/US2017/030457 ISR+WO—International Search Report and Written Opinion in International Application PCT/US2017/030457, mailed Jan. 23, 2018, 20 pages.
PCT/US2017/030666 ISR + WO, date mailed Jul. 20, 2017, 11 pages.
PCT/US2017/030666 PCT International Preliminary Report on Patentability in International Application PCT/US2017/030666 date mailed Nov. 6, 2018, 9 pages.
PCT/US2017/030672 IPRP+WO—International Preliminary Report on Patentability and Written Opinion mailed Nov. 6, 2018, 7 pages.
PCT/US2017/030672 ISR+WO—International Search Report and Written Opinion in International Application No. PCT/US2017/030672, mailed Sep. 27, 2017, 9 pages.
PCT/US2017/038806 IPRP+WO—International Preliminary Report on Patentability and Written Opinion in International Application PCT/US2017/038806, mailed Jan. 15, 2019, 7 pages.
PCT/US2017/038806 ISR+WO—International Search Report and Written Opinion, Oct. 16, 2017, 9 pages.
PCT/US2017/046139 IPRP+WO—International Preliminary Report on Patentability and Written Opinion Feb. 12, 2019, 8 pages.
PCT/US2017/046139 ISR+WO—International Search Report and Written Opinion, Jan. 17, 2018, 16 pages.
PCT/US2017/061843 IPRP+WO—International Preliminary Report on Patentability and Written Opinion in International Application PCT/US2017/061843, mailed May 21, 2019, 13 pages.
PCT/US2017/061843 ISR+WO—International Search Report and Written Opinion in International Application PCT/US2017/061843, mailed Oct. 29, 2018, 35 pages.
PCT/US2019/015967 IPRP—International Preliminary Report on Patentability (IPRP) dated Aug. 13, 2020, 16 pages.
PCT/US2019/015967 ISR+WO—International Search Report and Written Opinion of PCT/US2019/015967, mailed Jun. 12, 2019, 25 pages.
PCT/US2019/021791 IPRP—PCT International Preliminary Report on Patentability in International Application PCT/US2019/021791, mailed Sep. 24, 2020, 9 pages.
PCT/US2019/021791 ISR+WO—International Search Report and Written Opinion in International Application PCT/US2019/021791, mailed Nov. 19, 2019, 15 pages.
PCT/US2019/051345 ISR+WO—International Search Report and Written Opinion in International Application PCT/US2019/051345, mailed Mar. 5, 2020, 15 pages.
PCT/US2020/066599 ISR + WO dated May 17, 2021, 17 pages.
PCT/US2020/066908 Search report and written opinion, date of mailing Aug. 16, 2021, 22 pages.
Reactor Start-up Procedure. Technical University Dresden. Reactor Training Course. pp. 3-4. <https://tu-dresden.de/ng/maschinenwesen/iet/wket/ressourcen/dateien/akr2/Lehrmaterialien/start_e.pdf?lang=en>. (Mar. 2015), 21 pgs.
Reactor Training Course Experiment Reactor Start-up Procedure, Technical University Dresden, Institute of Power Engineering Training Reactor, 22 pages.
Rouch et al, Preliminary thermal-hydraulic core design of the Molten Salt Fast Reactor (MSFR), Annals of Nuclear Energy 64 (2014) 449-456.
Rykhlevskii, Andrei, et al., Fuel Cycle Performance of Fast Spectrum Molten Salt Reactor Designs. Oak Ridge National Lab (ORNL), Oak Ridge, TN (United States), 2019. (Year: 2019), 13 pages.
Sabharwall, Plyush, et al., "Small Modular molten salt reactor (SM-MSR), "Small Modular Reactors Symposium. vol. 54730. 2011.
Scott, Ian and Durham John, the Simple Molten Salt Reactor, Practical, safe and cheap, Moltex Energy LLP presentation slides, 19 pgs.

(56) References Cited

OTHER PUBLICATIONS

Scott, Ian: Safer, cheaper nuclear: The simple molten salt reactor, http://www.ee.co.za/article/safer-cheaper-nuclear-simple-molten-salt-reactor.html, Dec. 2, 2014, 10 pgs.

Takata et al., Conceptual Design on Fast Reactor Fuel Reprocessing System Using Super-Direx Process, p. 5 (Apr. 25-29, 2004).

Taube, et al., Molten Plutonium Chlorides Fast Breeder Reactor Cooled by Molten Uranium Chloride, Annals of Nuclear Science and Engineering, vol. 1, pp. 277-281., 1974.

Thoma, R. E., "Chemical Aspects of MSRE Operations," ORNL-4658, Dec. 1971.

Transatomic Power Technical White Paper, Mar. 2014, V1 .0.1., (2014), http://www.transatomicpower.com/, 34 pgs.

Van't Eind, R.U.S., Simulation of a Fast Molten Salt Reactor, PSR-131-2011-009, Jul. 2011, 68 pages.

Wai, C. M. "Supercritical Fluid Extraction of Trace Metals from Solid and Liquid Materials for Analytical Application." Analytical sciences 11.1 (1995): pp. 165-167.

Wai, C.M. and Shaofen Wang. "Supercritical fluid extraction: metals as complexes." Journal of chromatography A 785. 1-2 (1997): pp. 369-383.

Wang et al., "Extraction of Uranium from Aqueous Solutions by Using lonic Liquid and Supercritical Carbon Dioxide in Conjunction" Chem. Eur. J. 15:(2009) pp. 4458-4463.

Wang Shaofen et al., "Application of Supercritical Fluid Extraction Technology on the Treatment of Nuclear Waste", Applied Chemistry, May 31, 2003, vol. 20, No. 5, pp. 409-414.

Wang, Jun-Wei et al.: "Influence of MgC12 content on corrosion behavior of GH1140 in molten NaCl—MgCl2as thermal storage medium", Solar Energy Materials and Solar Cells, Elsevier Science Publishers, Amsterdam, NL, Nov. 20, 2017, vol. 179, pp. 194-201, ISSN: 0927-0248.

Xu et al., "Thorium Energy R&D in China", Shanghai Institute of Applied Physics, Oct. 28, 2013, 59 pages.

Yamaji et al., "Experimental investigation of the MSFR molten salt reactor concept", 2014, pp. 408-416.

Yamaji et al., "Experimental Modelling and Numerical Analysis of a Molten Salt Fast Reactor", PHYSOR 2014—The Role of Reactor Physics Toward a Sustainable Future, Kyoto, Japan, Sep. 28-Oct. 3, 2014, 9 pages.

Yamaji et al., "Experimental and numerical thermal-hydraulics investigation of a molten salt reactor concept core", 2017, pp. 480-490.

Yamaji et al., "Thermal-hydraulic analyses and experimental modelling of Msfr", Elsevier—Annals of Nuclear Energy 64 (2014) pp. 457-471.

Zhao et al., "Use of ionic liquids as 'green' solvents for extractions", Journal of Chemical Technology and Biotechnology, 2005, pp. 109-1096.

Zhu et al., "Extraction of Actinides and Lanthanides by Supercritical Fluid", Journal of Engineering for Gas Turbines and Power, vol. 133, May 2011, 8 pages.

Gehin J.C., et al., "Liquid Fuel Molten Salt Reactors for Thorium Utilization," Nuclear Technology, May 2016, vol. 194, No. 2, pp. 152-161.

International Preliminary Report on Patentability for International Application No. PCT/US2020/066599, dated Jul. 7, 2022, 10 Pages.

International Preliminary Report on Patentability for International Application No. PCT/US2020/066908, dated Jul. 7, 2022, 12 Pages.

International Preliminary Report on Patentability for International Application No. PCT/US2021/053750, dated Feb. 8, 2024, 9 Pages.

International Search Report and Written Opinion for International Application No. PCT/US2021/053750, dated Apr. 5, 2022, 17 Pages.

Renault C., et al., "The Molten Salt Reactor (MSR) R&D Status and Perspectives in Europe," FISA-MSR, Jan. 20, 2010, 16 Pages.

* cited by examiner

FIG. 14B
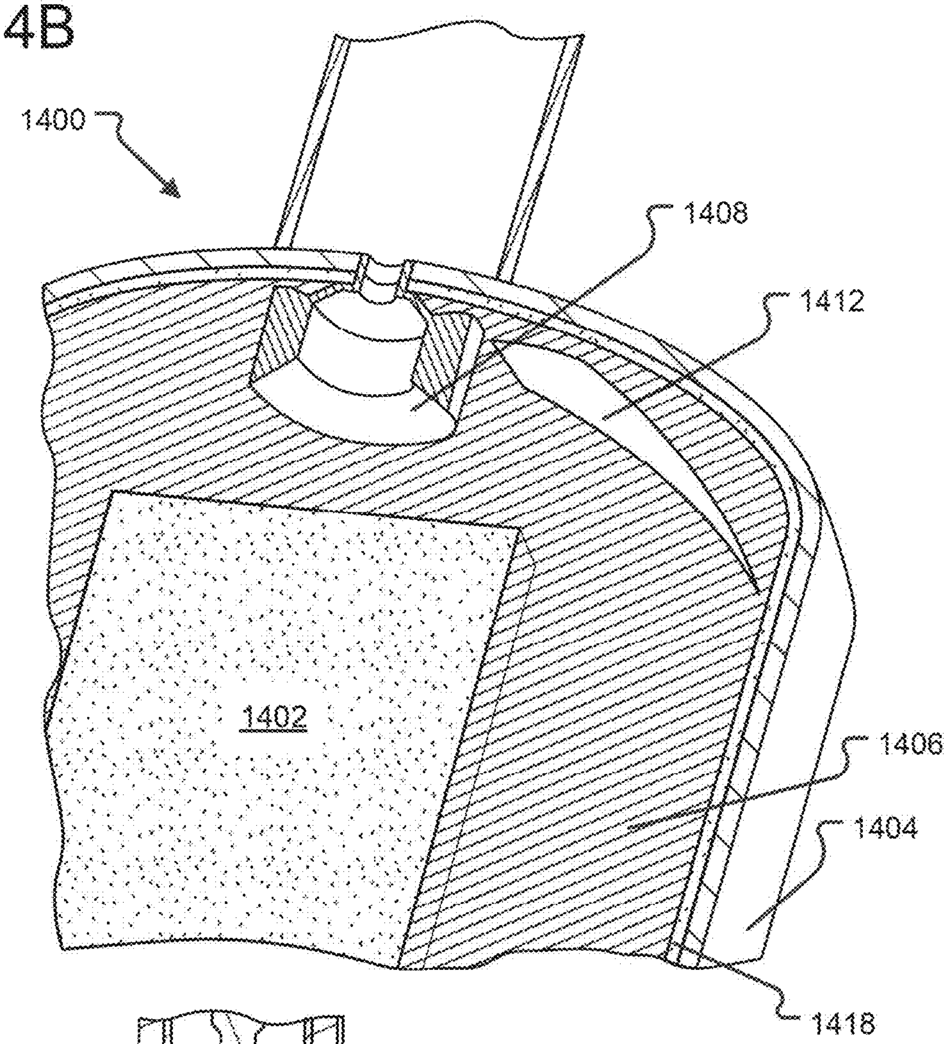
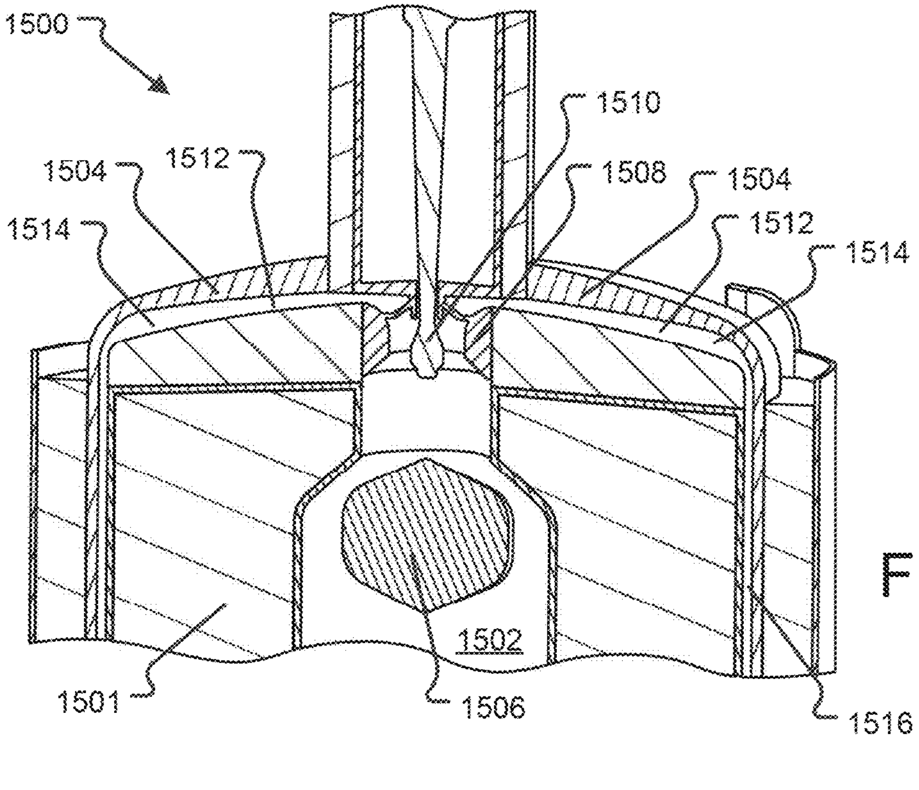
FIG.15

3000

REACTOR SYSTEMS HAVING AN EXTERNAL FUEL SALT LOOP

RELATED APPLICATIONS

This application is a continuation-in-part of U.S. patent application Ser. No. 17/388,824, filed Jul. 29, 2021, which is a continuation-in-part of U.S. patent application Ser. No. 17/132,168, filed Dec. 23, 2020. U.S. patent application Ser. Nos. 17/388,824 and 17/132,168 claim the benefit of U.S. Provisional Application Nos. 62/953,065, filed Dec. 23, 2019, and 63/075,655, filed Sep. 8, 2020, which applications are hereby incorporated by reference.

GOVERNMENT INTEREST

The new inventions in this continuation-in-part application were made with government support under Contact No. DE-NE0009045 awarded by the Department of Energy. The government has certain rights in these inventions.

INTRODUCTION

The utilization of molten nuclear fuels, or simply molten fuels, in a nuclear reactor to produce power provides significant advantages as compared to solid fuels. For instance, molten nuclear fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

Low power experimental reactors are useful in investigating various aspects of nuclear reactor design and operation. Because significant power generation, per se, is not the goal, novel designs for low power reactors may be pursued that would be unfeasible in a normal commercial setting.

This document describes alternative designs for a low power, fast spectrum molten fuel salt nuclear reactor that can be used to advance the understanding of molten salt reactors, their design and their operation. Furthermore, the designs described may be adapted to extra-terrestrial use as described herein for use as a low-gravity, moon-, Mars-, or space-based power generator. These low power reactors include a reactor core volume defined by axial and radial neutron reflectors enclosed in a reactor vessel, in which heated fuel salt flows from the reactor core through a duct between the radial neutron reflector and the reactor vessel and back into the reactor core. Heat generated from the fission in the reactor core is transferred from the molten fuel through the reactor vessel to a coolant, in the case of an experimental design, or directly to an extra-terrestrial environment, in the case of an extra-terrestrial design. The molten fuel may be actively pumped and/or the flow of the molten fuel may be driven by natural circulation caused by the density difference between high temperature molten fuel and low temperature molten fuel.

When adapted for experimental use, these low power reactors includes a reactor system designed to allow the investigation of such phenomena as: Low effective delayed neutron fraction, due to delayed neutron precursor advection and presence of plutonium in the fuel salt; Negative fuel density (expansivity) reactivity coefficient; Reactivity effects associated with asymmetric flow and thermal distribution (velocity and temperature) of fuel salt entering the active core; K-effective stability (reactivity fluctuations) due to flow instabilities and/or recirculations; and, approach to criticality (startup), reactivity control, and shutdown.

When adapted for extra-terrestrial use, the designs take advantage of the reduced radiation exposure requires and the natural heat sink provided by extra-terrestrial environments. Heat may be dissipated directly to cold of space, for example, through a thermoelectric power generator attached to the exterior of the reactor vessel.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIGS. 14A-14B illustrate yet another embodiment of a pool-type reactor system in which, except for molten fuel flow through the reactor core and pump chamber, all the flow paths of the molten fuel are in contact with and are defined by the interior surface of the reactor vessel.

FIG. 15 illustrates two alternative embodiments of the upper molten fuel exit channel and pump layout that could be used in any reactor system embodiment described herein.

DETAILED DESCRIPTION

Figure 1:
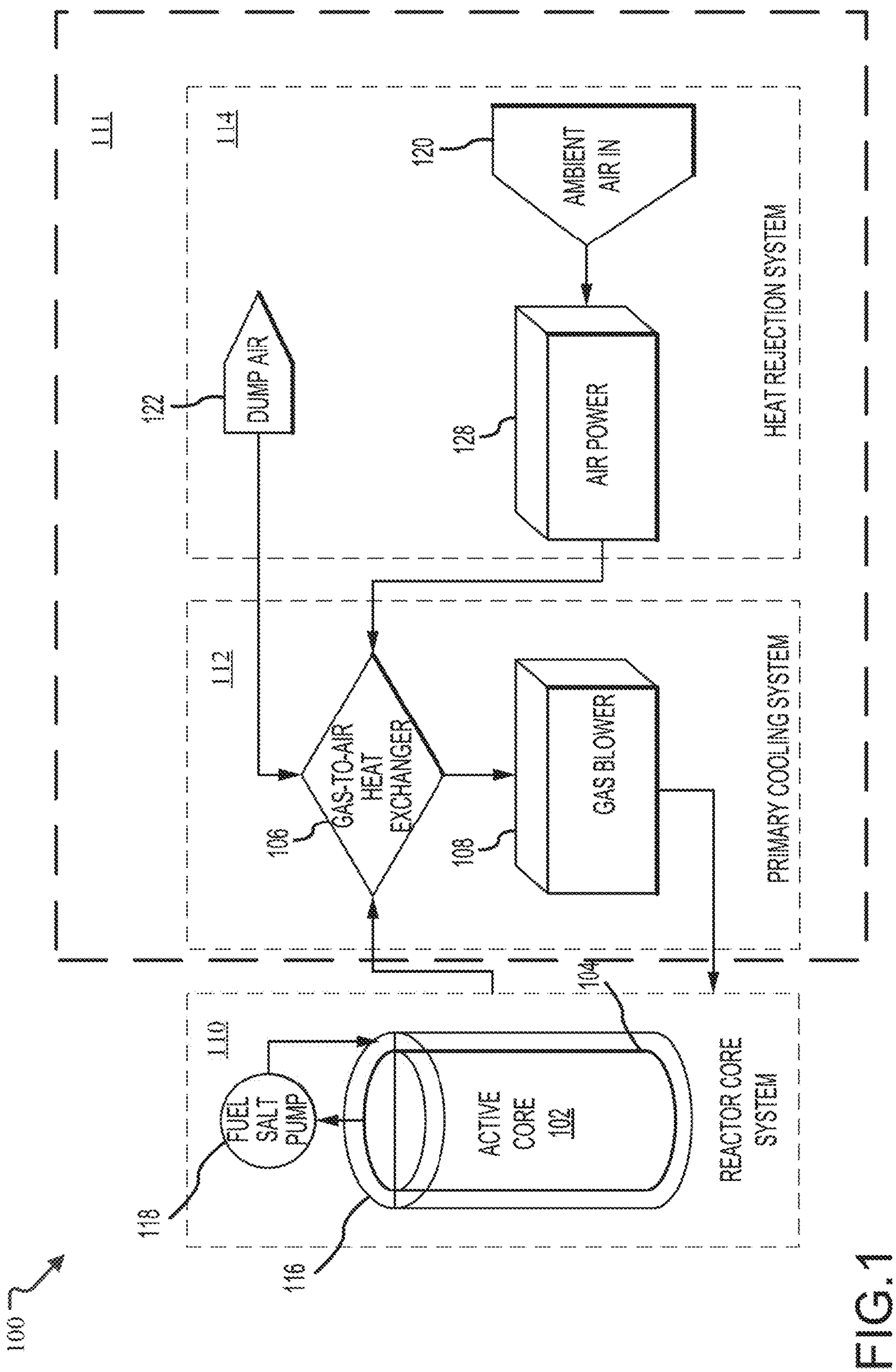
FIG. 1 illustrates a functional block diagram of pool-type reactor designed for use with a fuel salt.

Although the techniques introduced above and discussed in detail below may be implemented for a variety of molten nuclear fuels, the designs in this document will be described as using a molten fuel salt and, more particularly, a molten chloride salt of plutonium and sodium chlorides. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Before the low power, fast spectrum nuclear reactor designs and operational concepts are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the nuclear reactor only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

As used herein, two components may be referred to as being in "thermal communication" when energy in the form of heat may be transferred, directly or indirectly, between the two components. For example, a wall of container may be said to be in thermal communication with the material in contact with the wall. Likewise, two components may be referred to as in "fluid communication" if a fluid is transferred between the two components. For example, in a circuit where liquid is flowed from a compressor to an expander, the compressor and expander are in fluid communication. Thus, given a sealed container of heated liquid, the liquid may be considered to be in thermal communication (via the walls of the container) with the environment external to the container but the liquid is not in fluid communication with the environment because the liquid is not free to flow into the environment.

Experimental Reactor Designs

FIG. 1 illustrates a functional block diagram of pool-type reactor 100 designed for use with a molten nuclear fuel. In the embodiment shown, the reactor 100 includes a reactor system 110, a primary cooling system 112, and a heat rejection system 114. The reactor system 110 generates heat through fission of a molten salt fuel. The heat is removed from the reactor system 110 via the primary cooling system 112. That removed heat is then discharged into the atmosphere by the heat rejection system 114. Although embodiment 100 illustrated is designed for use with a chloride fuel salt such as a uranium, a plutonium, a thorium or a combination chloride fuel salt, alternative embodiments of the reactor may be designed for use with any fuel salt such as fluoride fuel salt and fluoride-chloride fuel salts. Examples of nuclear fuel salts include mixtures of one or more fissionable fuel salts such as $PuCl_3$, $UCl_4$, $UCl_3F$, $UCl_3$, $UCl_2F_2$, $ThCl_4$, and $UClF_3$, with one or more non-fissile salts such as NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$. For example, $PuCl_3$-NaCl, $UCl_3$-NaCl and $UCl_3$-$MgCl_2$ salts are contemplated.

The reactor system 110 includes a reactor core 102. The reactor core 102, during operation, is a central, open channel that contains a volume of molten fuel where the density of fast neutrons (neutrons with energy of 0.5 MeV or greater) is sufficient to achieve criticality. The size and shape of the channel is defined by a neutron reflector assembly within the reactor vessel. The reflector assembly surrounds the reactor core 102 and acts to reflect fast neutrons generated in the core 102 back into the core 102, thereby increasing the fast neutron density. The reflector assembly is discussed in greater detail with reference to subsequent figures.

The size of the reactor core 102 is selected based on the type of fuel being used, that is, the volume is sufficient to hold the necessary amount of molten fuel to achieve critical mass in the reactor core 102. In an embodiment, during operation the reactor core 102 is unmoderated, that is, the reactor core contains no moderator rods or other moderator elements so as not to reduce the energy of fast neutrons in the core. In one embodiment, the reactor core 102 contains only molten fuel. That the reactor core 102 can achieve criticality from the molten fuel within the core itself in one aspect that separates the fast reactor designs herein from thermal reactors and from fast reactors that use a collection of individual fuel pins that, during operation, each contain a small amount of molten fuel insufficient to achieve criticality, but when collected into a fuel assembly in sufficient numbers can form a critical mass.

The core 102 and the reflector assembly are surrounded by a reactor vessel 104 which, in the embodiment shown, is itself inside a shielding vessel 116. The reactor 100 is referred to as pool-type to indicate that molten fuel is contained within reactor vessel 104, which forms a pool that is filled with liquid molten fuel when in operation. Solid components, such as elements of the reflector assembly, may be within the pool formed by the reactor vessel 104 and may take up some of the volume within the reactor vessel 104. Such components are referred to herein as displacement elements because they displace fuel from the space they take up within the reactor vessel. Some displacement elements may perform no other function than to take up space within the reactor vessel. Other displacement elements, like the reflector assembly, may also perform functions such as directing the circulation of molten fuel and affecting the neutronics of the reactor core in addition to displacing molten fuel within the reactor vessel 104.

In an embodiment, the shielding vessel 116 provides additional neutron shielding around the reactor core as an added level of safety and may also serve as a secondary containment vessel in case of a rupture in the reactor vessel. In an embodiment, the reactor vessel 104 and the shielding vessel 116 are made of solid steel. Based on the operating conditions, which will at least in part be dictated by the fuel selection, any suitable high temperature and corrosion resistant steel, such as 316H stainless, HT-9, a molybdenum alloy, a zirconium alloy (e.g., ZIRCALOY™), SiC, graphite, a niobium alloy, nickel or alloy thereof (e.g., HASTELLOY™ N, INCONEL™ 617, or INCONEL™ 625), or high temperature ferritic, martensitic, or stainless steel and the like may be used. Materials suitable for use as shielding includes steel, borated steel, nickel alloys, MgO, and graphite. For example, in an embodiment all molten fuel-contacting (salt-wetted) components may be made of or cladded with INCONEL™ 625 (UNS designation No6625) to reduce the corrosion of those components.

In the embodiment shown, one or more pumps 118 are provided to circulate the molten fuel. In an alternative embodiment, the reactor system 110 is designed to operate under natural circulation and no pump is provided. During operation heated fuel is circulated between the reactor core 102 where fission heat is generated and the interior surface of the reactor vessel 104 where the fuel is cooled and the fission heat is removed.

The reactor vessel 104 is cooled by a primary cooling system 112. When operating at steady state the temperature within the reactor core 102 remains stable, with the excess heat generated by fission being removed by the primary cooling system 112. In an embodiment, the primary cooling system 112 consists of one or more cooling circuits (only one circuit is shown in FIG. 1) in which each circuit includes a heat exchanger 106 and a coolant blower 108. Alternatively, a liquid coolant could be used in conjunction with a liquid-to-air heat exchanger and a pump. The coolant blower 108 forces cool primary coolant gas past the exterior surface of the reactor vessel 104 by flowing the coolant through a space provided between the reactor vessel 104 and the shielding vessel 116 for the primary coolant. Heat is removed from the reactor vessel 104 by passing the primary coolant along the exterior surface of the reactor vessel. Although some heat may be lost to parasitic losses, at steady state most if not all heat generated in the reactor core 102 is removed by the primary coolant system 112. To assist in the transfer of heat, fins, pins, dimples, or other heat transfer elements may be provided on the exterior surface of the vessel 104 to increase the surface area of the exterior surface exposed to the primary coolant as will be discussed in greater detail below.

The heated primary coolant then flows to the heat exchanger 106. Heated primary coolant gas passes through the heat exchanger 106 where the primary coolant gas is cooled and the air is heated. Cooled primary coolant is then recirculated to the reactor system 110 to form a primary coolant flow circuit.

In an embodiment, an inert gas, e.g., nitrogen or argon, is used as the primary coolant gas. However, any gas may be used. In an alternative embodiment, the reactor 100 may be designed to use any fluid, either gas or liquid, as the primary coolant.

The heat rejection system 114 uses air as the working fluid. The heat rejection system 114 takes in ambient air at an ambient temperature and pressure. Using an air blower 128, the ambient air is passed through the heat exchanger 106 where it received heat from the heat coolant. The now-heated air from the heat exchanger 106 is then vented to the environment. Similar to the primary cooling system 112, the heat rejection system 114 may include multiple, independent heat rejection circuits (again, only one is shown in FIG. 1). Each heat rejection circuit may include its own dedicated and independently controllable blower 128, air intake 120, heated air discharge vent 122 and associated piping/ducting.

In an embodiment, multiple independent cooling circuits and heat rejection circuits may be used. For example, in an embodiment four separate and independent cooling circuits are used. In addition, an independent heat rejection circuit may be provided for each cooling circuit. In other embodiments, instead of four independent pairs of primary cooling/heat rejection circuits, there are two, three, five, six, seven, eight, nine, ten, or more independent pairs of primary cooling system 112 and heat rejection system 114. However, a one-to-one correspondence of primary cooling circuits to heat rejection circuits is not necessary. For example, in an embodiment the reactor 100 may have four primary cooling circuits but only two heat rejection circuit in which each heat rejection circuit serves two primary cooling circuits. Other configurations are possible.

An aspect of this design is that the low power output of the reactor makes it feasible to reject the excess heat from the fission to the environment. In the embodiment shown, the primary cooling system 112 is provided as a safety system to contain the primary coolant in case there may be any release of nuclear fuel or fission products from the reactor system 110 into the primary coolant circuit. In an alternative design, the heat may be rejected directly to the environment by discharging the primary coolant directly to the environment. This embodiment essentially eliminates the primary cooling system 112 so that heat is removed by the heat rejection system 114, although such a design may need additional safeguards such as an emergency shutoff system to meet safety requirements. In such an embodiment air may be used as the primary coolant. In an alternative embodiment, water may be used as the primary coolant and the blower 128 replaced with a pump 128 that discharges heated water into the environment.

Alternatively, the heat removed from the reactor could be used beneficially to provide thermal energy to other systems. For example, in an embodiment the primary coolant could be passed to a thermal energy system for reuse as thermal energy in the reactor facility.

Figure 2:
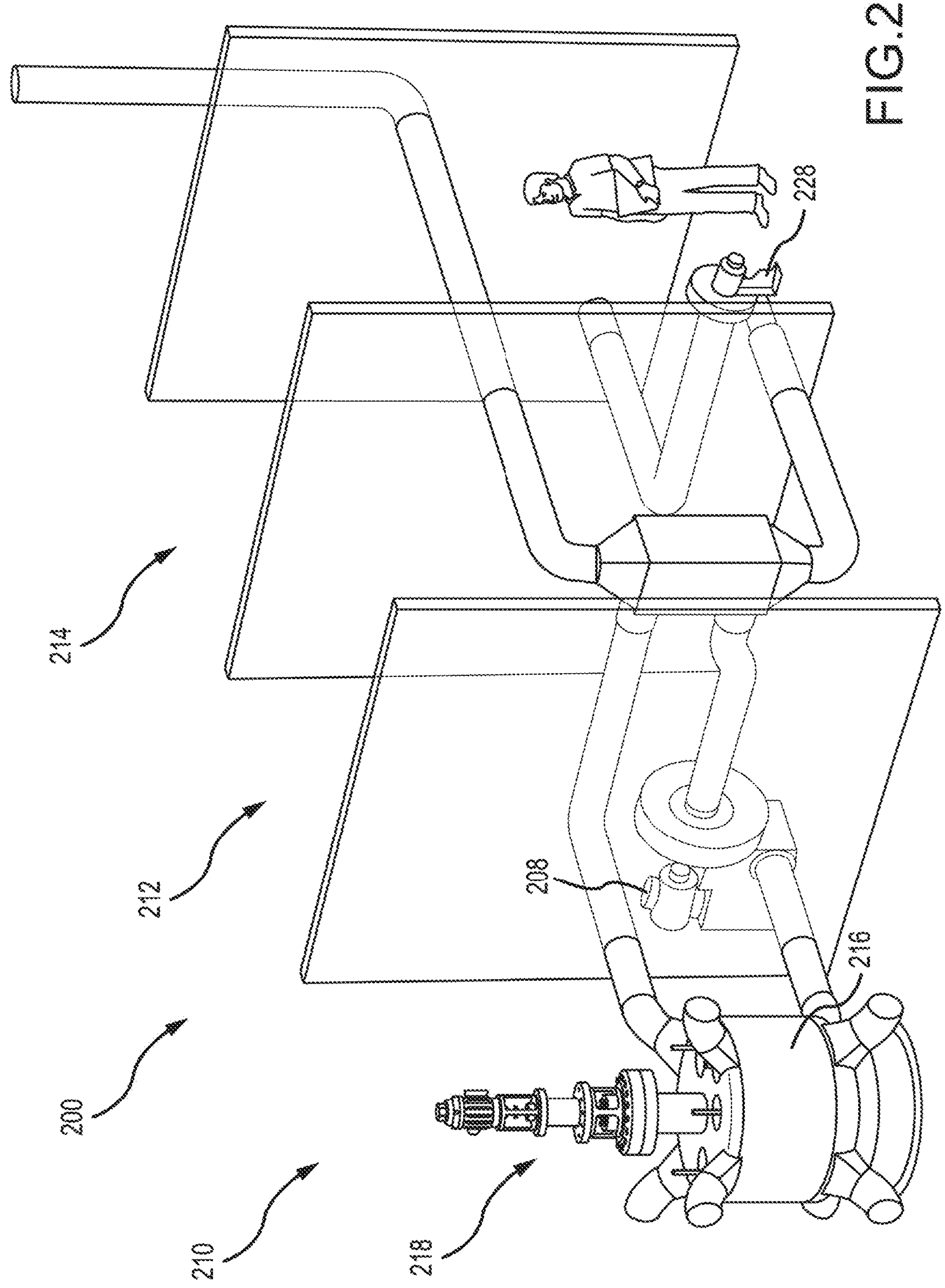
FIG. 2 illustrates a rendering of one possible physical implementation of a reactor as shown in FIG. 1.

FIG. 2 illustrates a rendering of one possible physical implementation of a reactor as shown in FIG. 1. In FIG. 2, the physical components of the systems are illustrated, such as the coolant gas blower 208, air blower 228, fuel salt pump assembly 218 and the shielding vessel 216, as well as some of the piping/ducting connections between the systems.

In the physical implementation shown, the reactor system 210 is provided with four cooling circuits 212 and heat rejection circuits 214, although only one of each is illustrated. The reactor system 210 is provided in a central room and each primary cooling circuit 212 and heat rejection circuit 214 are separated by walls from the reactor system 210 and the other circuits for containment.

Each cooling circuit 212 includes a gas-to-air heat exchanger 230 and a coolant gas blower 208. The coolant gas blower 208 drives coolant gas flow around the circuit 212. As described above, in the circuit coolant gas passes across the exterior surface of the reactor vessel where it is heated and then goes to the gas-to-air heat exchanger 230 in which heat is transferred to the air in an associated heat rejection circuit 214. The circuit then returns the cooled coolant gas to the reactor to be reheated. In the embodiment shown, the coolant gas blower 208 is shown in the cooled coolant leg of the circuit 212. In an alternative embodiment the coolant gas blower 208 may be in the heated coolant leg of the circuit 212.

Each heat rejection circuit 214 includes an air blower 228 that brings in ambient air from the environment, passes the air through the gas-to-air heat exchanger 230, after which the heated air is discharged to the environment. In the embodiment shown, the air blower 228 is shown in the ambient air leg of the circuit 214. In an alternative embodiment the air blower 228 may be in the heated air leg of the circuit 214.

Figure 3A:
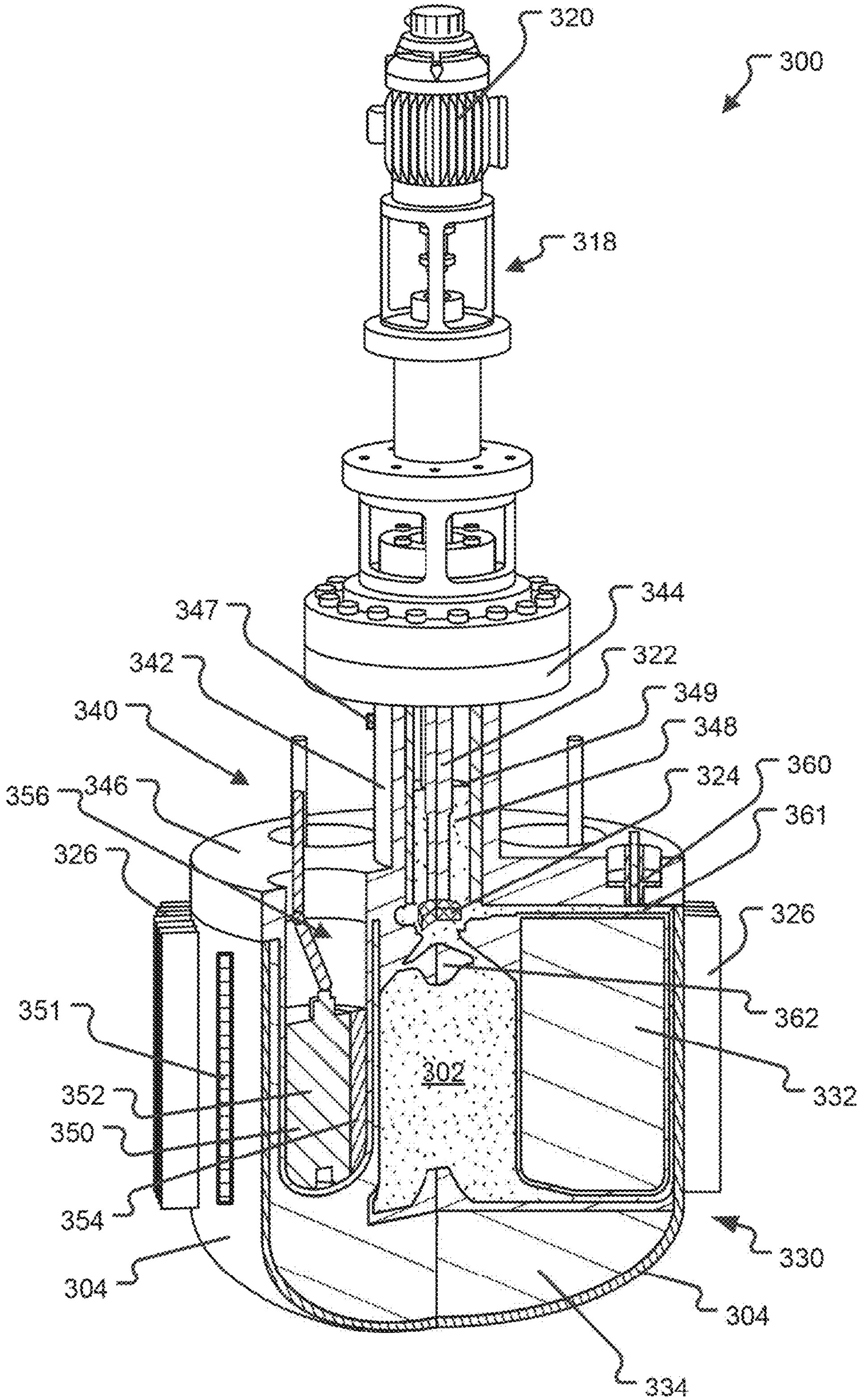
FIGS. 3A-3D illustrate an embodiment of the reactor system of FIG. 1.

FIGS. 3A-3D illustrate an embodiment of the reactor system of FIG. 1. FIG. 3A illustrates a cutaway view along section A-A shown in FIG. 3B. The cutaway view illustrates the reactor vessel 304 and some of the reactor vessel's internal components (the shielding vessel 305 is not shown in FIG. 3A). In the embodiment shown, the reactor system 300 uses a molten chloride fuel salt as nuclear fuel. The reactor system 300 has a single molten salt pump assembly 318 to circulate the fuel salt through a central active reactor core 302 and into four individual fuel salt flow circuits. Although four individual flow circuits are illustrated, any number of fuel salt flow circuits may be used. For example, the fuel salt exiting the reactor core may divided into two, three, four, five, six, eight or twelve individual circuits as desired by the reactor designer.

The pump assembly 318 includes a pump motor 320 that rotates a shaft 322 with an impeller 324 attached to the shaft's distal end. In an embodiment, rotation of the impeller 324 drives the flow of fuel salt upward through the central reactor core and, in heat transfer sections, downward along the interior surface of the reactor vessel 304 in four heat exchange ducts, although in an alternative embodiment the flow may be reversed. The pump assembly 318 is discussed in greater detail below.

Figure 10:
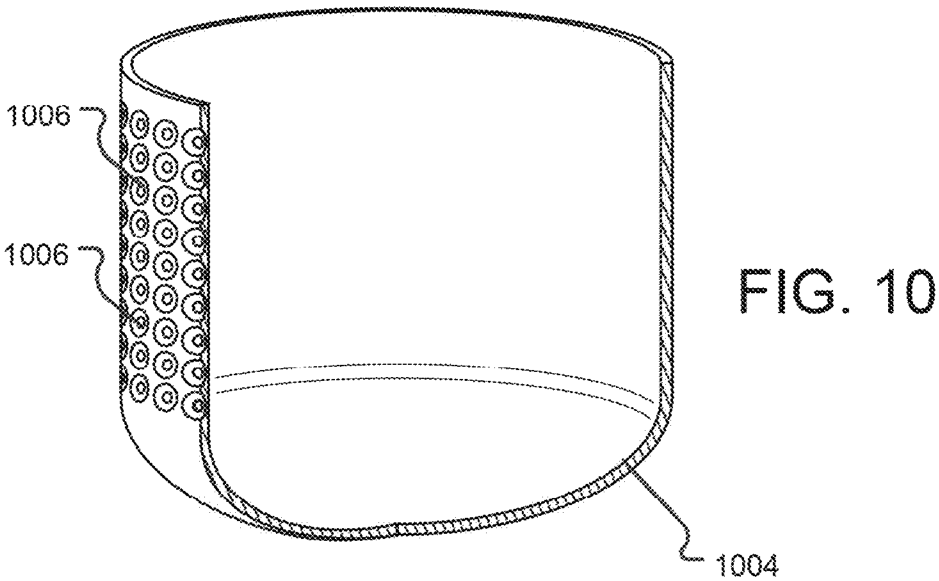
FIG. 10 illustrates a reactor vessel with a dimpled exterior surface instead of fins for improved heat transfer.

The reactor vessel 304 is provided with fins 326 on the exterior surface as shown. The fins 326 assist in transferring heat from the reactor vessel 304 to the coolant. Alternatively, any high surface area feature may be used instead of or in addition to the fins, such as a dimpled jacket (as shown in FIG. 10) or alternating pins. In the embodiment shown the fins 326 are on four sections of the exterior of the lateral wall of the reactor vessel 304, which are the only sections of active heat removal (heat transfer regions) from the reactor vessel 304. The fins 326 are located opposite the flow paths of the down-flowing fuel salt (the heat exchange ducts 306) and on those portions of the lateral wall of the reactor vessel 304 that are not in contact with the fuel salt there are no fins. However, in an alternative embodiment, fins 326 are provided on the entire exterior surface of the vertical walls of the reactor vessel regardless of the location of heat transfer regions of the reactor vessel 304. In yet another embodiment, fins or other heat transfer elements are provided around the entire lateral and bottom surface of the reactor vessel. In yet another embodiment, heat may be transferred between the fuel salt and the primary coolant via a heat exchanger.

Surrounding the active core laterally and on the bottom is a neutron reflector assembly 330. The reflector assembly 330 includes a radial reflector 332 defining the lateral extend of the reactor core 302 and a lower, axial reflector 334 defining the bottom of the reactor core 302. In an embodiment, the neutron reflector assembly 330 consists of solid bricks or compacted powder of reflector material contained within a reflector structure which acts as a container of the reflector material. In one aspect, the neutron reflector assembly 330 may be considered a large container that acts as displacement volume, i.e., it displaces salt within the reactor vessel thereby defining where the fuel salt may be in the reactor vessel. The neutron reflector assembly 330 is discussed in greater detail below.

In the embodiment shown, a vessel head 340 provides some additional neutron reflection. In an alternative embodiment, additional reflector material may be incorporated into the vessel head 340 or between the vessel head and the radial reflector 332. For example, in an embodiment the reflector assembly 330 includes an upper axial reflector 336 between the vessel head 340 and the radial reflector 332. Likewise, external shielding (not shown in FIG. 3A) around the reactor may be provided for additional safety.

In the embodiment shown, the vessel head 340 includes a main deck 346 a hollow upcomer 342 ending in a flange 344 to which the pump assembly 318 attaches. The main head deck 346 sealingly covers the reactor vessel 304 and, in the embodiment shown, includes control drum wells (See FIG. 7). The shaft 322 between the motor and the impeller is contained within the upcomer 342. The upcomer 342 defines a chamber above the impeller that is in fluid communication with the fuel salt in the reactor. The chamber is referred to as the expansion chamber 348 and contains the free surface level 349 of the fuel salt in the reactor system 300. During operation the headspace in the expansion chamber 348 above the fuel salt is filled with an inert cover gas. A cover gas management system is provided (not shown) that controls the pressure of gas within the expansion chamber 348 and also cleans the cover gas as needed. The pressure in the cover gas can also be used to cause the fuel salt to be forced out of the reactor vessel 304 through access/removal ports (not shown in FIGS. 3A-D) provided to deliver and remove liquid from the reactor vessel 304.

The level 349 of the fuel salt in the expansion chamber 348 will change as the fuel salt expands and contracts (such as during startup and shutdown) and the level 349 may be used as an indicator of the current operational state or condition of the reactor system. Monitoring devices may be provided that indicate the height of the free surface level 349 of the fuel salt during operation. Control decisions, such as to open or close one or more flow restriction devices 360 (discussed below), rotation of the control drums 350, or to increase or decrease the flow and/or temperature of coolant to the reactor system 300 may be made based, in part or completely, on the basis of the output of the level monitoring device. For example, in an embodiment a range of free surface levels 349 indicative of standard operation may be targeted and one or more control decisions as discussed above may be made automatically by a controller so as to keep the fuel salt level within the targeted range.

An overflow port 347 may be provided in the upcomer 342 to remove excess fuel salt to a fuel salt overflow tank (not shown).

During subcritical, non-fission heated operation, the fuel salt in the reactor system 300 may be maintained at temperature above the fuel salt melting point. In an embodiment, this may be accomplished by using electrical heaters 351 mounted on the exterior of the reactor vessel 304 and/or vessel head 340. For example, in one embodiment heaters 352 are provided in the space between the reactor vessel 304 and the shielding vessel 305, in locations between the fins 326. Alternatively, a heater 351 could be included in the primary cooling system, e.g., in each cooling circuit, and used to heat the primary coolant (gas/liquid) which, in turn, heats the reactor system 300 to maintain the fuel salt at the desired temperature. In other words, the primary cooling system could also be used as the initial heating system to heat up and/or maintain the reactor system 300 at the appropriate temperature when the reactor is subcritical.

Reactivity control of the reactor system 300 is realized via one or more independently rotated control drums 350. In the embodiment shown four control drums are used, although any number and configuration of control drums may be used. The control drums 350 are cylinders of a reflector material 352 and provided with a partial face 354 made of a neutron absorber. The reflector assembly 330 defines a receiving space for each control drum 350 as shown allowing the control drums 350 to be inserted into the reactor vessel 304 laterally adjacent to the reactor core 302. The control drums 350 can be independently rotated within the reflector assembly 330 so that the neutron absorber face 354 may be moved closer to or farther away from the active reactor core 302. This controls the amount of fast neutrons that are reflected back into the core 302 and thus available for fission. When the absorber face 354 is rotated to be in proximity to the core 302, fast neutrons are absorbed rather than reflected and the reactivity of the reactor system 300 is reduced. Through the rotation of the control drums, the reactor may be maintained in a state of criticality, subcriticality, or supercriticality.

Although shown as control drums 350, in an alternative embodiment, insertable control rods or sleeves of neutron reflector or absorbing materials may be used instead of or in addition to control drums 350. In addition, additional control elements for emergency use may be provided including, for example, one or more control rods of absorbing material that could be inserted/dropped into the reactor core 302 itself in case of emergency.

Additionally, although the control drums 350 are illustrated as cylinders that substantially fill the drum chambers or wells 356 (see also FIG. 7), the control drums 350 could be any shape and need not entirely fill the drum wells 356. For example, in an embodiment the drums have a crescent-shaped horizontal cross section where the crescent shape allows for easier insertion and removal around the pump flange of the vessel head.

In yet another embodiment, instead of an absorbing face 354, the control drums 350 may include a volume for the insertion and removal of a liquid absorbing material. In this embodiment, the control drums 350 or the drum wells 356 may be provided with one or more empty volumes which may be filled with liquid absorber to control the reactivity of the reactor system 300. For example, the control drums 350 shown in FIG. 6B may be static, but the location of the absorbing face 354 may be empty of absorber during operation and filled with liquid absorber to reduce the reactivity to subcritical during times of shutdown.

Figure 3B:
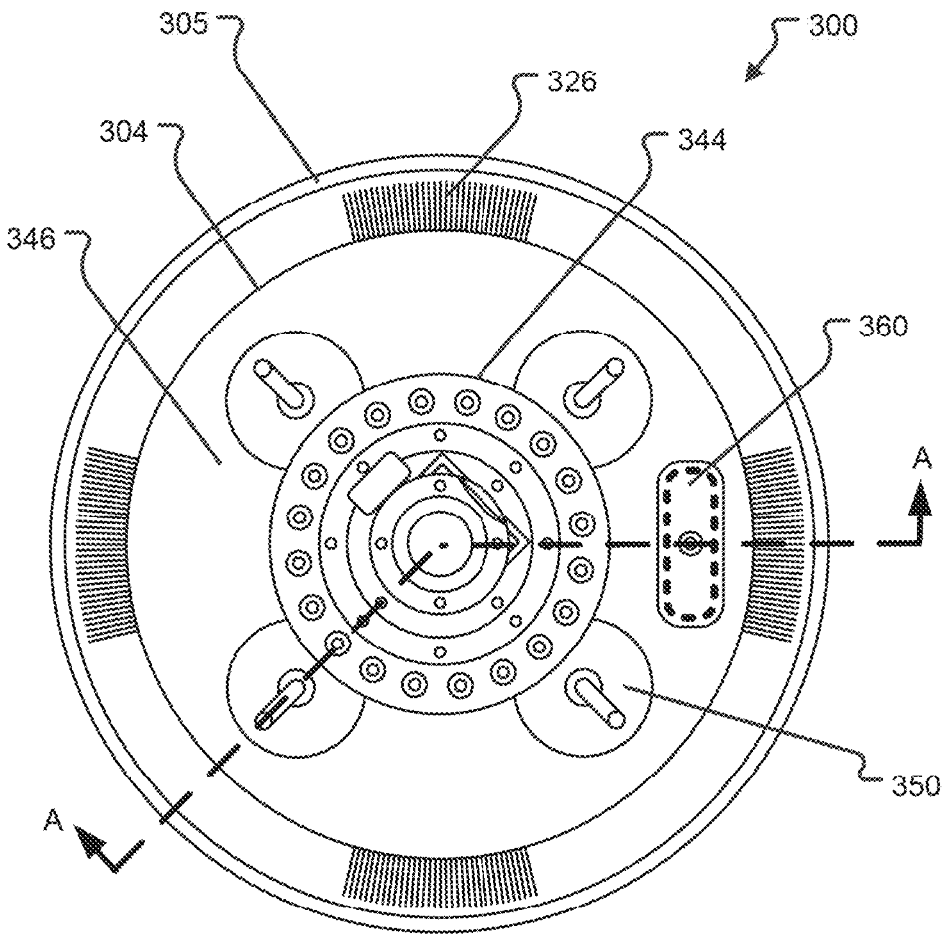
Figure 3C:
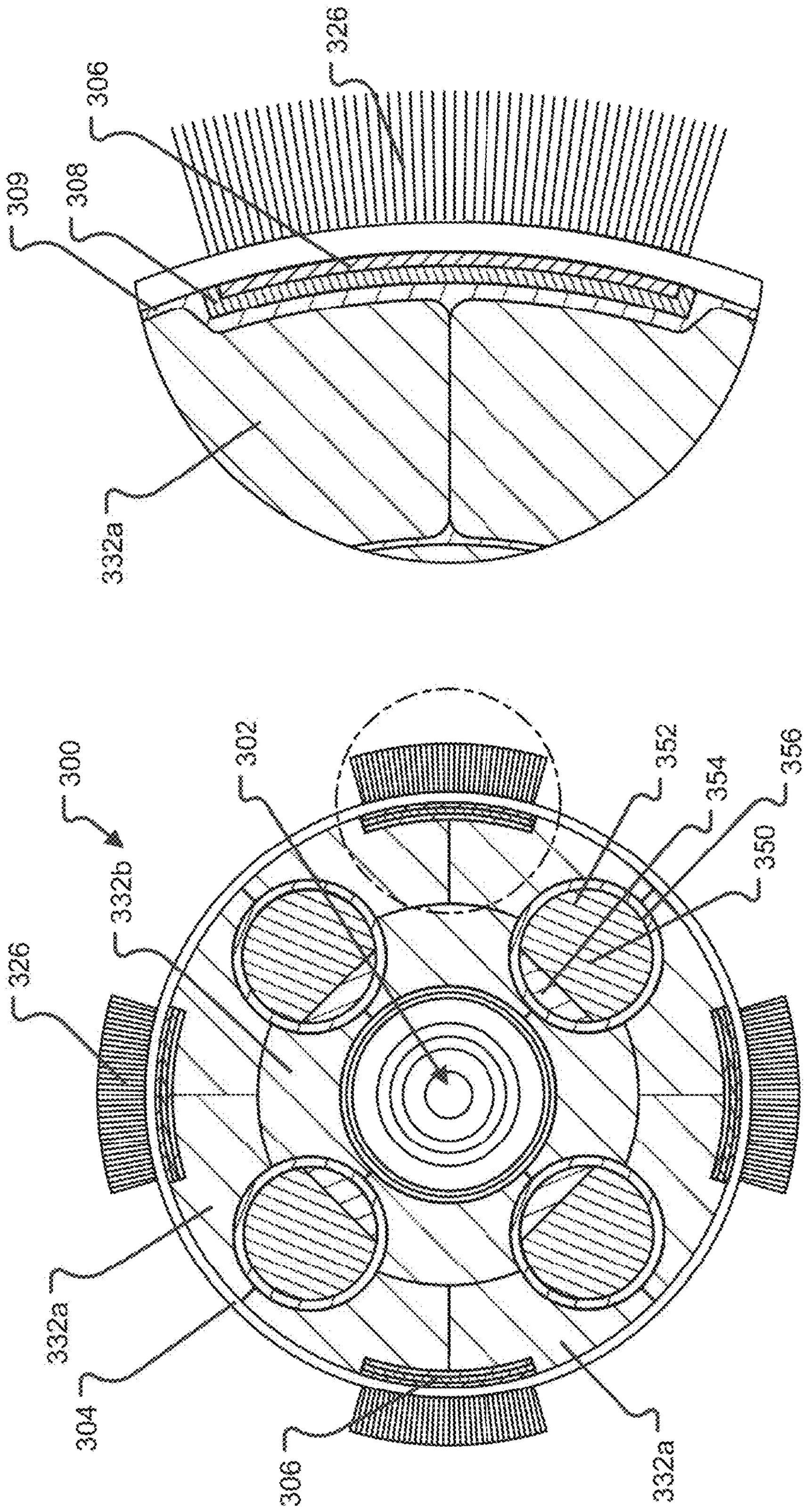
Figure 3D:
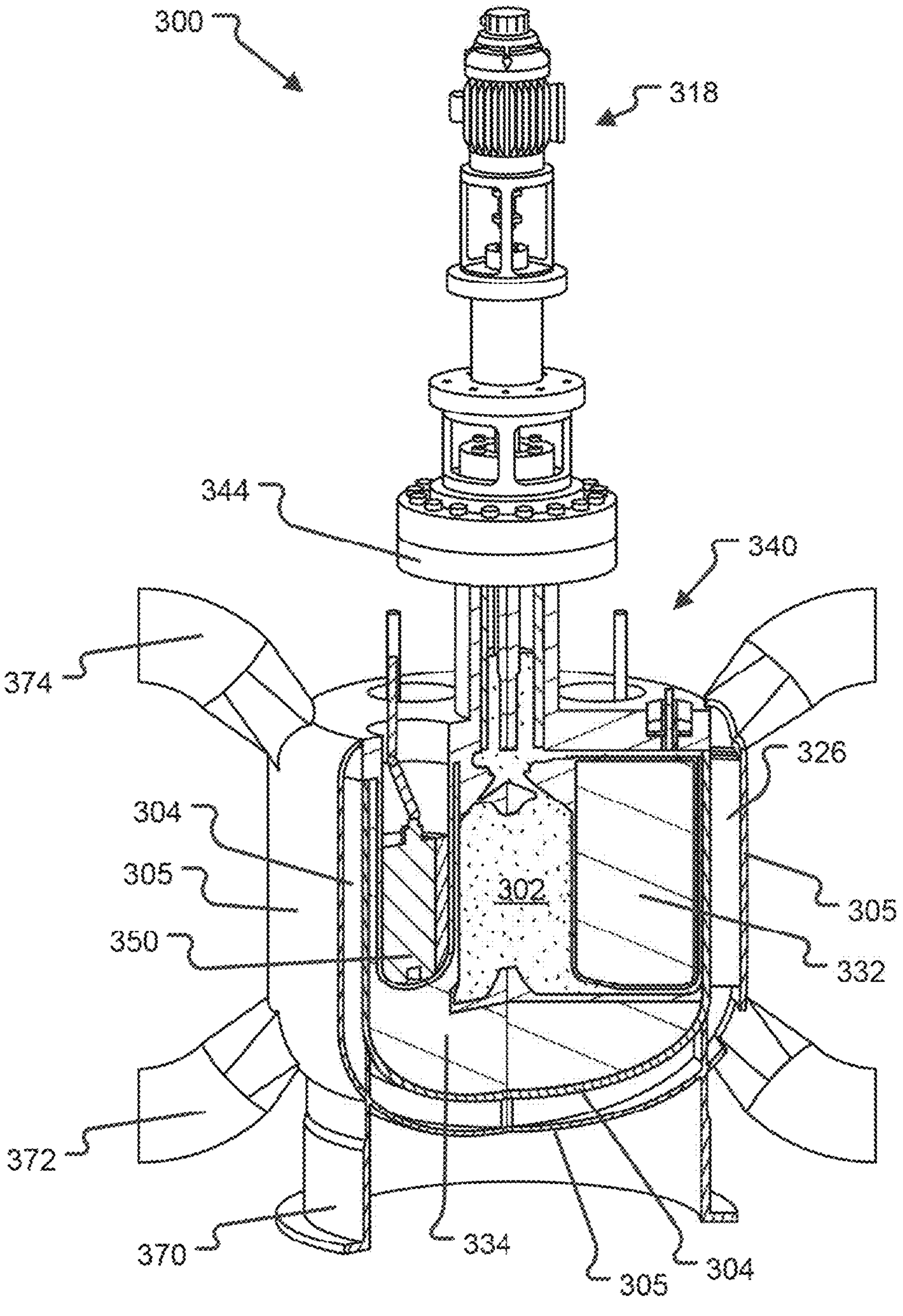
Figure 4:
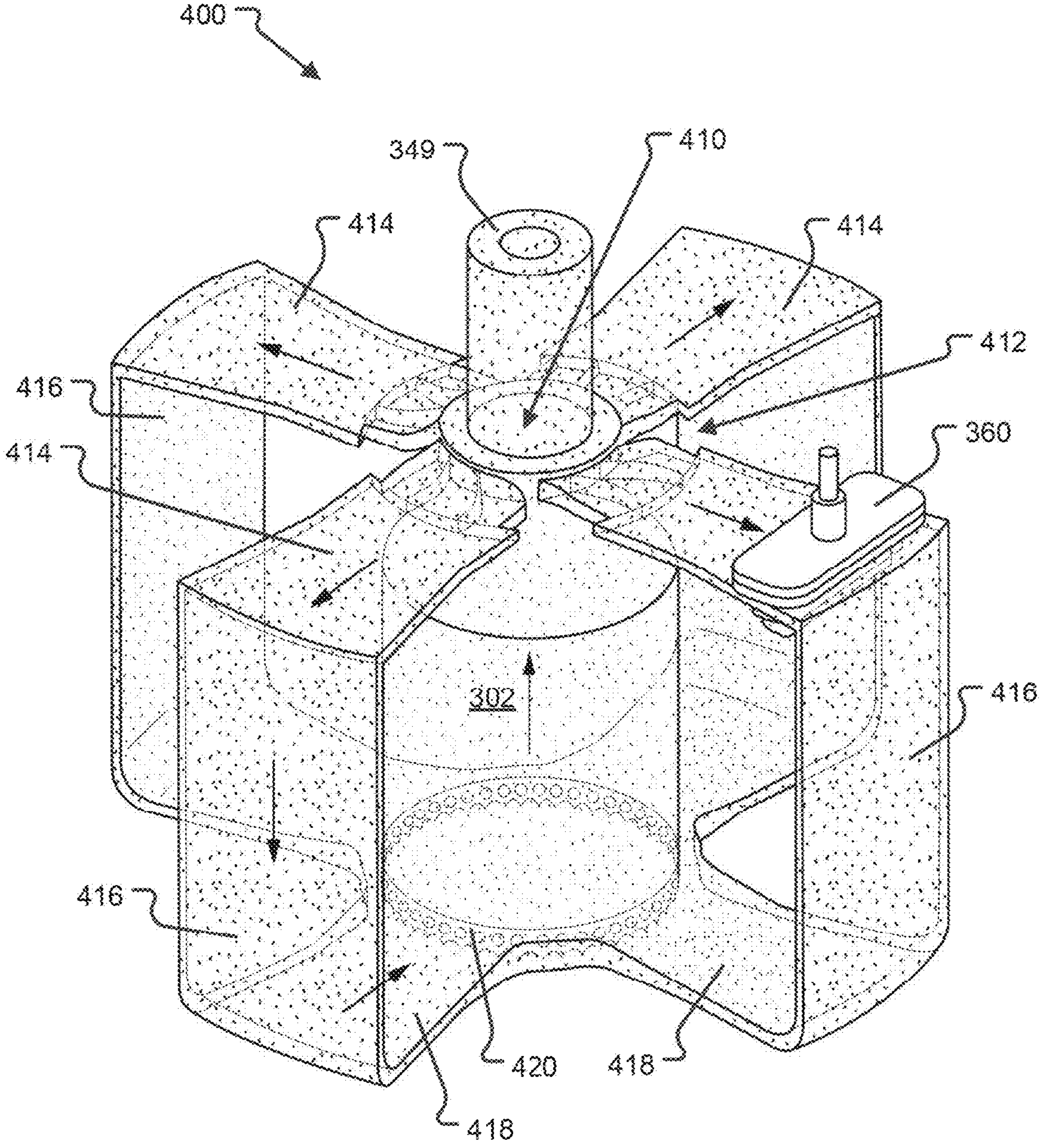
FIG. 4 illustrates the fuel salt volume and flow paths within the reactor of FIG. 3.

An optional flow restriction device 360 controlling the flow of fuel salt in one of the fuel salt circuits is illustrated in FIG. 3 and FIG. 4. The flow restriction device 360 is located at the top of one of the four fuel salt upper flow channels 361 between the active core 302 and the reactor vessel interior surface of the reactor vessel 304. Although only one flow restriction device 360 in one of the four flow circuits is shown, in alternative embodiments some of the other or all of the fuel salt flow circuits may also be furnished with such devices. The molten salt flow restriction device 360 (which may be any one of a valve, gate valve, sluice gate, pinch valve, etc.—a gate valve is shown) allows the flow rate of fuel salt through the circuit to be controlled. The flow restriction device 360 may be used to induce asymmetries in the flows entering the active core 302, as well as to modify the effective delayed neutron fraction by varying the amount of delayed neutron precursors flowing (advecting) outside of the active core. This allows the operation of the reactor 300 to be varied in order to investigate different operating scenarios and reactor conditions.

Figure 7:
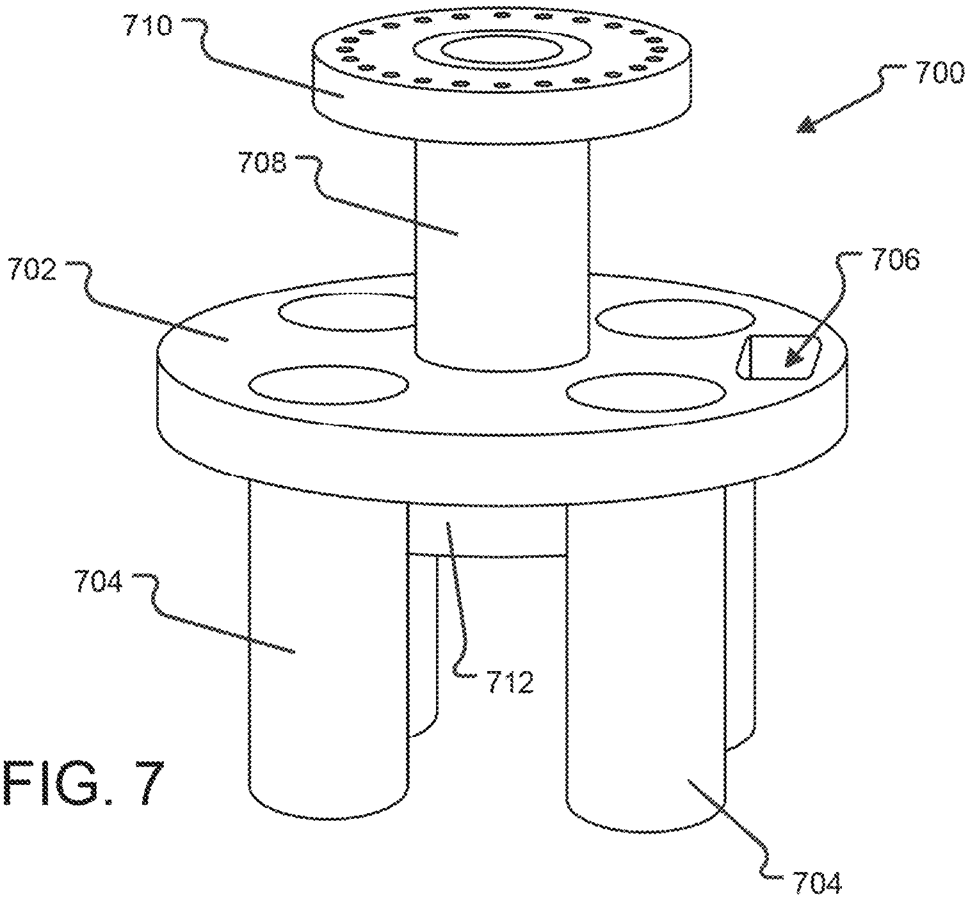
FIG. 7 illustrates an embodiment of a vessel head assembly.

Another custom feature of the reactor system 300 is the design of the pump suction region below the impeller 324. Rather than having the flow come directly into the impeller 324 from the center of the reactor core 302, a contoured plug 362 directly below the impeller 324 is provided between the impeller 324 and the reactor core 302. In an embodiment the plug 362 is supported by one or more vertical and/or horizontal members. The plug 362 may be incorporated into the reflector assembly 330 or, alternatively, may be part of the pump assembly 318 or the vessel head 340 (as illustrated in FIGS. 3A, 3D and 7, the plug and pump chamber are incorporated into the vessel head 340). In an embodiment, the plug 362 is made of a shield material such as INCONEL™ 625. In an alternative embodiment, the plug 362 is made of a reflective material such described for the radial reflector. The molten fuel flow rising through the reactor core 302 is directed around this plug 362, through one or more annular entrance regions, and then up into the pump impeller 324. This design serves multiple purposes. First, the plug 362 acts as a de facto upper reflector or shield for (and can be considered as defining the top of) the reactor core 302 and provides radiation shielding between the high flux region of the reactor core 302 and the impeller 324 of the pump. Second, the support members supporting this pump suction plug 362 can also be tailored to provide optimum inlet conditions for the pump, potentially reducing or enhancing swirl, as necessary.

FIG. 3B illustrates a plan view of the top of the reactor system 300. In the embodiment shown, the pump and vessel head flanges overlap slightly with the position of the control drums 350. In addition, as illustrated the fins 326 on the exterior of the reactor vessel 304 do not extend to the shielding vessel 305 and the space between the two vessels 304, 305 is a continuous gas space filled with the primary coolant. This is but one possible embodiment. In an alternative embodiment, the fins 326 are in contact with the shielding vessel 305. In another embodiment, the four finned areas are separate coolant flow channels and the annular space between the fin locations are either static volumes (filled with solid material such as a neutron absorber material or an inert gas) or may contain heating elements.

FIG. 3C illustrates a horizontal sectional view of the reactor through the middle of the reactor core 302 and detail of the fins 326 on the reactor vessel 304. FIG. 3C also shows the fuel salt path on the interior surface of the reactor vessel opposite the fins in the heat transfer region. Again, the control drums 350 are shown in the least reactive configuration.

FIG. 3C also illustrates additional detail of an embodiment of the radial reflector 332. In the embodiment shown, the radial reflector 332 is made of five separate pieces including a central annulus reflector 332*a* with cutouts for receiving the control drums 350 on the exterior of the annulus. Four outer arcuate reflectors 332*b* are then spaced around the outside of the central annulus reflector 332*a*. In the embodiment shown, an outer structure 309 retains the reflector material of the arcuate reflectors 332*b*. In one design, the arcuate reflectors 332*b* are solid, while in another embodiment the reflectors 332*b*.

FIG. 3C also illustrates additional detail of an embodiment of the heat exchange ducts 306. In the embodiment shown, a cladding 308 is provided between the heated fuel salt duct 306 and the radial reflector 332*a*, which, in the embodiment shown, is illustrated on the exterior of the reflector structure 309. The cladding 308 is made of material that resists corrosion from the nuclear fuel.

FIG. 3D illustrates an embodiment of the reactor system 300 in a cutaway view showing the shielding vessel 305, the reactor vessel 304 and some of the reactor system's internal components. In the embodiment shown, the reactor vessel 304 is supported by a support skirt 370. In addition, the primary coolant piping/ducting in and out of the space between the shielding vessel 305 and the reactor vessel 304 is illustrated showing the direction of flow of the coolant gas. In the embodiment shown, the cold coolant flows through a lower coolant inlet duct 372, upwardly through the region between the shielding vessel 305 and the reactor vessel 304 and over the fins 326, and then heated coolant exits via a coolant outlet duct 374. A separate coolant circuit is provided for each set of fins 326 with the outlet and inlet ducts 374, 372 located directly above and below the fins, respectively.

FIG. 3D illustrates the volume above the control drums 350 as being empty. In an alternative embodiment, this volume may be filled with an appropriately-shaped reflector to provide additional reflection in the reactor core. The reflector is removable and does not interfere with the rotation of the drum.

FIG. 4 illustrates the fuel salt volume and flow circuits within the reactor 300 of FIG. 3. FIG. 4 illustrates the entire volume 400 of salt contained within the reactor system 300. In addition to the flow paths, FIG. 4 shows outline of the pump stator (in the form of directing vanes 412), a flow restriction device 360 (in the form of a gate valve) in one flow channel, and flow conditioner 420 (in the form of an orifice ring plate).

During operation heated fuel salt flows upwardly through the reactor core 302, into the impeller chamber 410. The rotating impeller 324 (not shown in FIG. 4) drives the fuel salt (illustrated by the arrows) through the directing vanes 412 of the pump stator where the fuel salt flow is separated into one of four upper, heated fuel salt exit channels 414. The exit channel 414 carries the fuel salt over the radial reflector 332 to a heat exchange duct 416. In the embodiment shown, the upper, heated fuel salt exit channels 414 are narrower in width closest to the pump impeller 324 and widen as they approach the reactor vessel 304.

The heat exchange duct 416 is a channel between the radial reflector 332 and the interior surface of the reactor vessel 304 extending from near the top of the radial reflector 332 to the roughly the bottom of the radial reflector 332. In an embodiment, one wall of the heat exchange duct 416 is formed by the reactor vessel 304 so that fuel downwardly flowing through the heat exchange duct 416 is in direct contact with the reactor vessel 304 and, thus, in thermal communication with the coolant on the other side of the reactor vessel 304.

Fuel salt exits the heat exchange duct 416 via a lower, cooled fuel salt delivery channel 418. The lower, cooled fuel salt delivery channel 418 is a channel through the reflector assembly 330 between the lower axial reflector 334 and the radial reflector 332. The lower, cooled fuel salt delivery channel 418 delivers the now cooled fuel salt from the heat exchange duct 416 into the bottom of the reactor core 302.

A flow conditioner 420 may be provided at or near where the cooled fuel salt enters the reactor core 302 from the lower, cooled fuel salt delivery channel 418. The flow conditioner 420 ensures the flows entering the active core are well-distributed, without jet-like behavior or major eddies or recirculations, as the flow turns the corner inside the lower edge of the radial reflector 332. In the embodiment shown, the flow conditioner 420 is an orifice plate designed to optimize the flow of the cooled fuel salt. In an alternative embodiment, the flow conditioner 420 may take an alternative form such as directional baffles, tube bundles, honeycombs, porous materials, and the like.

FIG. 4 also more clearly shows the fuel salt in the expansion chamber 348 within the upcomer 342 and the free surface level 349 of the fuel salt. The expansion chamber 348 allows heated fuel salt to expand in the volume during operation.

Figure 5A:
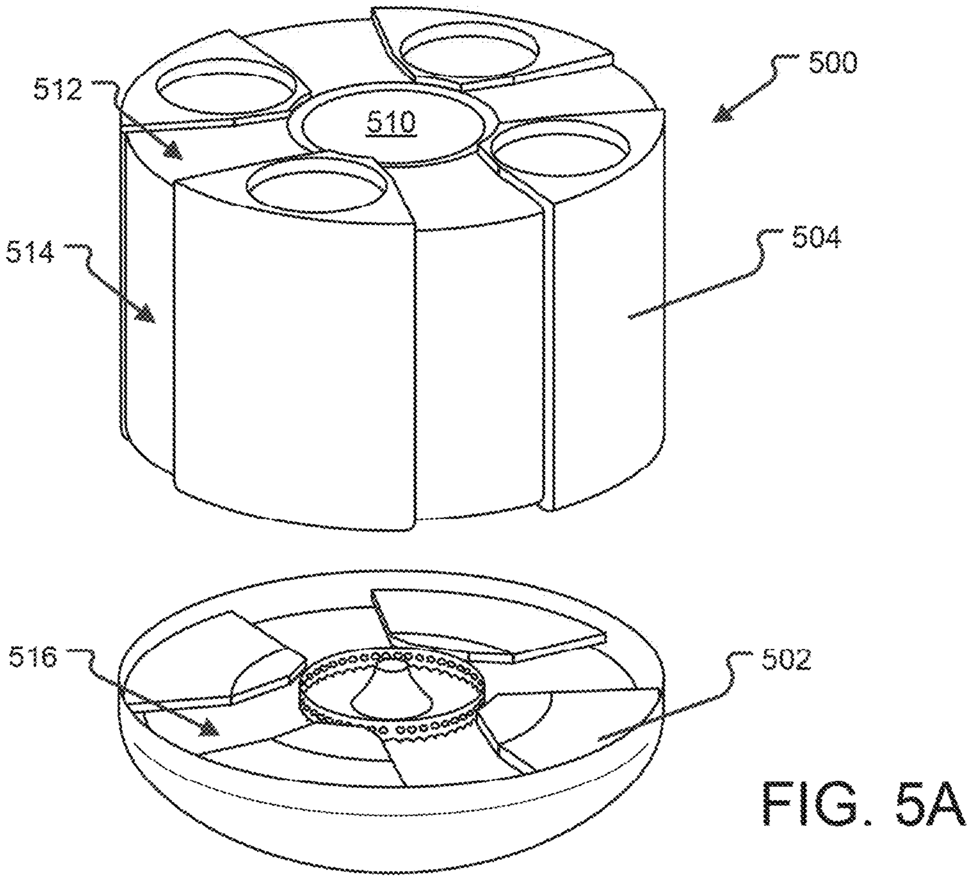
FIGS. 5A and 5B illustrate an embodiment of a reflector assembly that could be used in the reactor system of FIG. 3.
Figure 5B:
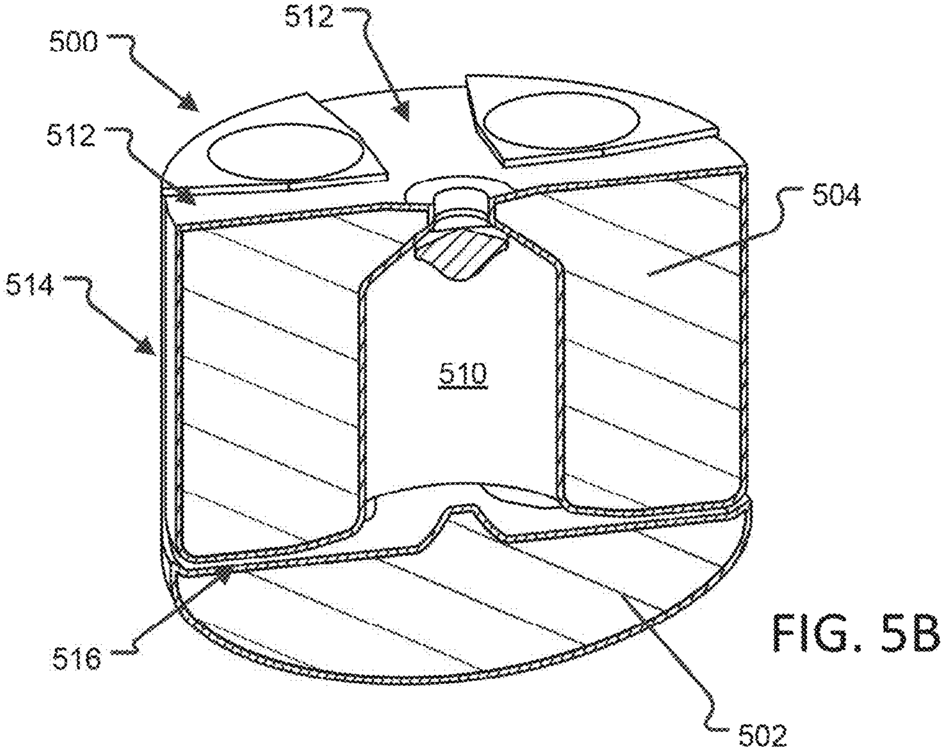

FIGS. 5A and 5B illustrate an embodiment of a reflector assembly that could be used in the reactor system of FIG. 3. The neutron reflector assembly 500 is provided in two parts, a lower axial reflector 502 and a radial reflector 504, which when combined together act as an integrated component that performs several functions including: defining the shape and size of the reactor core 302; reflecting fast neutrons from the reactor core back into the reactor core; and, when installed in the reactor vessel, defining the flow circuits of molten fuel within the reactor vessel (see arrows shown in FIGS. 5A).

In an embodiment, individual components of the reflector assembly include a reflector structure, or container, that forms the external surfaces and, thus, the shape of that part of the reflector assembly. The internal volume of the reflector structures are filled, in whole or in part, with reflector material. For example, in an embodiment bricks and/or compacted powder of reflector material are contained within the reflector structures. The reflector structure may be made of steel or any other suitably strong, temperature-resistant, and corrosion-resistant material, as described above with reference to the reactor vessel. The reflector material within the reflector structure may be Pb, Pb—Bi alloy, zirconium, steel, iron, graphite, beryllium, tungsten carbide, SiC, BeO, MgO, $ZrSiO_4$, PbO, $Zr_3Si_2$, and $Al_2O_3$ or any combination thereof.

For example, in the embodiment shown in FIG. 5A the radial reflector 504 may be single structure consisting of the outer shell of steel (as described above) filled with reflector material. In an embodiment MgO is used as the reflector material in the form of bricks (e.g., sintered bricks), compacted powder, or a combination of the two and the reflector structures themselves are made of 316 H stainless steel with fuel-exposed surfaces clad with INCONEL™ 625.

The reflector assembly components are designed to accommodate thermal expansion mis-match and swelling, which results from change in temperature and neutron radiation. For a reflector material such as MgO, the neutron reflector fill material may be processed as a powder, which typically has a 66-85% of theoretical density limit. Secondary operations such as reduction in area from drawing and annealing, and vibratory compaction can produce higher densities.

There are several strategies for assembling the reflector assembly components into the reactor vessel. In one strategy, the reflector structures are sized to a desired fit relative to the reactor vessel at the operational temperature. The reactor vessel is pre-heated using the heater(s) described above and the components of the reflector assembly are then inserted into the vessel. When inserted the components may be at the same temperature or a lower temperature as that of the vessel. The reactor vessel may then be allowed to cool. This will result in a permanent shrink fit between the reactor vessel and reflector assembly and a proper fit at operation temperature. In a second strategy, the reflector structures are sized to a slip fit relative to the reactor vessel at a given temperature, such as room temperature. This will produce a light transitional fit at operating temperature.

FIG. 5B illustrates a section view of the reflector assembly 500 showing the shape reactor core 510, the heated fuel salt exit channels 512, the heat exchange ducts 514, and the cooled fuel salt delivery channels 516 defined by the shape of the radial reflector 504 and axial reflector 502.

Figure 6A:
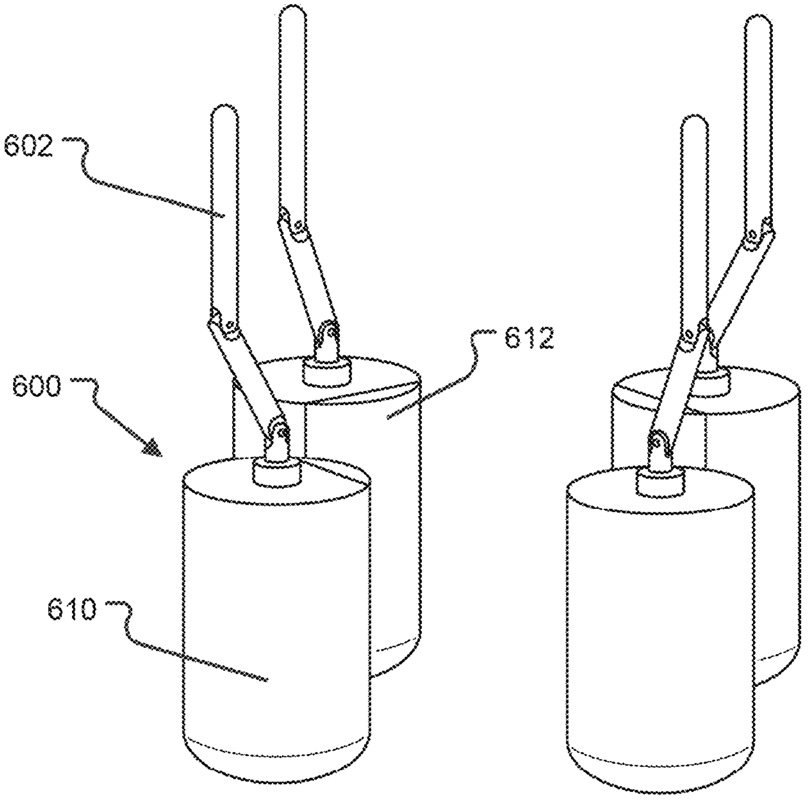
FIGS. 6A-6D illustrate different embodiments of the control drums.
Figure 6B:
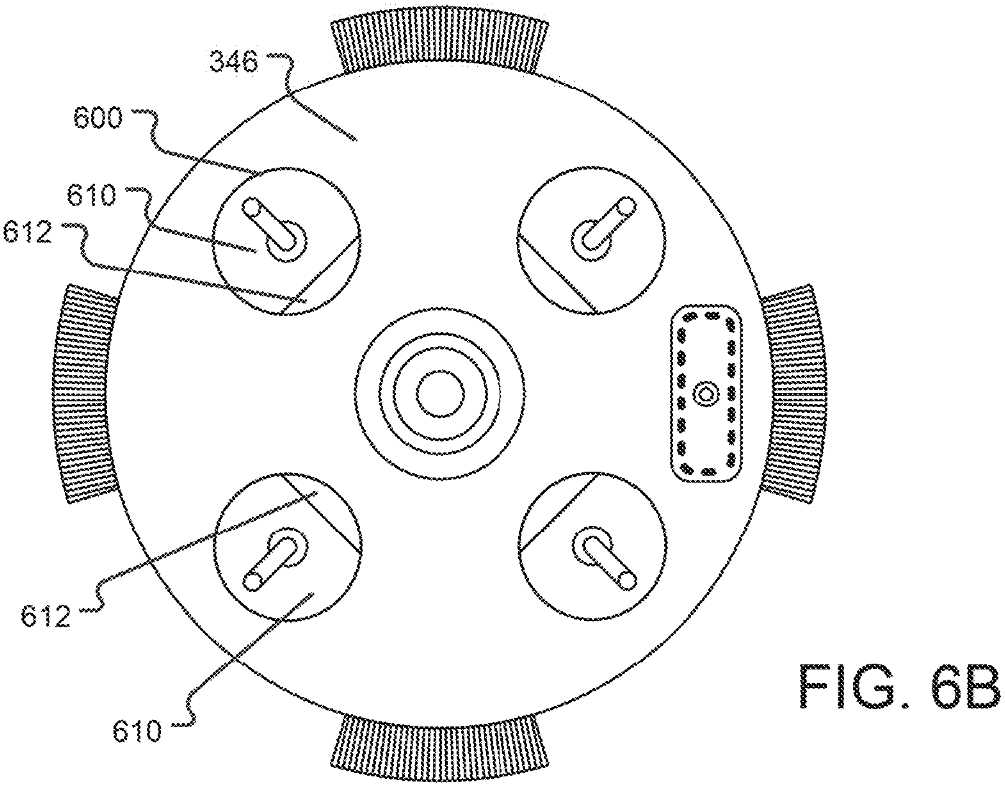
Figure 6C:
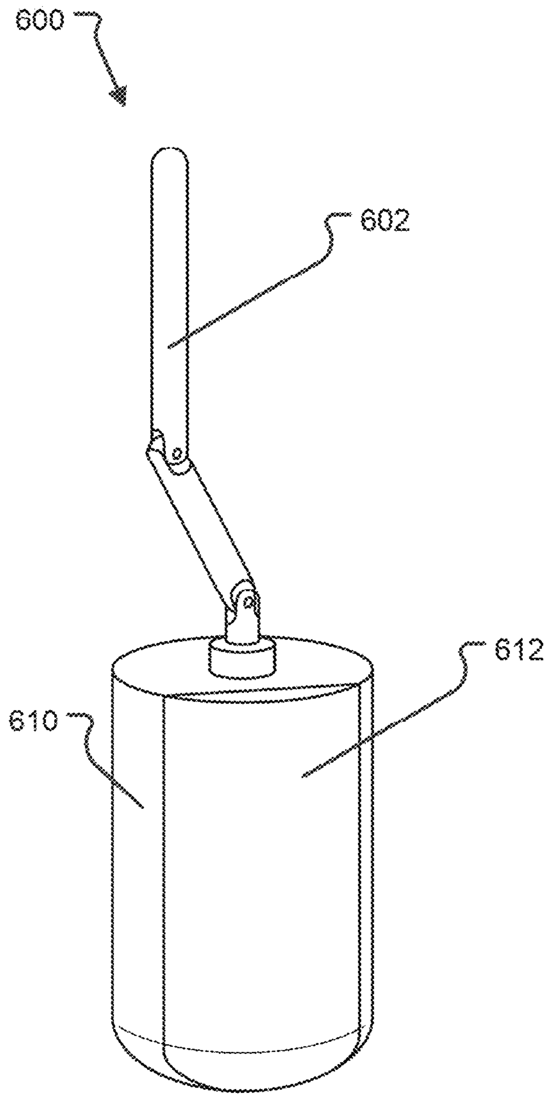

FIGS. 6A, 6B and 6C illustrate an embodiment of the control drums and their use as reactivity control devices. Each control drum 600 includes a retracting and rotating arm 602 as shown in FIGS. 6A and 6C. By manipulating the arm 602, a drum 600 may be lowered and raised in its drum space provided in the reflector assembly and, in an embodiment, may be removed completely. In an embodiment, the arm 602 is also capable of rotating the drums by any amount and in either direction.

In the embodiment shown, the drums are made of a reflector material 610, such as described above, and are provided with a face 612 of absorbing material. In an embodiment, the absorbing material is $B_4C$, however any suitable neutron absorbing material may be used. Other neutron absorbing materials include: cadmium, hafnium, gadolinium, cobalt, samarium, titanium, dysprosium, erbium, europium, molybdenum and ytterbium and alloys thereof. Some other neutron absorbing materials include combinations such as $Mo_2B_5$, hafnium diboride, titanium diboride, dysprosium titanate and gadolinium titanate.

In an embodiment, similar to the construction of the neutron reflector, the drums are made by creating an outer structure or container, such as of steel, and then filled with the appropriate material in the appropriate section. For example, in an embodiment the drum structure is provided with two volumes one filled with one or more neutron absorbing materials and one filled with one or more neutron reflecting materials.

As discussed above, the rotation of the control drums changes the distance between the absorbing face and the reactor core and also changes the amount of reflecting material between the absorbing material and the reactor core. FIGS. 6A and 6B illustrate the four control drums 600 in the least reactive configuration in which the absorbing faces 612 of each of the four drums are as close as possible to the active core. FIG. 6A illustrates the four drums while FIG. 6B is a plan view of reactor system 300 showing the four drums 600 within the vessel head. This serves to reduce the density of neutrons in the reactor core to the greatest extent possible. In the design of the reactor, the relative size, amount and distance from the core of the absorbing material in this configuration is sufficient to make the reactor subcritical. In an embodiment, the control drums are sized so that they can maintain subcriticality in all possible shutdown conditions and states when rotated into the position shown in FIG. 6B.

Figure 6D:
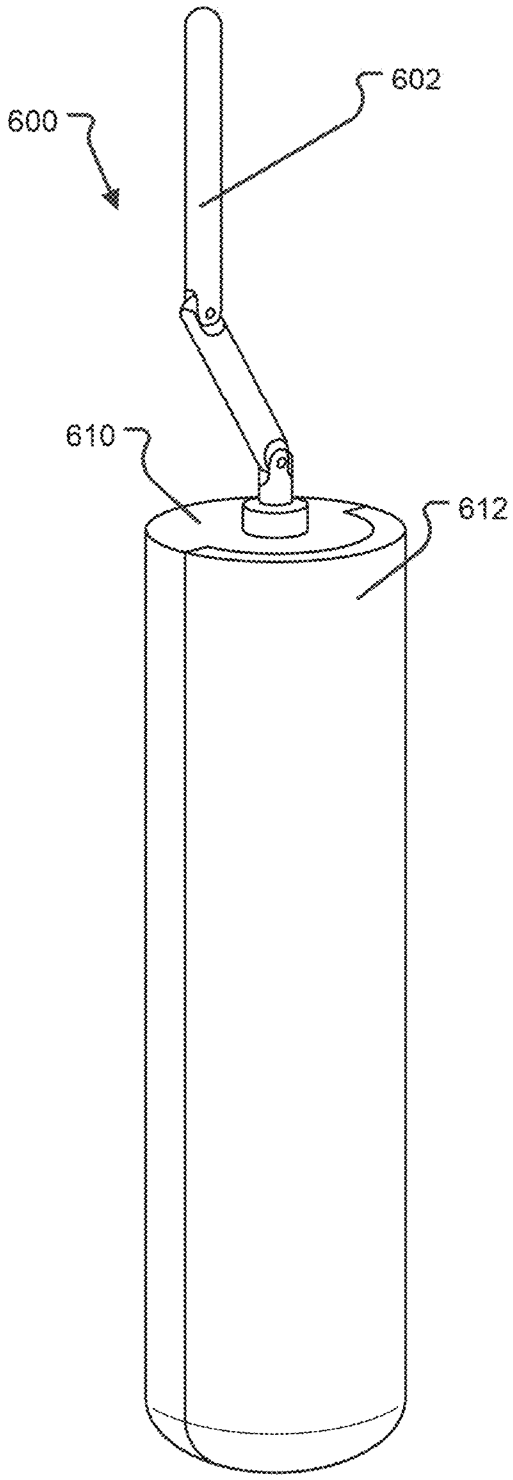

FIG. 6D illustrates two views of an alternative embodiment of the control drums having a different design for the absorbing face 612. In this embodiment, the absorbing face 612 is a layer of uniform thickness that extends around roughly half of the drum 600 inside a drum structure that is otherwise filled with reflector material.

FIG. 7 illustrates an embodiment of a vessel head. In the embodiment shown, the vessel head 700 is either a unitary piece as shown or an assembly that includes the head plate 702, wells 704 that insert into the reflector assembly for receiving the control drums, one or more apertures 706 (for example, an aperture for the flow restriction device is shown) for access to the interior of the reactor vessel, the upcomer 708 providing an annular space for the fuel salt expansion volume as discussed above, and a flange 710 to provide connection to the pump assembly. In addition, in this embodiment the pump chamber including the shield plug that protects the impeller is incorporated into the vessel head 700 so that when the vessel head is installed the pump chamber components 712 fit within the top of the central, open channel formed by the radial reflector. The vessel head 700 may be made as a single element, e.g., via 3d printing or milling from a single piece of material, or may be assembled from various elements and attached by welding or other methods. As discussed above, reflector material may be incorporated into the vessel head 700 or a separate upper axial reflector (not shown) could be provided that would be located between the head plate 702 and the reflector assembly shown in FIGS. 5A and 5B.

Figure 8:
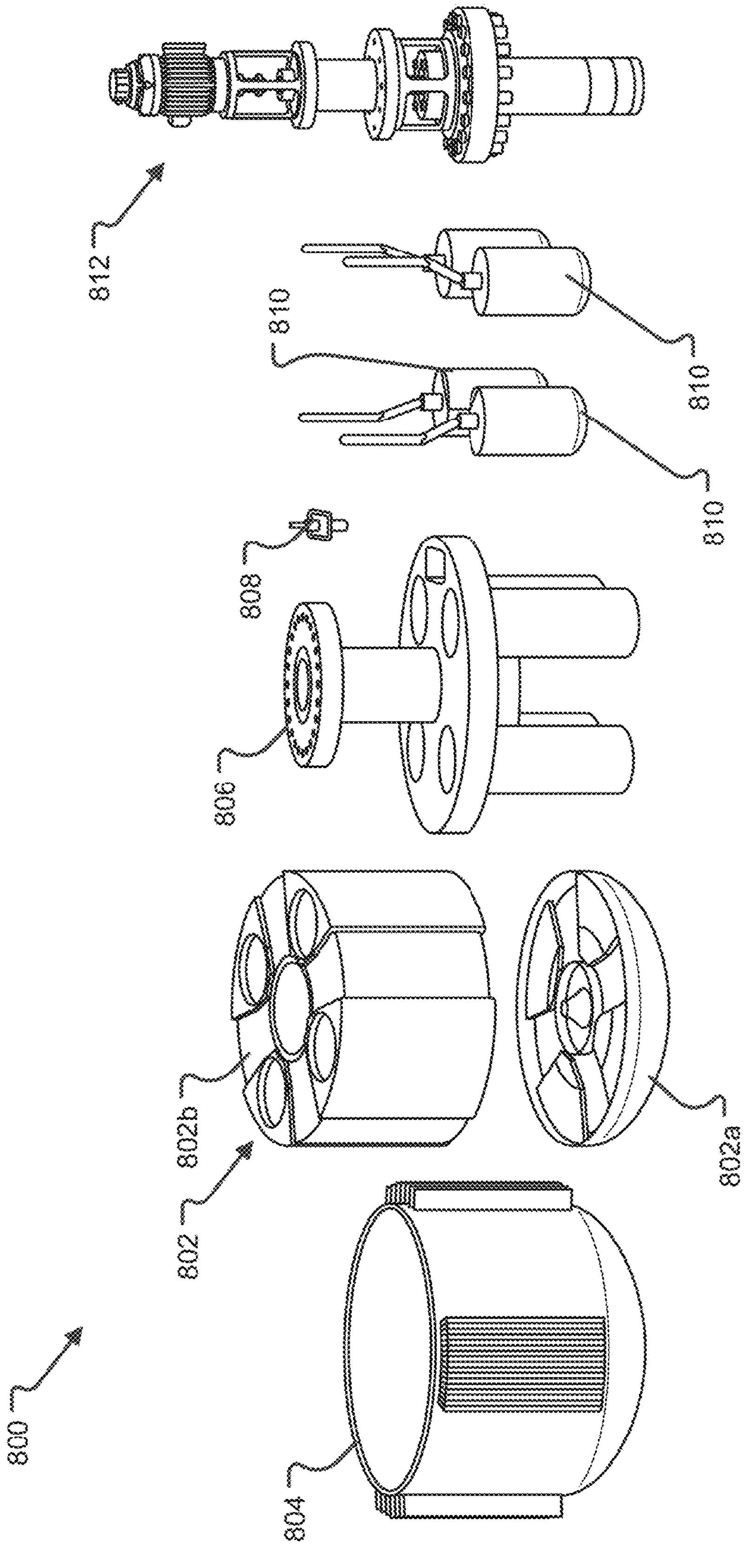
FIG. 8 illustrates the main components of the reactor (again excluding the shielding vessel).

FIG. 8 illustrates the main components of an embodiment of the reactor system in a disassembled view. In the embodiment shown, the reactor system 800 include the reactor vessel 804, the reflector assembly 802 (in two parts: the lower axial reflector 802*a* and the radial reflector 802*b*), the vessel head 806, the flow restrictor(s) 808, the control drums 810, and the pump assembly 812. Each component can be independently manufactured off site and then shipped and easily assembled at the desired location. Because the reactor system 800 is designed as a low power reactor, the main components may be kept relatively (for a nuclear reactor) small, allowing for ease of manufacturing, transport, assembly, maintenance, and replacement.

Figure 9:
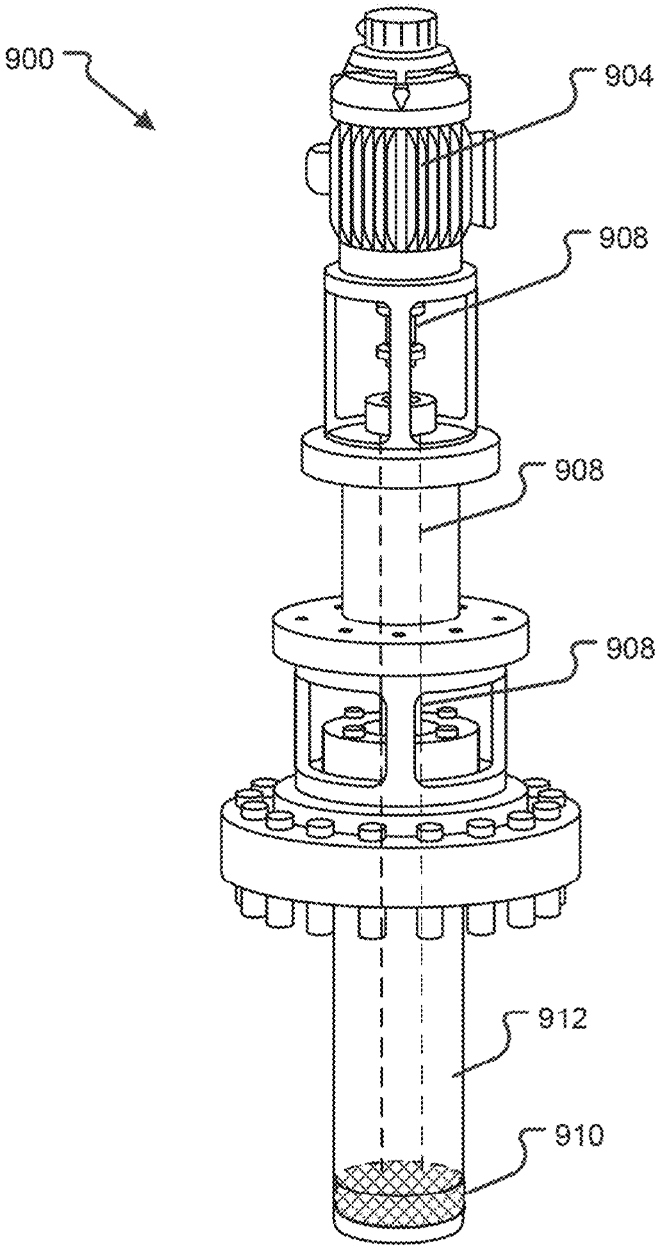
FIG. 9 illustrates an embodiment of a fuel pump assembly.

FIG. 9 illustrates the fuel pump assembly 900. As discussed above, the pump assembly 900 includes a motor 904, shaft 908, and impeller 910. The motor is distanced from the reactor core by a motor support structure 906 which the shaft 908 traverses. The fuel salt pump 900 is attached to the vessel head via flange 902. In the embodiment shown, the pump assembly 900 includes a fluid column 912 between the flange 902 and the impeller 910. When installed, the fluid column 912 is inserted into the upcomer of the vessel head and contains the expansion chamber. In an alternative design, the housing is replaced with a support structure that provides the upper portion of that pump stator.

As shown, this pump is a vertical, cantilevered (no salt-wetted bearing) pump having an integrated fluid column 912 with controlled cover gas pressure and a double-mechanical seal. In the embodiment of the pump assembly shown, the impeller 910 is facing downward in a so-called 'end suction' configuration. This orientation supports the layout of the reactor system with the pump pulling flow from above the center of the reactor core and pushing it radially out to the four flow channels. This orientation of the impeller is possible by providing that the fluid column 912 is in fluid communication with the suction side of the pump such that cover gas pressure on the liquid in the column and hydrostatic pressure from the fuel salt above the impeller 910 can be used to provide necessary net positive suction head (NPSH) for the pump. In an embodiment, the system may be run under positive cover gas pressure (i.e., at a pressure greater than 1 atmosphere) to ensure proper operation of the pump.

Given the need to direct the pump discharge from the volute and spread it into one or more high aspect ratio channels (i.e., the four upper, heated fuel salt exit channels 414), the pump incorporates a stator region with curved vanes to smoothly redirect the flow (see FIG. 4). This increases efficiency and impeller 910 stability as compared to a single volute/single exit configuration.

FIG. 10 illustrates a reactor vessel 1004 with dimples 1006 on the exterior surface instead of fins for improved heat transfer. As mentioned above, any heat transfer element may be used to improve the transfer of heat between the reactor vessel 1004 and the coolant at any location where coolant is flowed across the exterior of the reactor vessel. Although not shown, the same is true for the fuel salt and any form of heat transfer element may also be provided on the interior surface of the reactor vessel to improve transfer of heat between the molten fuel and the reactor vessel.

The reactor vessel may also vary in thickness such that it is thicker at locations where heat transfer between the interior of the reactor vessel and the coolant are not desired and thinner in the heat transfer regions. For example, with reference to FIG. 3C the thickness of the reactor vessel 304 where the fins 326 are attached may be thinner than the thickness at any other location of the vessel 304. It should also be noted that the reactor vessel 304 and/or shield vessel 305 may be a single, unitary construction of one material, e.g., steel, or may be a multilayer construction. For example, the reactor vessel may include a structural steel layer with an interior cladding of a different material selected based on its resistance to corrosion by the fuel salt.

FIGS. 11A-11G illustrate different views of an alternative embodiment of a low power reactor system 1100. Like the systems above, the reactor system 1100 includes a reactor vessel 1104 containing a reflector assembly 1120 that defines a reactor core 1102 within the reactor vessel 1104. The reflector assembly 1120 again includes a lower axial reflector 1122, an upper axial reflector 1144, and a radial reflector 1124.

Figure 11A:
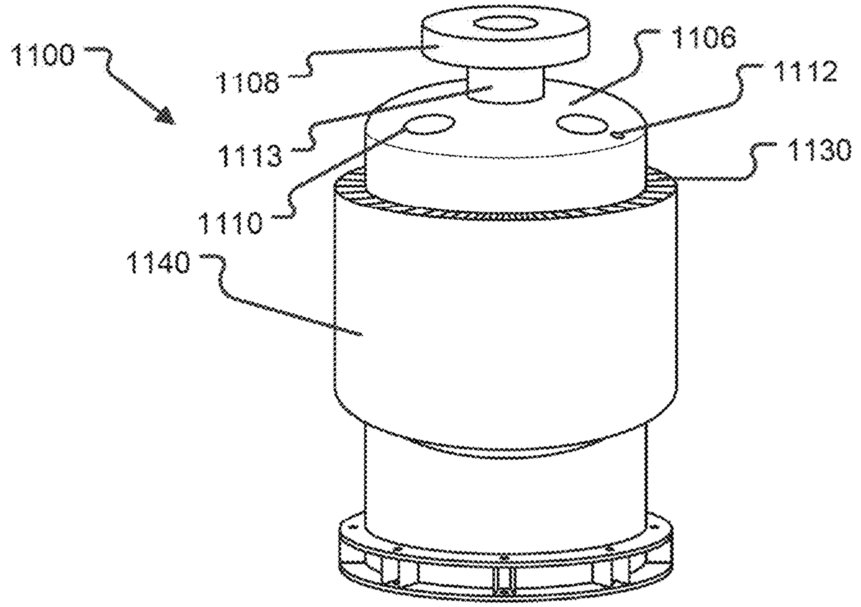
FIGS. 11A-11F illustrate different views of an alternative embodiment of a low power reactor system.
Figure 11B:
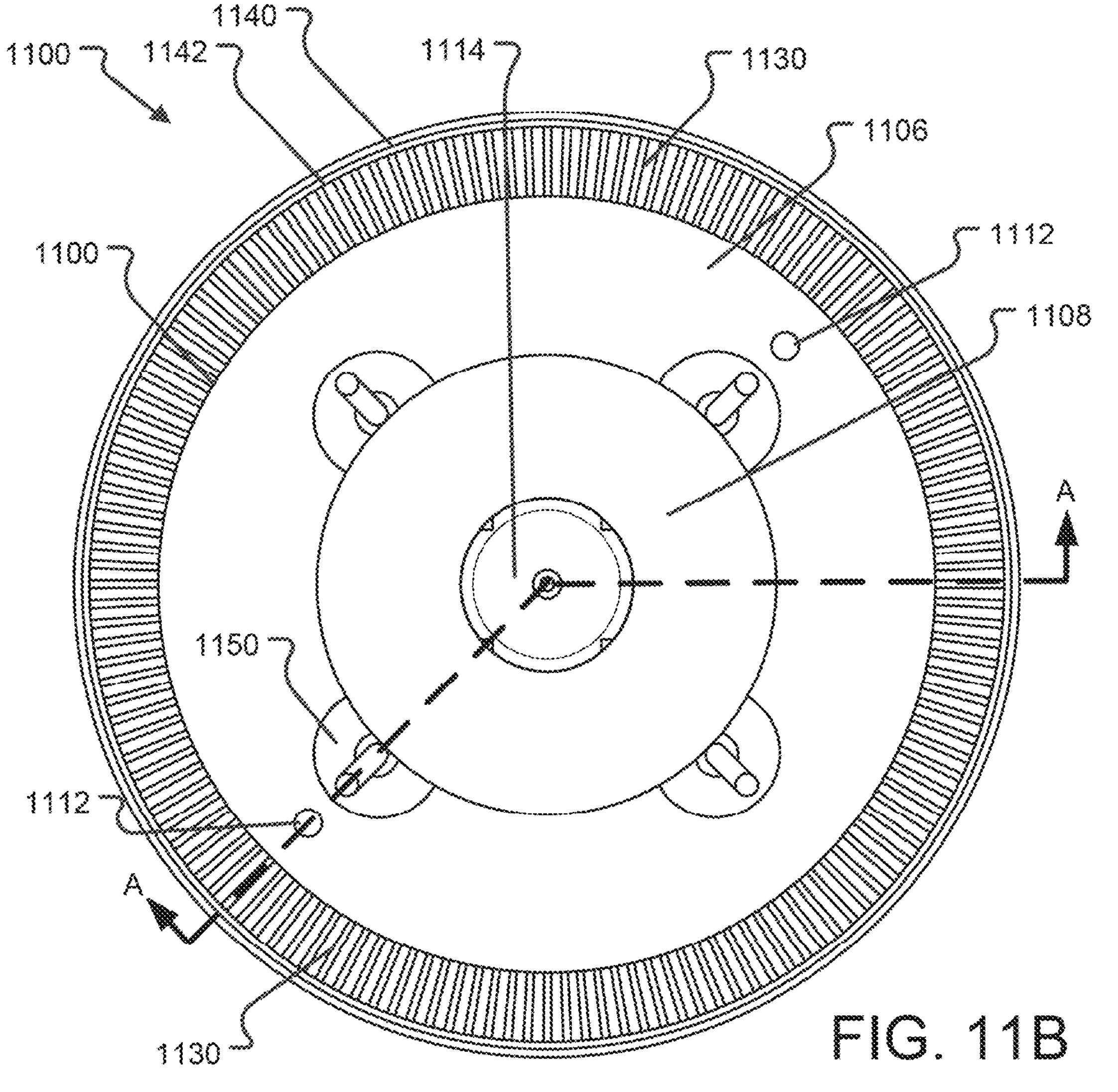
Figure 11C:
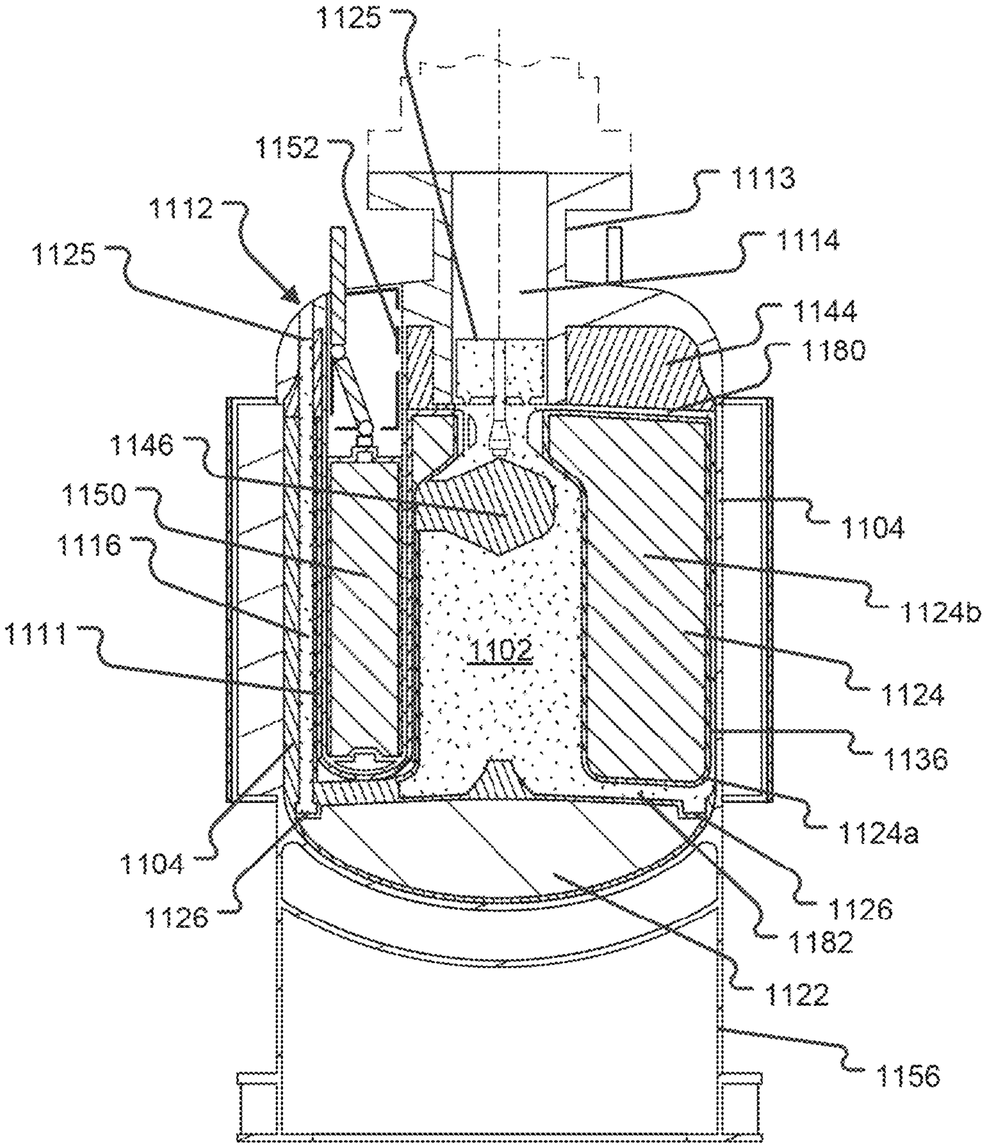

FIG. 11A illustrates an isometric view of the reactor system 1100 showing details of the exterior of the vessel head 1106. FIG. 11B is a plan view of the reactor system 1100. FIG. 11C is a cutaway view of the reactor system 1100 along the section A-A identified in FIG. 11B. Not all parts are referenced in all FIGS.

The vessel head 1106 is similar to that described above and includes a flange 1108 for connection with the pump assembly and an upcomer 1113 containing an expansion chamber 1114. In the vessel head 1106, control drum apertures 1110 giving access to control drum wells 1111 for the control drums are shown along with a fuel port access aperture 1112. In the embodiment shown, the fuel port access aperture 1112 allows the reactor vessel 1104 to be charged and discharged with fuel. The fuel port access aperture provides access to a dip tube 1116 that extends from the vessel head 1106 to the lower axial reflector 1122. In the embodiment shown, the lower end of the dip tube 1116 ends in a collection channel 1126 defined by the lower axial reflector 1122. The collection channel 1126 is the lowest point in the reactor vessel 1104 that is not filled with a displacement element. By connecting the dip tubes 1116 to the collection channel 1126, the reactor system may be easily drained of liquid by pressurizing cover gas of the reactor system 1100. The free surface level 1125 of the molten fuel falls by gravity and collects in the lowest point of the reactor system 1100 accessible by the molten fuel.

In an embodiment, the free surface level 1125 of fuel salt in the reactor system 1100 may be monitored by monitoring the level in dip tube 1116. This removes the need to have monitoring devices incorporated into the upcomer 1113. The measurement may be done using a laser level monitor, conductance monitor, or any other device as is known in the art.

Access via the dip tube 1116 also allows reactivity control through the insertion of liquid absorbers. Liquid absorbers are known in the art and may be added to the molten fuel through a dip tube 1116 in situations where reduced reactivity is desired. For example, lithium is an absorbing material and certain lithium salts are liquid in the operational temperature range contemplated for the reactor system 1100.

In the embodiment shown, the reactor system 1100 differs from the systems shown above by having larger heat exchange ducts 1136 such that almost all of the interior surface of the reactor vessel is in direct contact with the fuel salt and acts as the heat transfer region. As shown in the plan view of FIG. 11B, the fins 1130 on the exterior of the reactor vessel 1104 extend the entire circumference of the vertical walls of the reactor vessel 1104. Likewise, heated fuel salt flows over nearly all of the interior surface of the reactor vessel 1104 opposite the fins 1130. In the embodiment shown, four stand-off ridges 1134 are proved on the exterior of the radial reflector 1124 that contact the reactor vessel, keep the radial reflector centered therein, and, form the lateral boundaries of the four heat exchange ducts 1136. The stand-off ridges 1134 may be solid and continuous, thus separating fuel salt flow between adjacent heat exchange ducts 1136. In an alternative embodiment, the stand-off ridges 1134 may be discontinuous, for example being a series of individual contact points, in which the fuel is allowed to flow between what would otherwise be considered adjacent fuel salt ducts 1136. In yet another embodiment, instead of four stand-off ridges 1134, the radial reflector 1124 may be provided with some number of individual stand-off elements spaced about the exterior of the radial reflector such that the fuel salt flows over substantially all of the exterior surface of the radial reflector 1124.

Figure 11D:
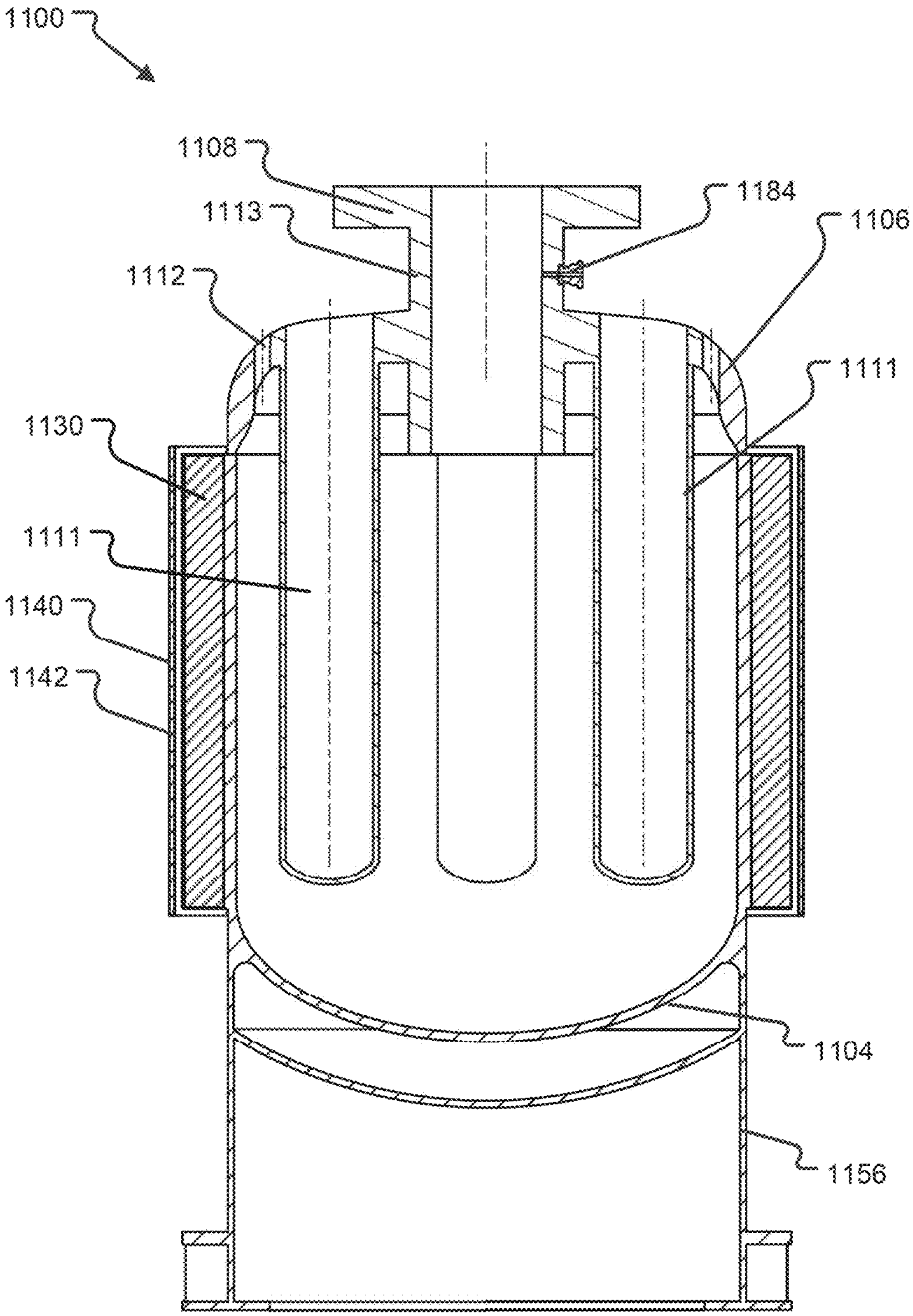

FIG. 11D is a sectional view through the center of the reactor system 1100 illustrating some of the enclosure components in more detail. In the embodiment shown, the finned region on the vertical sides of the reactor vessel 1104 are enclosed in a jacket 1140 through which the coolant is flowed. In an embodiment, the vertical exterior wall of the jacket 1140 is provided with a layer 1142 of either reflecting or absorbing material for additional safety. An overflow port 1184 is provided in the upcomer 1113 in case of overfilling of the reactor system 1100.

Figure 11E:
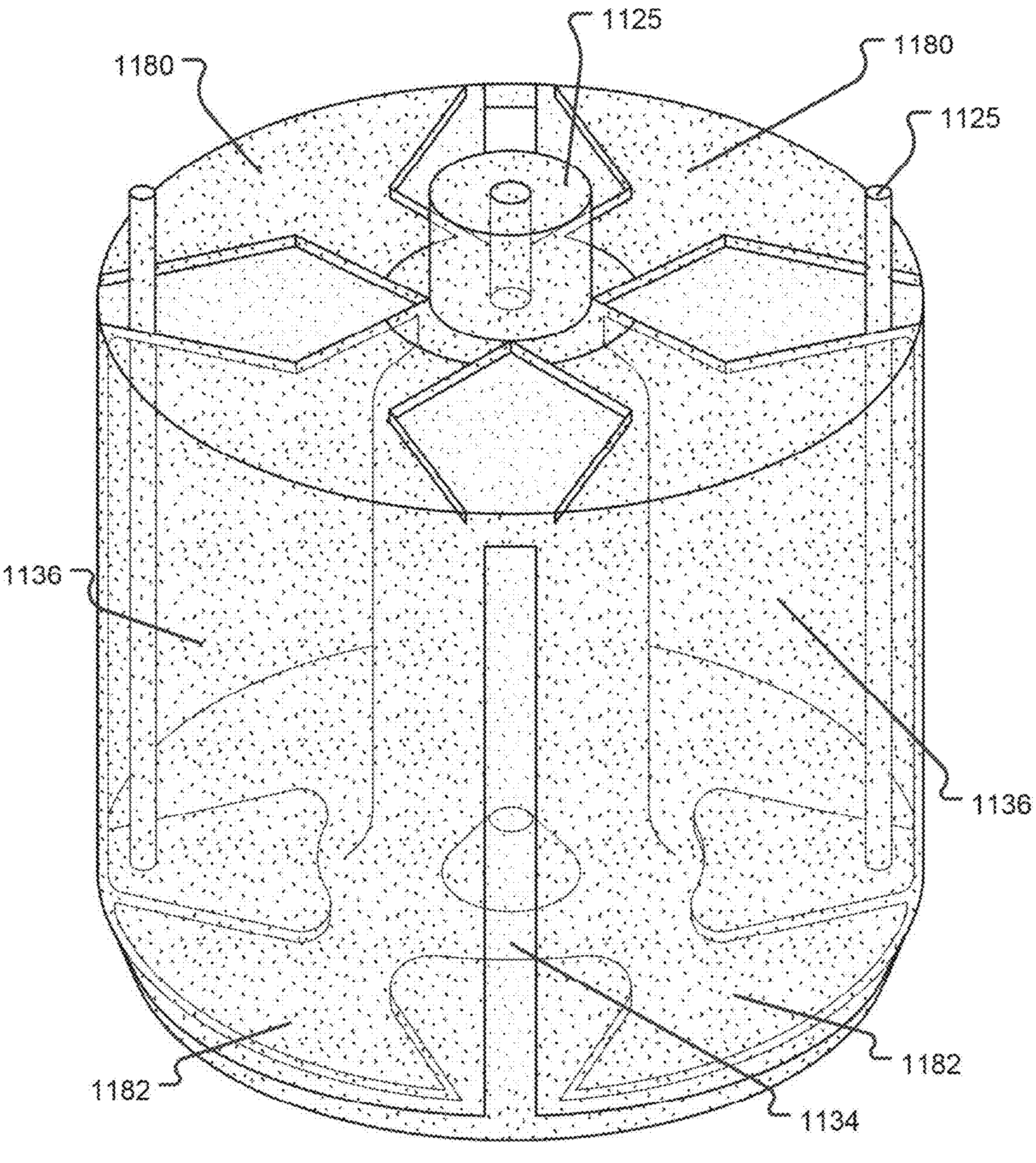
Figure 11F:
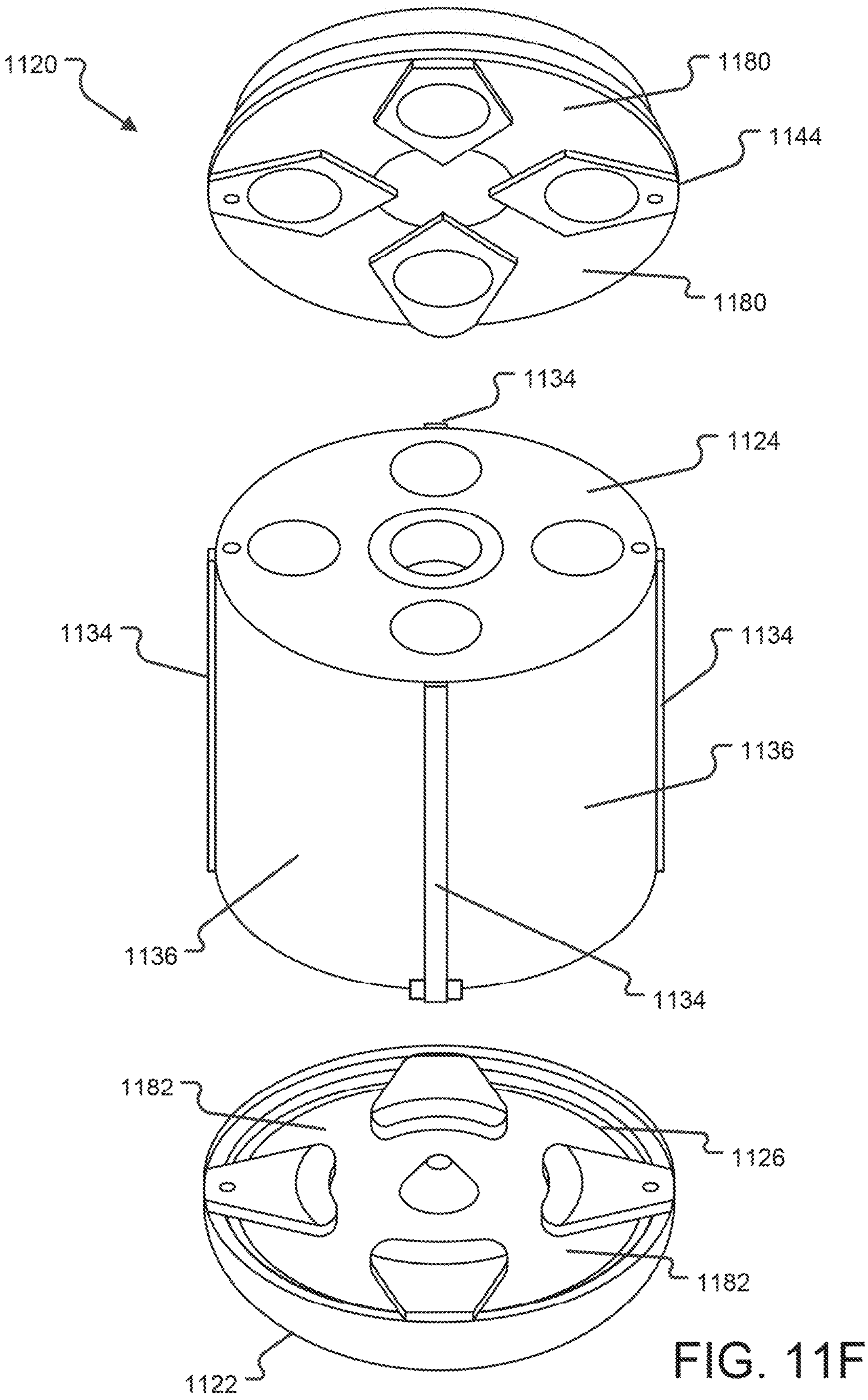

FIG. 11F illustrates the top isometric view of the lower axial reflector 1122 and the radial reflector 1124 and a bottom isometric view of the upper axial reflector 1144 so that the resulting channels defined by the reflector assembly 1120 are readily apparent. The fuel salt facing surfaces are contoured to define the heated fuel salt exit channels 1180 over the top of the radial reflector 1124 and the cooled fuel salt delivery channels 1182 that return cooled salt from contact with the reactor vessel 1104 to the reactor core 1102. FIG. 11E illustrates the shape of the fuel salt volume within the reactor vessel that is the result of the displacement elements shown in FIGS. 11C and 11F.

FIG. 11C provides additional details in embodiments of the reflector assembly components. For example, the radial reflector 1124 is illustrated as a radial reflector shell **1124*a* containing a reflector material 1124*b*. In an embodiment, the reflector shell 1124*a* is made of INCONEL™ 625 and the reflector material 1124*b* includes magnesium oxide. The lower axial reflector 1122 is likewise illustrated as a shell 1122*a* and interior filled with a reflector material 1122*b***.

Other aspects of the reactor system 1100 are similar to those described for the above systems. For example, four control drums 1150 are provided for reactivity control that function similar to those described above. A backfill reflector plug 1152 over the control drum 1150 is further illustrated in FIG. 11C.

The overall pump design including the use of a protective plug 1146 between the impeller and the reactor core are also similar to those described above. In the embodiment shown in FIG. 11C, the plug 1146 is made of shield material and incorporated into the radial reflector 1124. A lower skirt 1156 is provided that supports the bottom of the reactor vessel 1104.

Figure 12A:
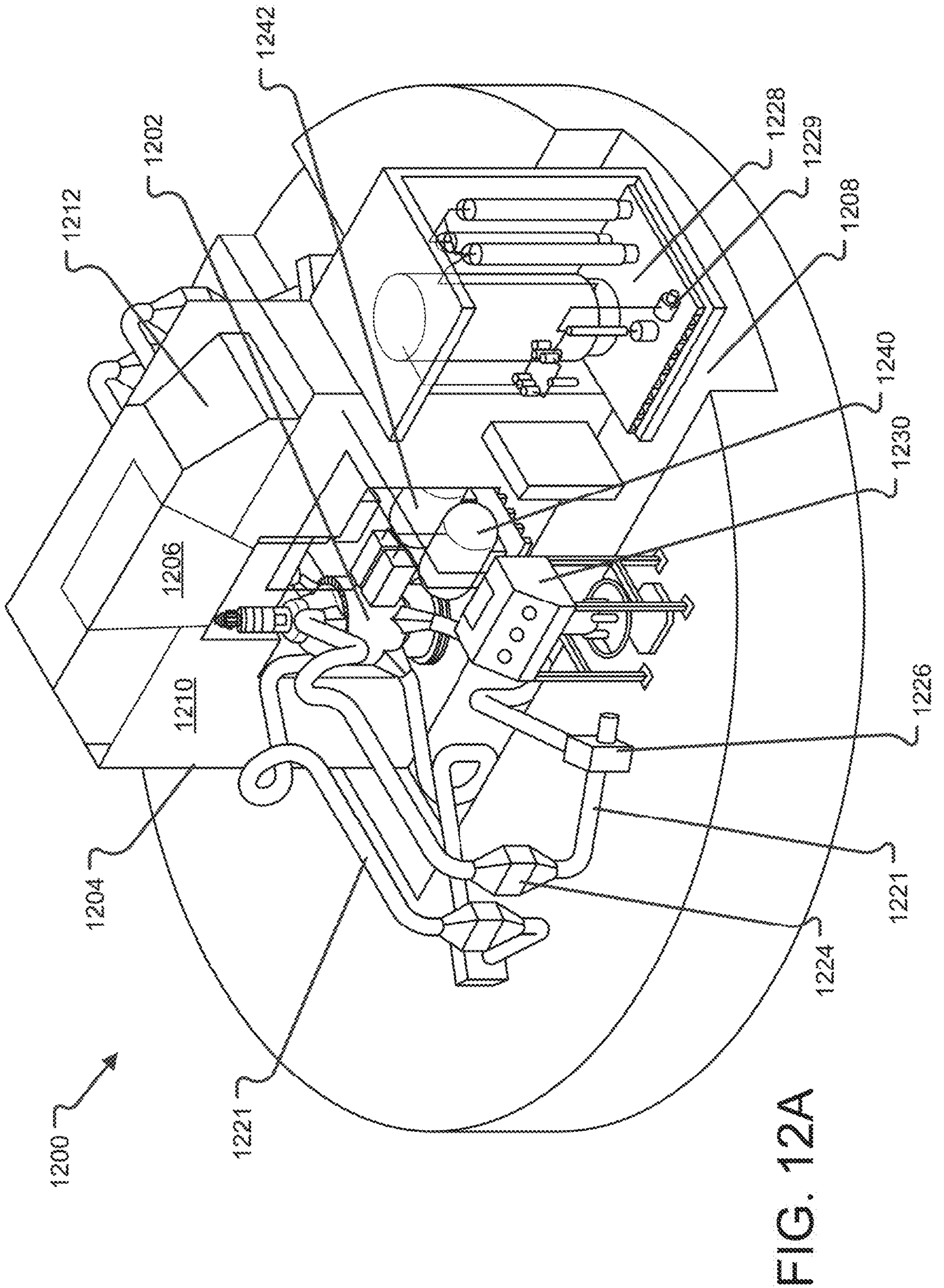
FIGS. 12A-12C illustrate an embodiment of reactor facility with an alternative primary cooling system and secondary cooling system instead of a heat rejection system.
Figure 12B:
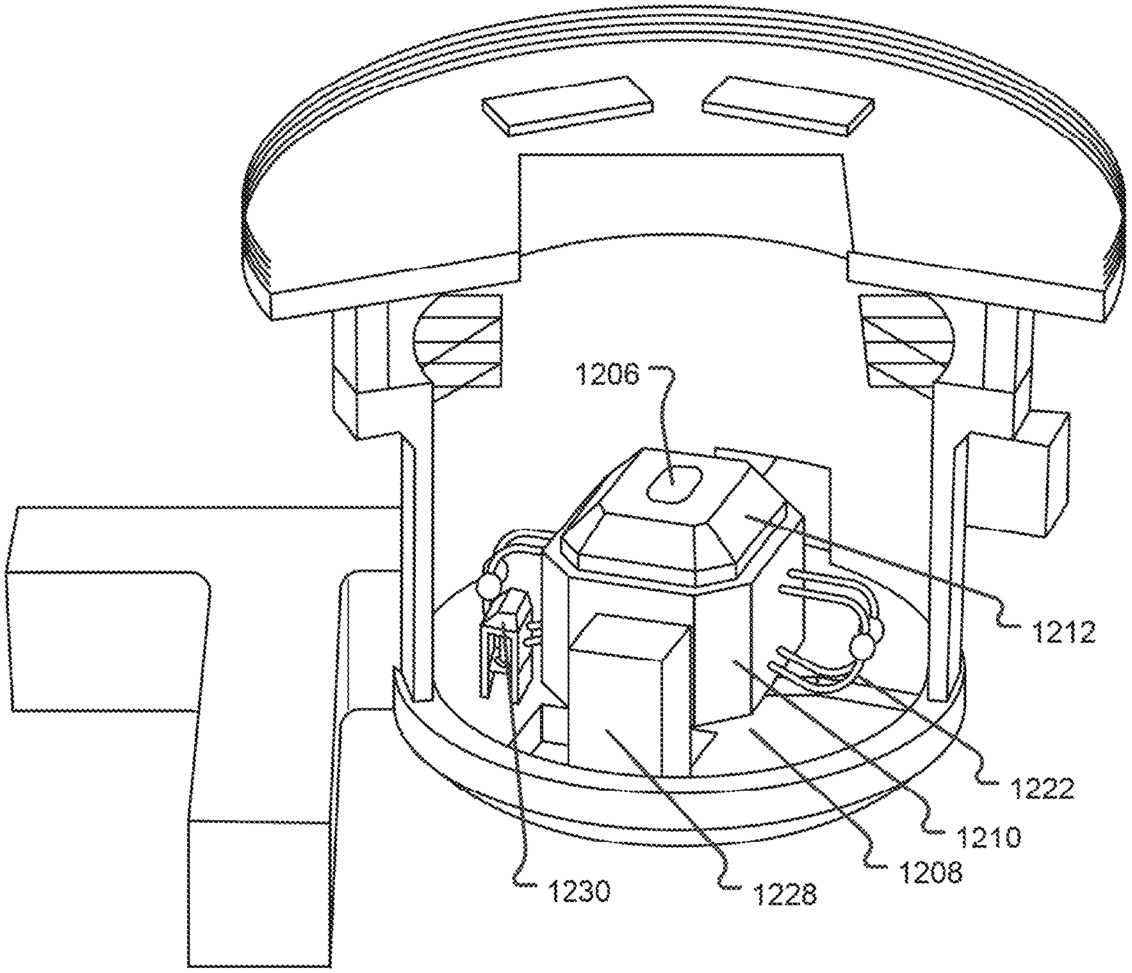
Figure 12C:
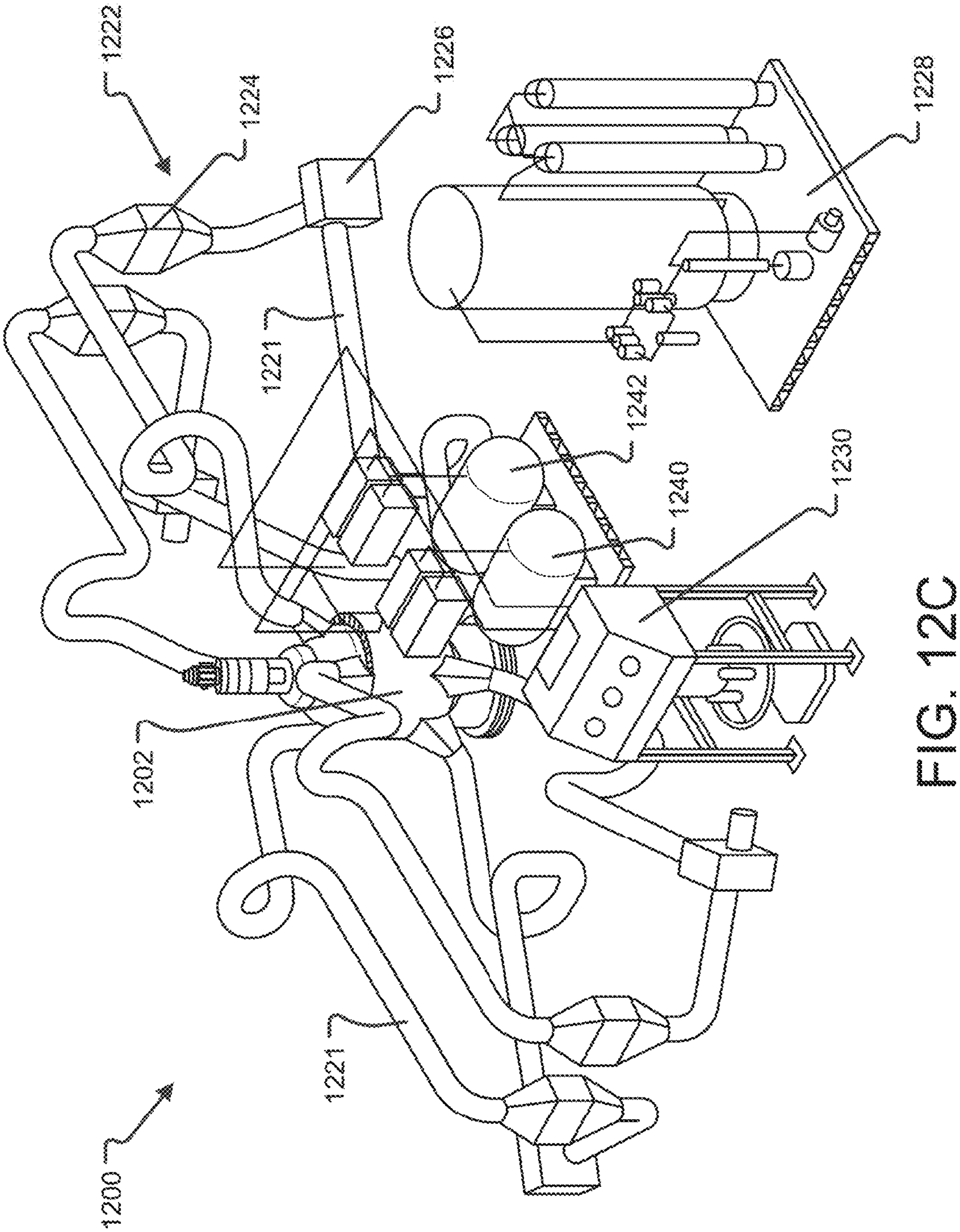

FIGS. 12A-12C illustrate an embodiment of reactor facility 1200 with an alternative primary cooling system and secondary cooling system instead of a heat rejection system. In the embodiment shown, the reactor system 1202 is contained with a shield assembly 1204. The shield assembly 1204 includes a removable top plug 1206 through which the reactor system 1202 may be accessed. In the embodiment shown, the shield assembly 1204 includes a base 1208, a rectangular side wall component 1210, and a top 1212 having the removable plug 1206. In the embodiment shown, coolant ducts 1221 of the cooling circuits 1222, molten salt piping, and other piping and electrical elements penetrate the shield assembly 1204 at various locations.

FIGS. 12A-12C illustrate an alternative layout for a primary cooling system 1220. The primary cooling system 1220 is again illustrated as having four independent cooling circuits 1222. In the embodiment shown, nitrogen is the primary coolant and each cooling circuit 1222 includes a heat exchanger 1224 and a blower 1226. In the embodiment shown, the heat exchangers 1224 transfer heat from the primary coolant to a facility heating system (not shown). Alternatively, the reactor system's heat could be rejected to the environment as described above.

A cover gas management system 1228 is illustrated near the shield assembly 1204. As discussed above, the cover gas management system 1228 maintains the pressure of the cover gas in the headspace above the fuel salt in the vessel head and also cleans the cover gas. The system 1228 may include a pump or blower 1229 for pressure control and any number of vessels for raw gas storage, contaminant removal and contaminant storage. Cover gas management systems are known in the art and any suitable configuration or type may be used.

A reactor system controller 1230 is also illustrated near the shield assembly 1204. The controller 1230 monitors and controls the operation of the reactor system 1202.

A flush salt drain tank 1240 and a fuel salt overflow/drain tank 1242 are shown. The flush salt (e.g., a non-nuclear salt compatible with the fuel salt) may be used to prepare the reactor system for receiving the fuel salt. Flush salt may also be used to flush the reactor system 1202 after removal of the fuel salt. Flush salt may be further be used to dilute the fuel salt to reduce the fuel salt's fissile material density and, thus, its reactivity.

The reactor facility includes a reactor building as shown in FIG. 12B. Again, a removable access panel is provided in the top of the building to access the reactor system 1202, the shield assembly 1204 and the components with the reactor room as illustrated.

Figure 14A:
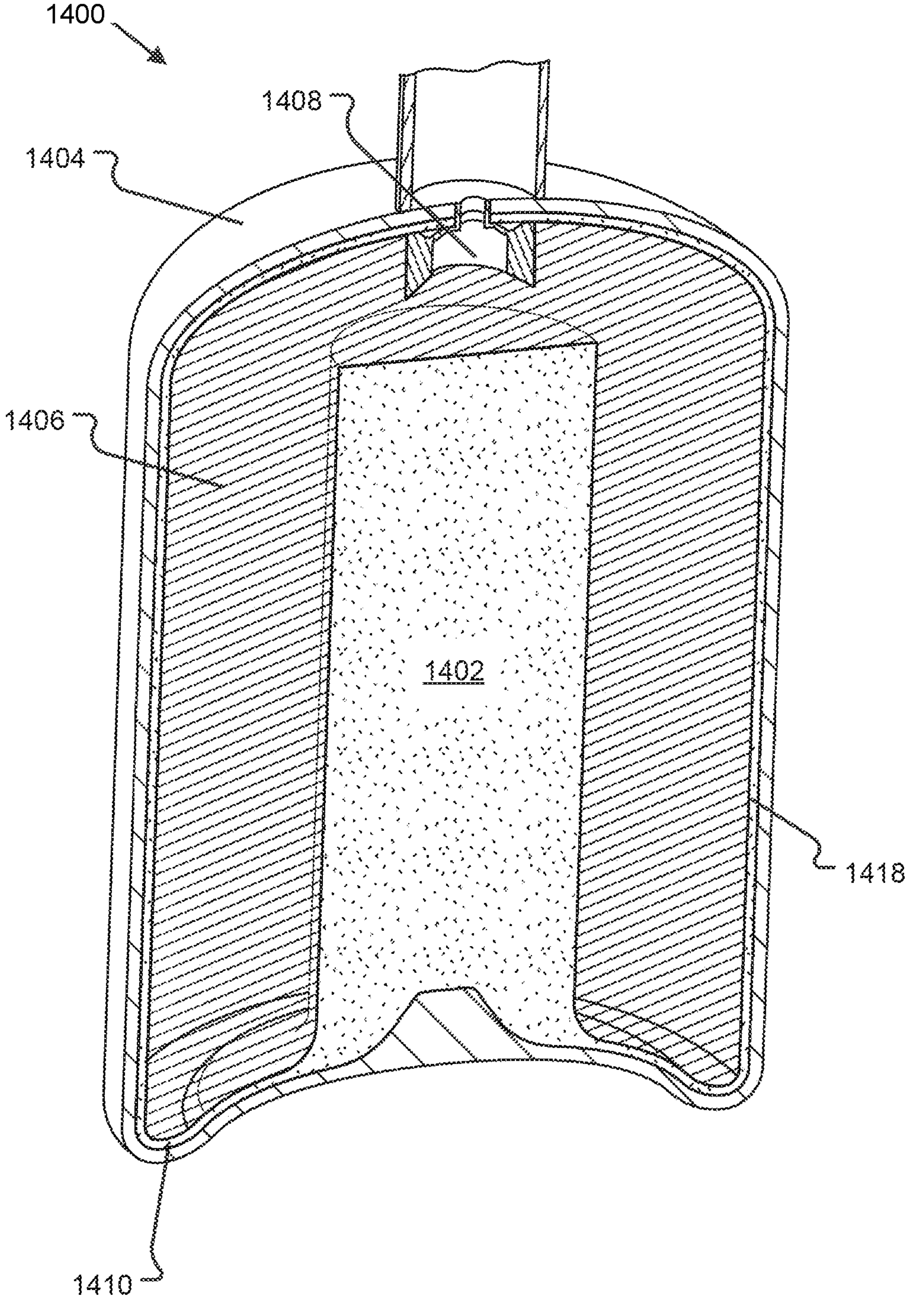

FIGS. 14A-14B illustrate yet another embodiment of a pool-type reactor system 1400. FIG. 14A illustrates the molten fuel volume in a reactor vessel 1404. Similar to the above described systems, a central cylindrical reactor core 1402 is defined by an internal radial reflector 1406 (illustrated in silhouette as the empty space between the fuel salt and the reactor vessel) inside and spaced away from the reactor vessel 1404. A pump chamber 1408 is provided internal to the reactor vessel 1404 that includes an impeller rotated by an external motor and a stator.

However, in the reactor system 1400 in FIGS. 14A-14C there is no upper or lower axial reflectors inside the reactor vessel 1404. Instead, when not in the reactor core 1402 or the pump chamber 1408 the flow of the molten fuel follows the interior surface of the reactor vessel 1404 in one or more channels 1418 defined by the space between the radial reflector 1406 and the reactor vessel 1404. In the embodiment shown, molten fuel flows up through the reactor 1402 into the pump chamber 1408. Rotation of the impeller discharges the molten fuel upwardly and radially against the reactor vessel 1404, forcing the flow along the top of the interior of the reactor vessel 1404. The molten fuel flow then follows the interior surface of the reactor vessel 1404 radially outward, then downward along the heat transfer region of the vertical portion of the reactor vessel 1404. At the bottom of the reactor vessel 1404, the vessel 1404 is shaped to provide a collection channel 1410 near the exterior diameter of the vessel 1404 and further provided with a flow controlling conical shape that delivers the molten fuel into the bottom of the reactor core 1402. Thus, the shape of the bottom interior surface of the reactor vessel 1404 forms the return flow channel for the molten fuel.

Internal supports and flow control elements may be provided such as shown in FIG. 14B. FIG. 14B illustrates an internal vane 1412 for directing molten fuel flow out of the pump chamber 1408 along the interior surface of the reactor vessel 1404. Other flow conditioning elements such as baffles, orifice plates, or vanes may be provided to direct and control the molten fuel flow as needed. Furthermore, as discussed above, internal supports may be provided at any location to center and fix the radial reflector 1406 within the reactor vessel 1404. Such supports may also be used to control flow of the molten fuel.

Additional external reflectors may be provided external to the reactor vessel to improve the neutronics of the reactor system 1400. For example, an external lower axial reflector may be provided below the reactor vessel 1404. Likewise, an external upper axial reflector may be provided above the reactor vessel 1404.

FIG. 15 illustrates two alternative embodiments of the upper molten fuel exit channel and pump layout that could be used in any reactor system embodiment described herein. FIG. 15 illustrates a section of a reactor system 1500 showing an upper portion of a radial reflector 1501 surrounding a reactor core 1502 within a reactor vessel 1504. Molten fuel flows upward out of the reactor core 1502 and around a protective plug 1506 into a pump chamber 1508. A rotating impeller 1510 in the pump chamber drives the molten fuel upwardly and radially out of the pump chamber 1508 and against the interior surface of the top of the reactor vessel 1504. The molten fuel then flows into a heated molten fuel exit channel 1512 that follows the contours of the internal surface of the top of the reactor vessel 1504. Although illustrated as a single channel allowing flow along the entire interior surface of the top of the reactor vessel 1504, as described above the channel could be divided into separate, independent channels as desired.

In the embodiment shown, an expansion volume 1514 is provided in the heated molten fuel exit channel 1512 of the reactor system 1500. The expansion volume 1514 is a location where the distance between the interior surface of the reactor vessel 1504 and the exterior of the radial reflector 1401 is increased, thereby slowing the flow of molten fuel through that portion of the heated molten fuel exit channel 1512 and, thereby, slowing the flow of molten fuel through the entire fuel circuit. The expansion volume 1514 allows for better mixing of the flow leaving the pump chamber and better diffusion of the molten fuel, resulting in a more uniform flow and temperature in the molten fuel when it enters the heat exchange duct 1516.

Figure 16:
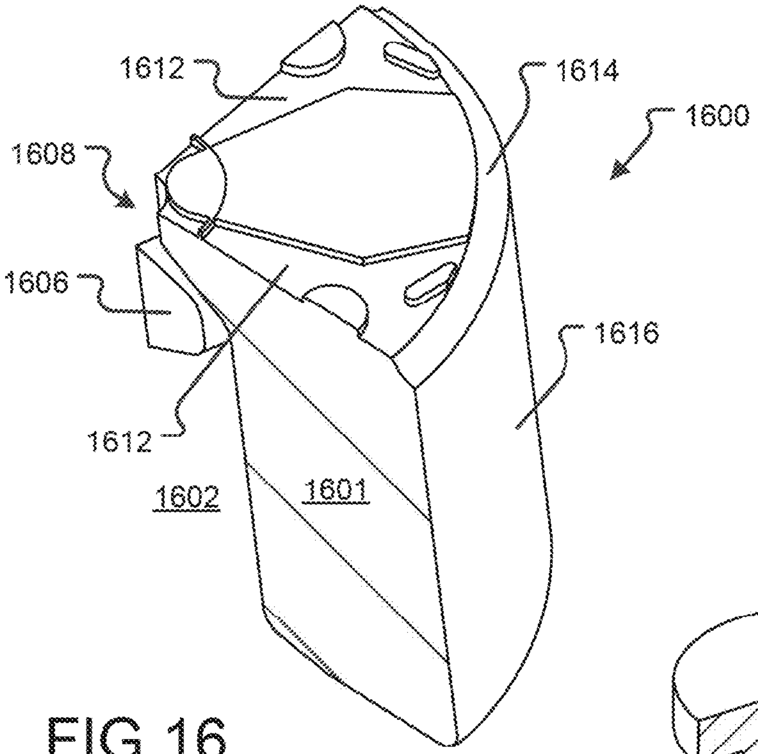
FIG. 16 illustrates yet another embodiment of an upper molten fuel exit channel and the surface elements of the radial reflector that define the channel.

FIG. 16 illustrates yet another embodiment of an upper molten fuel exit channel and the surface elements of the radial reflector that define the channel. FIG. 16 illustrates a section of a reactor system 1600 showing an upper portion of a radial reflector 1601 surrounding a reactor core 1602 within a reactor vessel (not shown). Molten fuel flows upward out of the reactor core 1602 and around a protective plug 1606 into a pump chamber 1608. A rotating impeller (not shown) in the pump chamber drives the molten fuel upwardly and radially out of the pump chamber 1608 and against the interior surface of the top of the reactor vessel. The molten fuel then flows into a heated molten fuel exit channel 1612 that follows the contours of the internal surface of the top of the radial reflector 1601.

The reactor system 1600 is illustrated as having four separate heated molten fuel exit channels 1612 that come together into a single manifold channel 1614 which then distributes the molten fuel into a single heat exchange duct 1616 that extends the circumference of the exterior lateral surface of the radial reflector 1601 and interior surface of the reactor vessel. The manifold channel 1614 allows for better mixing of the flow leaving the pump chamber and better diffusion of the molten fuel, resulting in a more uniform flow and temperature in the molten fuel when it enters the heat exchange duct 1616.

Figure 17:
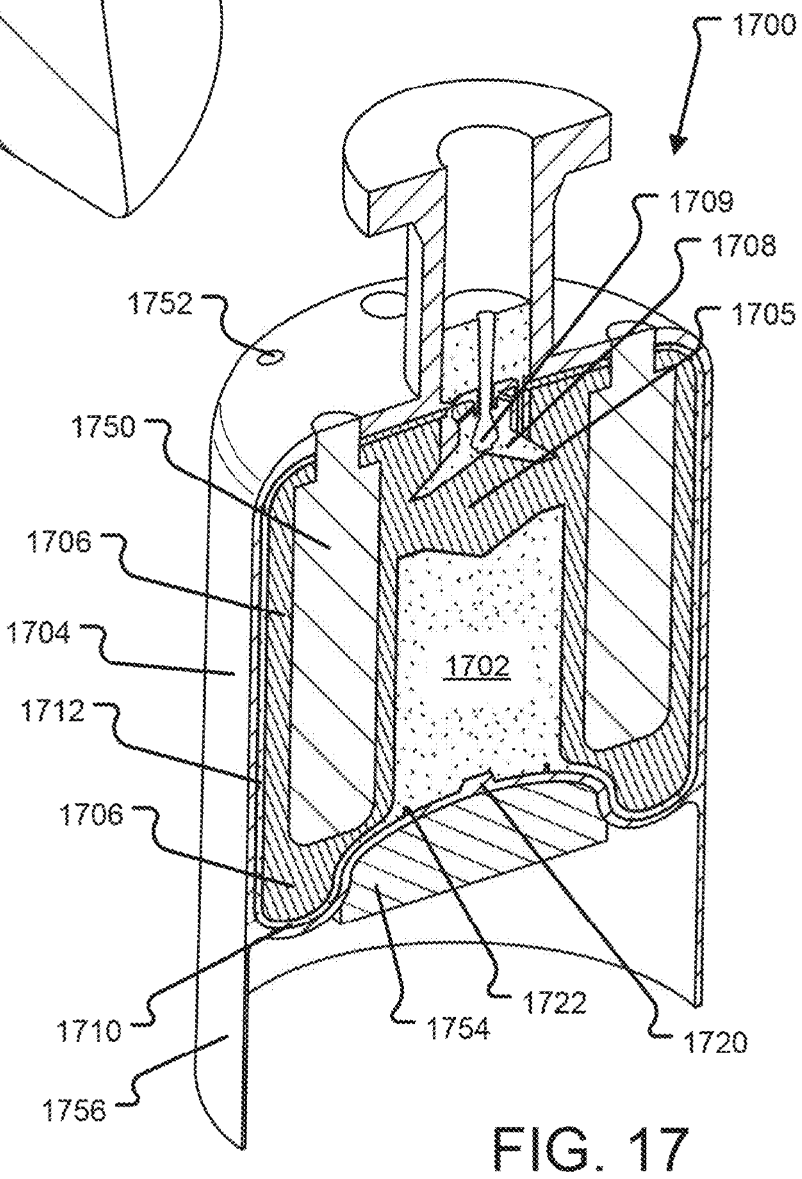
FIG. 17 illustrates an alternative embodiment of a reactor system.

FIG. 17 illustrates an alternative embodiment of a reactor system. The embodiment shown in FIG. 17 is similar to that of FIGS. 14A-14B in that except for molten fuel flow through the reactor core 1702 and pump chamber 1708, the flow paths of the molten fuel are in contact with and are defined by the interior surface of the reactor vessel 1704.

FIG. 17 illustrates the molten fuel volume in a reactor vessel 1704 in which a central cylindrical reactor core 1702 is defined by an internal radial reflector 1706 inside and spaced away from the reactor vessel 1704. A pump chamber 1708, protected from the reactor core 1702 by a reflective plug 1705, is provided internal to the reactor vessel 1704 that includes an impeller 1709 rotated by an external motor. Similar to above designs, control drums 1750 are provided within the reflector 1706 for reactivity control.

However, in the reactor system 1700, while the radial reflector 1706 could be said to include an upper axial component above the top of the reactor core 1702, there is no lower axial reflectors inside the reactor vessel 1704. Rather, an external lower axial reflector 1754 is provided as shown. In the embodiment shown, molten fuel flows up through the reactor core 1702 around the reflective plug 1705 and into the pump chamber 1708. Rotation of the impeller 1709 discharges the molten fuel upwardly and radially against the reactor vessel 1704, forcing the flow along the top of the interior of the reactor vessel 1704. The molten fuel flow then follows the interior surface of the reactor vessel 1704 radially outward, then downward along the heat transfer region of the vertical portion of the reactor vessel 1704 in a heat exchange duct 1712.

FIG. 17 illustrates that the thickness of the walls of the reactor vessel 1704 is thinner in the heat transfer region than in the other parts of the reactor vessel 1704. In FIG. 17, the wall thickness of the top the reactor vessel 1704 is substantially larger than on the sides in the heat transfer region.

At the bottom of the reactor vessel 1704, the vessel 1704 is shaped to provide a collection channel 1710 near the exterior diameter of the vessel 1704. The collection channel 1710 is in fluid communication with an access port 1752 in the top of the reactor vessel 1704 via a dip tube (not shown). The bottom of the reactor vessel 1704 is further provided with a flow controlling conical shape 1720 and a flow controlling orifice plate 1722 that delivers the molten fuel into the bottom of the reactor core 1702. Thus, the shape of the bottom interior surface of the reactor vessel 1704 forms the return flow channel for the molten fuel. The reactor vessel 1704 is further provided with an integrated skirt to support the reactor system 1700 on the floor of a reactor facility.

Extra-Terrestrial Reactor Designs

It is desirable to have power systems that can work in ultra-cold or extra-terrestrial environments, for example to provide power to a satellite, space ship, or extra-terrestrial facility such as a manned or unmanned lunar or Mars base.

Figure 13:
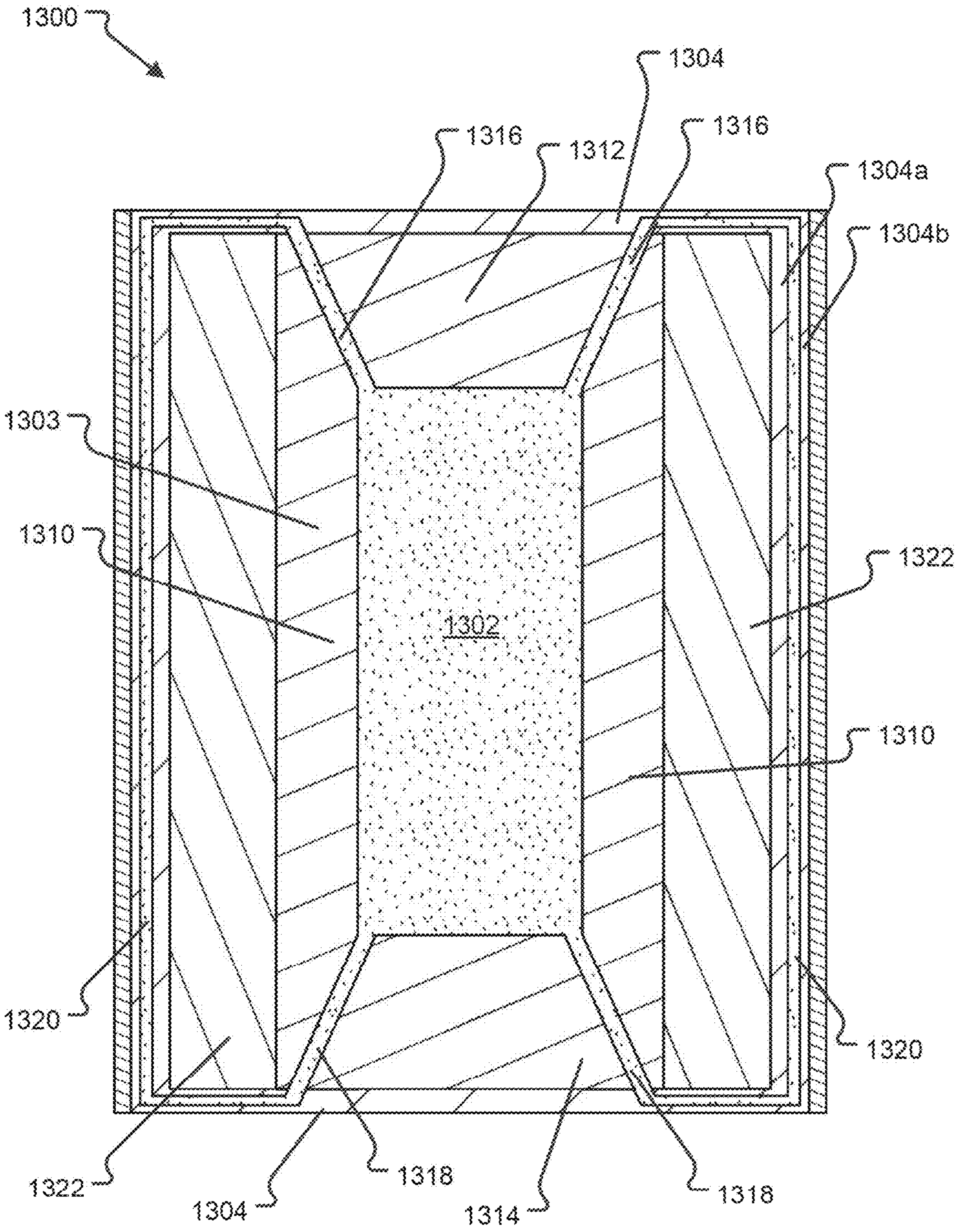
FIG. 13 illustrates a functional block diagram of pool-type reactor system designed for use with a molten nuclear fuel in an extra-terrestrial environment or another suitably cold environment.

FIG. 13 illustrates a functional block diagram of pool-type reactor system 1300 designed for use with a molten nuclear fuel in an extra-terrestrial environment or another suitably cold environment. The reactor system 1300 is generally the same design as those described above except that, instead of using a coolant to remove heat from the exterior surface of the reactor vessel, the heat is dissipated to the external environment through a solid-state, heat-to-electricity conversion system attached to the exterior of the reactor vessel. This converts the heat directly to electricity that can then be used operate equipment.

In the embodiment shown, the reactor system 1300 includes a reactor core 1302 defined by a reflector assembly 1303 contained with a reactor vessel 1304. In the simple cross section diagram shown, the reflector assembly 1303 includes a radial reflector 1310, an upper axial reflector 1312, and a lower axial reflector 1314. One or more heated fuel salt exit channels 1316 at the top of the reactor core 1302 are defined between the radial reflector 1310 and the upper axial reflector 1312. One or more cooled fuel salt return channels 1318 are defined between the radial reflector 1310 and the lower axial reflector 1314. One or more heated fuel salt ducts 1320 connect the heated fuel salt exit channels 1316 with the cooled fuel salt return channels 1318 to complete the fuel salt circuit within the reactor system.

The fuel salt circuit passes heated fuel salt along the interior surface of the reactor vessel 1304 where heat is transferred through the vessel wall to a solid-state thermoelectric generator (TEG) such as a thermionic or thermoelectric system. TEGs are known in the art and any suitable design or type may be used. TEGs produce a current flow in an external circuit by the imposition of a temperature difference (ΔT). The magnitude of the ΔT determines the magnitude of the voltage difference (ΔV) and the direction of heat flow determines the voltage polarity. International Patent Application WO 2014/114950 provides a further description of the operation of TEGs.

In an embodiment the TEG consists of a collection of individual thermoelectric (TE) modules arranged in a fault-tolerant configuration wrapped around the exterior surface of the outer reactor vessel. The exterior surface of the TE modules is exposed to the ambient environment (e.g., the Martian or lunar atmosphere or directly to space when in an orbital or deep space deployment) and is able to passively reject waste heat by radiating it to the surroundings. In an embodiment, the fuel salt in the reactor core maintains a temperature of 500-600° C. Given that the surface of Mars is approximately −65° C. and that of deep space is −270° C., the ΔT available to the TEG in an extra-terrestrial environment could be 550-800° C. or more.

In an embodiment, the reactor system relies on natural circulation to drive the flow of fuel salt around the circuit. Natural circulation, even in lunar gravity, is calculated to drive a flow velocity of several centimeters per second through the core. Alternatively, one or more electric pumps may be provided somewhere in the fuel salt circuit to drive the flow of fuel salt for zero-gravity embodiments. The pump or pumps would be powered by the TEG.

In an embodiment, the fuel is a molten salt fuel mixture that includes a combination of NaCl, $PuCl_3$ and/or $UCl_3$, such as the eutectic 64NaCl-36$PuCl_3$, which melts at approximately 450° C. Options that avoid use of Pu are possible, but they invariably lead to larger and more massive cores, which increases the cost of extra-terrestrial deployment. KCl and $MgCl_2$ are alternate carrier salts that may also be suitable for use in the reactor system 1300.

Beryllium and beryllium oxide may be used as reflector material in the extra-terrestrial deployments although others are possible as described above.

Beyond the reflector, unlike the designs above, the reactor system 1300 includes an in-vessel radiation shield 1322 that reduces the radiation doses to external equipment, particularly the TEG, and personnel. An enriched-$B_4C$ structure is a viable option that has an acceptable weight and reduces the external radiation dose by several orders of magnitude. In the embodiment shown, the in-vessel shield 1322 is located on the exterior of the radial reflector 1310 between the radial reflector 1310 and the heated fuel salt duct 1320. Additional in-vessel shields or out-of-vessel shields may be provided, for example, above the upper axial reflector 1312 or below the lower axial reflector 1314.

In the embodiment shown, on portions of the upper walls and the lateral walls of the reactor vessel 1304 an inner vessel **1304*a* and an outer vessel 1304*b* are provided between which the fuel salt flows in the heated fuel salt ducts 1320. The inner vessel 1304*a* separates the shield 1322 from contact with the fuel salt which protects the shield 1322 from corrosion. In an alternative embodiment similar to those described above, the inner vessel 1304*a* is omitted. For example, the material for the shield 1322 and the reflector material of the radial reflector 1310 may be contained in a single structure the outside surface of which is in contact with the molten fuel and defines the heat exchange ducts 1320**.

To prevent loss of heat to the ambient environment around the reactor system 1300, surfaces of the reactor vessel that are not in contact with the TEG may be insulated by an external insulator. In an embodiment, greater than 90% of the heat generated by the reactor core while in steady state operation is dissipated through the TEG and, thus, used to create electricity. In another embodiment, greater than 99% of the heat generated is dissipated through the TEG. In an alternative embodiment, all or substantially all (e.g., greater than 90%) of the entire exterior surface of the reactor system 1300 could be covered by the TEG.

In design calculations, a natural circulation (even in ⅙ of Earth's gravity) system operating at 50-100 $kW_{th}$ could be coupled to thermoelectrics to provide 10-15 $kW_e$ of 120 VDC power. Fueling with $PuCl_3$ is preferred for a minimum mass system, but $UCl_3$ (or ternary mixtures of NaCl, $PuCl_3$ and $UCl_3$) is also an option.

Notwithstanding the appended claims, the disclosure is also defined by the following clauses:

1. A molten fuel nuclear reactor comprising:
   - a reactor core in the form of an open channel that, when containing a molten nuclear fuel, can achieve criticality;
   - a heat exchange duct in fluid communication with the reactor core;
   - a reactor vessel containing the reactor core and the heat exchange duct, the reactor vessel having an interior surface in thermal communication with the heat exchange duct and an exterior surface in thermal communication with a coolant duct whereby during criticality heat from molten nuclear fuel in the heat exchange duct is transferred through the reactor vessel from the interior surface of the reactor vessel to the exterior surface and thereby to a coolant in the coolant duct; and
   - a radial reflector within the reactor vessel between the heat exchange duct and the reactor core, the radial reflector defining a lateral boundary of the reactor core.
2. The nuclear reactor of clause 1 further comprising:
   - a lower axial reflector defining a bottom of the reactor core.

3. The nuclear reactor of clauses 1 or 2 further comprising:
an upper axial reflector defining a top of the reactor core.
4. The nuclear reactor of any of clauses 1-3, wherein the heat exchange duct is fluidly connected to the reactor core to receive heated molten fuel from a first location in the reactor core and discharge cooled molten fuel to a second location in the reactor core different from the first location.
5. The nuclear reactor of any of clauses 1-4 further comprising:
one or more heat transfer elements on the exterior surface of the reactor vessel.
6. The nuclear reactor of any of clauses 1-5 further comprising:
one or more fins, pins, or dimples on the exterior surface of the reactor vessel adapted to increase the heat transfer surface area of the exterior surface.
7. The nuclear reactor of any of clauses 1-6 further comprising:
a shielding vessel containing the reactor vessel, wherein the coolant duct is between the shielding vessel and the reactor vessel.
8. The nuclear reactor of any of clauses 1-7 further comprising:
at least one flow restriction device capable of controlling flow of molten nuclear fuel through the heat exchange duct.
9. The nuclear reactor of any of clauses 1-8 further comprising:
a vessel head assembly adapted to seal the top of the reactor vessel.
10. The nuclear reactor of clause 9, wherein the vessel head assembly further comprises:
a drum well for receiving a control drum;
a penetration for receiving a flow restriction device;
a pump flange for connection with a pump assembly; and
an upcomer containing an expansion volume within the head assembly in fluid communication with the reactor core.
11. The nuclear reactor of clause 10 further comprising:
a control drum including a body of neutron reflecting material at least partially faced with a neutron absorbing material, the control drum rotatably located within the drum well in the vessel head assembly, wherein rotation of the control drum within the drum well changes a reactivity of the nuclear reactor.
12. The nuclear reactor of clause 10 further comprising:
a pump assembly attached to the pump flange of the vessel head assembly, the pump assembly including an impeller that draws molten nuclear fuel into the impeller from the reactor core and drives the molten nuclear fuel to the heat exchange duct.
13. The nuclear reactor of clause 12 further comprising:
a shield plug between the impeller and the reactor core.
14. The nuclear reactor of clause 13, wherein the shield plug includes reflector and/or shield material.
15. The nuclear reactor of clause 9 further comprising:
an access port in the vessel head assembly in fluid communication with the reactor core.
16. The nuclear reactor of clause 2, wherein the lower axial reflector defines a collection channel that is a lowest point in the reactor vessel in fluid communication with the reactor core.
17. The nuclear reactor of clause 16 further comprising:
at least one dip tube that fluidly connects the collection channel with an access port.
18. The nuclear reactor of any of clauses 1-17 further comprising:
at least one flow restriction device capable of controlling the flow of molten nuclear fuel through the heat exchange duct.
19. The nuclear reactor of any of clauses 1-18 further comprising:
an impeller that draws molten nuclear fuel into the impeller from the reactor core and drives the molten nuclear fuel into the heat exchange duct.
20. The nuclear reactor of clause 19 further comprising:
a shield plug between the impeller and the reactor core.
21. The nuclear reactor of any of clauses 1-20, wherein the heat exchange duct is fluidly connected to the reactor core to receive heated molten fuel from a first location in the open channel and discharge cooled molten fuel to a second location in the open channel.
22. The nuclear reactor of clause 21, wherein the first location is near the top of the reactor core and the second location is near the bottom of the reactor core.
23. The nuclear reactor of any of clauses 1-22 further comprising:
a cooling system capable of transferring heat received by the coolant from the molten nuclear fuel through the reactor vessel to an ambient atmosphere.
24. The molten fuel nuclear reactor of clause 23, wherein the cooling system further comprises:
a primary cooling circuit including the coolant duct, a heat exchanger, and a coolant blower, the coolant blower configured to circulate the coolant through the primary cooling circuit whereby heat from heated coolant from the coolant duct is transferred via the heat exchanger to air; and
a heat rejection system including an air blower that directs air through the heat exchanger to a vent to an ambient atmosphere.
25. The nuclear reactor of any of clauses 1-24 further comprising:
a sensor configured to monitor a height of a free surface of molten nuclear fuel in the nuclear reactor.
26. The nuclear reactor of clause 1, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.
27. A nuclear reactor comprising:
a reactor core in the form of an open channel that, when containing a molten nuclear fuel, can achieve criticality from the mass of molten nuclear fuel;
a heat exchange duct in fluid communication with the reactor core;
a reactor vessel containing the reactor core and the heat exchange duct, the reactor vessel having an interior surface and an exterior surface, the interior surface in contact with the heat exchange duct such that the heat exchange duct is in thermal communication with the exterior surface; and
a thermoelectric generator having a first surface and a second surface, the thermoelectric generator creating electricity from a temperature difference between the first surface and the second surface, wherein the first surface of the thermoelectric generator is in thermal communication with the exterior surface of the reactor vessel and the second surface of the thermoelectric generator is exposed to an ambient environment.

28. The nuclear reactor of clause 27 further comprising:

a radial reflector within the reactor vessel between the heat exchange duct and the reactor core, the radial reflector defining a lateral boundary of the reactor core.

29. The nuclear reactor of clauses 27 or 28 further comprising:

a lower axial reflector defining a bottom of the reactor core.

30. The nuclear reactor of any of clauses 27-29 further comprising:

an upper axial reflector defining a top of the reactor core.

31. The nuclear reactor of any of clauses 28 further comprising:

a shield within the reactor vessel, the shield between the radial reflector and the heat exchange duct.

32. The nuclear reactor of any of clauses 27-31 further comprising:

a pump powered by electricity generated by the thermoelectric generator, the pump including an impeller in the reactor vessel capable of circulating molten nuclear fuel between the reactor core and the heat exchange duct.

33. The nuclear reactor of any of clauses 28, wherein the radial reflector is steel container filled with a reflecting material.

34. The nuclear reactor of any of clauses 27-33, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.

35. The nuclear reactor of any of clauses 27-34, wherein greater than 90% of heat energy generated in the reactor core is dissipated through the thermoelectric generator.

36. The nuclear reactor of any of clauses 27-35 further comprising:

one or more insulating panels on the exterior surface of the reactor vessel.

37. A molten fuel nuclear reactor comprising:

a reactor core volume that, when containing a molten nuclear fuel, can achieve criticality from the mass of molten nuclear fuel within the reactor core volume;

a reactor vessel containing the reactor core volume, the reactor vessel in thermal communication with the reactor core; and a thermoelectric generator having a first surface and a second surface, the thermoelectric generator creating electricity from a temperature difference between the first surface and the second surface, wherein the first surface of the thermoelectric generator is in thermal communication with the reactor vessel and the second surface of the thermoelectric generator is exposed to an ambient environment.

38. The nuclear reactor of clause 37 further comprising:

a radial reflector within the reactor vessel between the reactor vessel and the reactor core, the radial reflector defining a lateral boundary of the reactor core volume; and a heat exchange duct within the reactor vessel, wherein the heat exchange duct is between the radial reflector and the reactor vessel and is in fluid communication with the reactor core volume 39. The nuclear reactor of clause 38, wherein at least one surface of the heat exchange duct is formed by the reactor vessel.

40. The nuclear reactor of any of clauses 37-39 further comprising:

a lower axial reflector defining a bottom of the reactor core volume.

41. The nuclear reactor of any of clauses 37-40 further comprising:

an upper axial reflector defining a top of the reactor core volume.

42. The nuclear reactor of any of clauses 37-41 further comprising:

a shield within the reactor vessel, the shield between the radial reflector and the heat exchange duct.

43. The nuclear reactor of any of clauses 37-42, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.

44. A molten fuel nuclear reactor comprising:

a reactor vessel;

a radial reflector within the reactor vessel, the radial reflector defining a reactor core in the form of an open channel that, when containing a molten nuclear fuel, can achieve criticality; and a heat exchange duct between the radial reflector and the reactor vessel, the heat exchange duct in fluid communication with the reactor core;

the reactor vessel having an interior surface in thermal communication with the heat exchange duct and an exterior surface in thermal communication with a coolant duct whereby during criticality heat from molten nuclear fuel in the heat exchange duct is transferred through the reactor vessel from the interior surface of the reactor vessel to the exterior surface and thereby to a coolant in the coolant duct.

45. The nuclear reactor of clause 44 further comprising:

a lower axial reflector defining a bottom of the reactor core.

46. The nuclear reactor of clauses 44 or 45 further comprising:

an upper axial reflector defining a top of the reactor core.

47. The nuclear reactor of any of clauses 44-46, wherein the heat exchange duct is fluidly connected to the reactor core to receive heated molten fuel from a first location in the reactor core and discharge cooled molten fuel to a second location in the reactor core different from the first location.

48. The nuclear reactor of any of clauses 44-47 further comprising:

one or more heat transfer elements on the exterior surface of the reactor vessel.

49. The nuclear reactor of any of clauses 44-48 further comprising:

one or more fins, pins, or dimples on the exterior surface of the reactor vessel adapted to increase the heat transfer surface area of the exterior surface.

50. The nuclear reactor of any of clauses 44-49 further comprising:

a shielding vessel containing the reactor vessel, wherein the coolant duct is between the shielding vessel and the reactor vessel.

51. The nuclear reactor of any of clauses 44-50 further comprising:

at least one flow restriction device capable of controlling flow of molten nuclear fuel through the heat exchange duct.

52. The nuclear reactor of any of clauses 44-51 further comprising:
a vessel head assembly adapted to seal the top of the reactor vessel.
53. The nuclear reactor of clause 52, wherein the vessel head assembly further comprises:
a drum well for receiving a control drum;
a penetration for receiving a flow restriction device;
a pump flange for connection with a pump assembly; and
an upcomer containing an expansion volume within the head assembly in fluid communication with the reactor core.
54. The nuclear reactor of clause 53 further comprising:
a control drum including a body of neutron reflecting material at least partially faced with a neutron absorbing material, the control drum rotatably located within the drum well in the vessel head assembly, wherein rotation of the control drum within the drum well changes a reactivity of the nuclear reactor.
55. The nuclear reactor of clause 53 further comprising:
a pump assembly attached to the pump flange of the vessel head assembly, the pump assembly including an impeller that draws molten nuclear fuel into the impeller from the reactor core and drives the molten nuclear fuel to the heat exchange duct.
56. The nuclear reactor of clause 55 further comprising:
a shield plug between the impeller and the reactor core.
57. The nuclear reactor of clause 56, wherein the shield plug includes reflector and/or shield material.
58. The nuclear reactor of clause 52 further comprising:
an access port in the vessel head assembly in fluid communication with the reactor core.
59. The nuclear reactor of clause 45, wherein the lower axial reflector defines a collection channel that is a lowest point in the reactor vessel in fluid communication with the reactor core.
60. The nuclear reactor of clause 59 further comprising:
at least one dip tube that fluidly connects the collection channel with an access port.
61. The nuclear reactor of any of clauses 44-60 further comprising:
at least one flow restriction device capable of controlling the flow of molten nuclear fuel through the heat exchange duct.
62. The nuclear reactor of any of clauses 44-61 further comprising:
an impeller that draws molten nuclear fuel into the impeller from the reactor core and drives the molten nuclear fuel into the heat exchange duct.
63. The nuclear reactor of clause 62 further comprising:
a shield plug between the impeller and the reactor core.
64. The nuclear reactor of any of clauses 44-63, wherein the heat exchange duct is fluidly connected to the reactor core to receive heated molten fuel from a first location in the open channel and discharge cooled molten fuel to a second location in the open channel.
65. The nuclear reactor of clause 64, wherein the first location is near the top of the reactor core and the second location is near the bottom of the reactor core.
66. The nuclear reactor of any of clauses 44-65 further comprising:
a cooling system capable of transferring heat received by the coolant from the molten nuclear fuel through the reactor vessel to an ambient atmosphere.
67. The nuclear reactor of clause 66, wherein the cooling system further comprises:
a primary cooling circuit including the coolant duct, a heat exchanger, and a coolant blower, the coolant blower configured to circulate the coolant through the primary cooling circuit whereby heat from heated coolant from the coolant duct is transferred via the heat exchanger to air; and
a heat rejection system including an air blower that directs air through the heat exchanger to a vent to an ambient atmosphere.
68. The nuclear reactor of any of clauses 44-67 further comprising:
a sensor configured to monitor a height of a free surface of molten nuclear fuel in the nuclear reactor.
69. The nuclear reactor of any of clauses 44-68, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.
70. A nuclear reactor comprising:
a reactor vessel;
a radial reflector within the reactor vessel, the radial reflector defining a reactor core in the form of an open channel that, when containing a molten nuclear fuel, can achieve criticality; and
a heat exchange duct between the radial reflector and the reactor vessel, the heat exchange duct in fluid communication with the reactor core;
the reactor vessel having an interior surface and an exterior surface, the interior surface in contact with the heat exchange duct such that the heat exchange duct is in thermal communication with the exterior surface; and
a thermoelectric generator having a first surface and a second surface, the thermoelectric generator configured to generate electricity from a temperature difference between the first surface and the second surface, wherein the first surface of the thermoelectric generator is in thermal communication with the exterior surface of the reactor vessel and the second surface of the thermoelectric generator is exposed to an ambient environment.
71. The nuclear reactor of clause 70 further comprising:
a radial reflector within the reactor vessel between the heat exchange duct and the reactor core, the radial reflector defining a lateral boundary of the reactor core.
72. The nuclear reactor of clauses 70 or 71 further comprising:
a lower axial reflector defining a bottom of the reactor core.
73. The nuclear reactor of any of clauses 70-72 further comprising:
an upper axial reflector defining a top of the reactor core.
74. The nuclear reactor of any of clauses 71 further comprising:
a shield within the reactor vessel, the shield between the radial reflector and the heat exchange duct.
75. The nuclear reactor of any of clauses 70-74 further comprising:
a pump powered by electricity generated by the thermoelectric generator, the pump including an impeller in the reactor vessel capable of circulating molten nuclear fuel between the reactor core and the heat exchange duct.

76. The nuclear reactor of any of clauses 71 or 74, wherein the radial reflector is steel container filled with a reflecting material.
77. The nuclear reactor of any of clauses 70-76, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.
78. The nuclear reactor of any of clauses 70-77, wherein greater than 90% of heat energy generated in the reactor core is dissipated through the thermoelectric generator.
79. The nuclear reactor of any of clauses 70-78 further comprising:

one or more insulating panels on the exterior surface of the reactor vessel.

Figure 18:
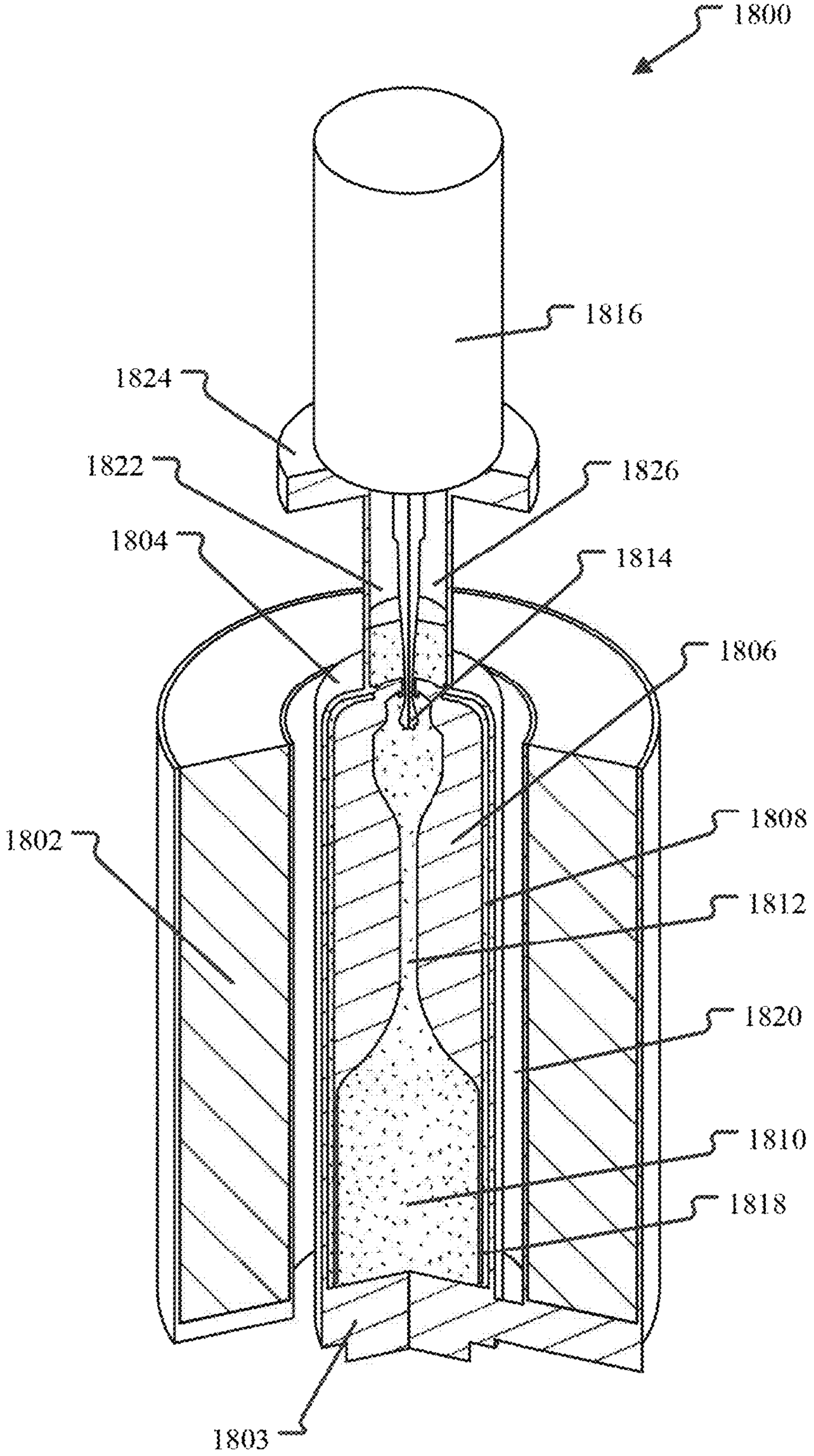
FIG. 18 illustrates an alternative embodiment of a reactor in which the reflector is outside of the reactor vessel.

FIG. 18 illustrates an alternative embodiment of a reactor 1800 in which most of the reflector material is outside of the reactor vessel 1804. In the embodiment shown, the reactor vessel 1804 is a cylinder that contains all of the salt and a displacement component 1806, which may be a reflector, in the upper section of the reactor vessel 1804. In the embodiment shown, other than the displacement component 1806, the reflector elements including a radial reflector 1802 and a bottom reflector 1803 are located outside the vessel 1804. As with the designs above, the salt flows around the outside surface of the displacement component 1806 through a downcomer heat exchange duct 1808 defined by the exterior of the displacement component 1806 and the interior surface of the reactor vessel 1804. This design reduces the overall size of the reactor vessel 1804 for a given volume of salt relative to designs with internal radial or bottom reflectors described above.

An unmoderated pool of fuel salt at the bottom of the reactor vessel acts as the reactor core 1810. The displacement component 1806 includes a draft tube section 1818 that extends almost to the bottom of the reactor vessel 1804, thus forcing the fuel salt to flow along most of the interior surface of the reactor vessel 1804 before it is redirected into the reactor core 1810. Fuel salt heated by the fission which occurs in the reactor core 1810 rises in the center of the reactor vessel 1804 through an upcomer duct 1812 that is provided in the center of the displacement component 1806 as shown. In the embodiment shown, an impeller 1814 is located at the top of the upcomer duct 1812 to assist in driving the flow of the fuel salt. As described above, the impeller 1814 is driven by a motor 1816 external to the reactor vessel 1804. A casing containing the impeller 1814 is formed by the displacement component 1806 and the reactor vessel 1804. In an alternative embodiment, the reactor 1800 is designed to operate with natural circulation and the pump is omitted.

Cooling of the reactor 1800 is again performed by flowing coolant gas or fluid along the outside surface of the reactor vessel 1804. In the embodiment shown a coolant duct 1820 is formed in an annulus region between the outside surface of the reactor vessel 1804 and the inside surface of the radial reflector 1802. In the embodiment shown, no fins are provided in the coolant duct 1820, i.e., the coolant duct 1820 is an open channel through which the coolant flows. In this embodiment, by eliminating the fins the reactivity of the reactor is increased as the fins have been determined to interfere with the reflection of neutrons back into the reactor core.

In an embodiment, the coolant is flowed co-currently with the fuel salt, i.e., both the coolant and the fuel salt flow downwardly on the opposing surfaces of the lateral walls of the reactor vessel 1804. Co-current flow, with or without the use of fins, is equally applicable to all embodiments of reactors described herein.

In this embodiment the reactor vessel 1804 is made of a material sufficiently strong and with sufficient characteristics to withstand the high neutron flux that will be incident near the region of the reactor core 1810. By locating the reflector outside of the reactor vessel, the diameter of the reactor vessel can be decreased. Assuming the same thickness of the downcomer duct 1808 there will be less cross-sectional flow area so for the same mass flow rate the velocity of the fuel salt traveling through the duct 1808 will be higher for this design. It is anticipated that the increased velocity will result in higher heat transfer coefficients. A smaller diameter vessel also requires less structural strength and, thus, potentially a lower wall thickness. The thinner reactor vessel walls will also improve the heat transfer characteristics between the downcomer heat exchange duct 1808 and the coolant duct 1820.

Other aspects of this design include a sufficiently tall riser 1822 between the top of the reactor vessel 1804 and the pump connection flange 1824. This riser 1822 defines an expansion volume for the fuel salt 1826. Heat exchange characteristics through the wall of the reactor vessel can be modified by increasing or decreasing the height lateral side of the reactor vessel, thus increasing the heat transfer area.

Although the reactor illustrated in FIG. 18 is not shown with some of the elements described above, any and all of the reactor components from the above embodiments may be included. For example, a shield plug may be provided in the upcomer duct 1812 to protect the impeller from neutrons generated in the reactor core 1810. A conically-shaped lower axial reflector may be provided in the bottom of the vessel 1804 which may be incorporated into the displacement component 1806 or may be a separate component. A removable vessel head may be provided as described above at the top of the reactor vessel 1804 or the vessel may be a continuous body that includes the riser 1822 as shown.

Figures 19A, 19B, 19C:
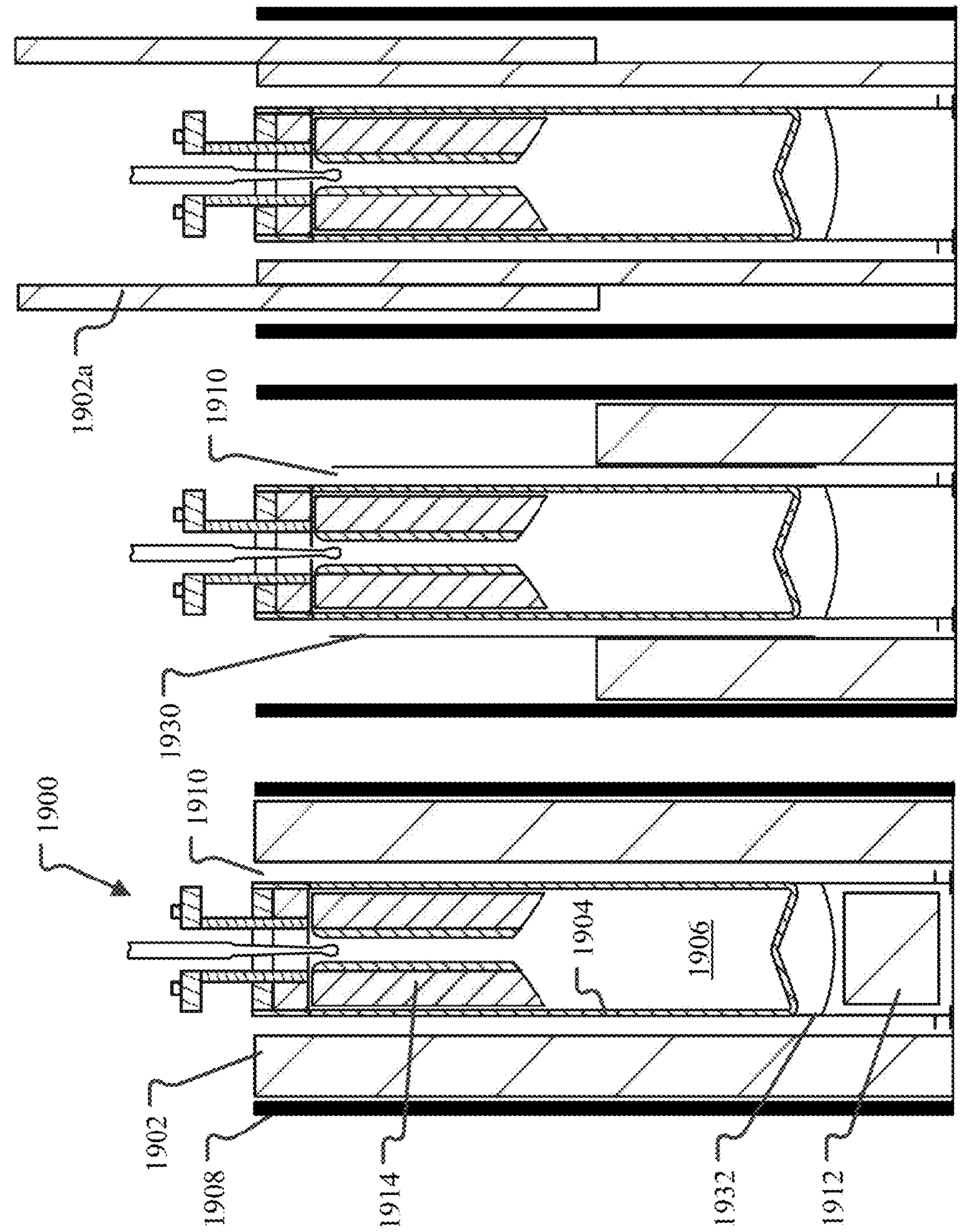
FIGS. 19A-19E illustrate several different options available for reactivity control using an external radial reflector.

FIGS. 19A-E illustrate several different options available for reactivity control when the radial reflector 1902 is positioned external to the reactor vessel 1904 with the design as shown in FIG. 18. By moving all or some of the radial reflector 1902, the reactivity of the reactor 1900 may be controlled. FIGS. 19A-C show a cross-sectional view of a reactor in which each FIG. illustrates a different possible radial reflector configuration. In an embodiment, a radial absorber 1908 or neutron shield external to the reflector 1902 may also be provided as shown to contain the neutrons that are not intercepted by the reflector 1902.

In FIG. 19A the external radial reflector 1902 is shown in the highest reactivity position in which the reflector completely surrounds the reactor vessel 1904. In this configuration neutrons generated in the reactor core 1906 that are traveling laterally are reflected back into the reactor core by the radial reflector 1902.

FIG. 19B illustrates a reduced reactivity configuration in which the radial reflector 1902 has been lowered (or alternatively an upper portion of the reflector has been removed) so that the reflector does not surround the reactor core 1906 completely as shown in FIG. 19A. In this configuration some of the neutrons generated in the reactor core 1906 escape and are not reflected back into the reactor core thereby reducing the reactivity of the reactor. In this embodiment, in order to ensure coolant flow along the exterior surface of the reactor vessel 1904, a cooling jacket 1930 may be provided so that movement of the reflector 1902 does not affect the coolant duct 1910.

FIG. 19C illustrates yet another embodiment in which a portion of the radial reflector 1902 is movable for reactivity control but the size and length of the coolant duct 1910 is maintained. In FIG. 19C a portion 1902*a* of the reflector has been raised reducing the overall thickness of reflector material around the reactor core 1906, thereby reducing the reactivity of the reactor 1900.

Figure 19E:
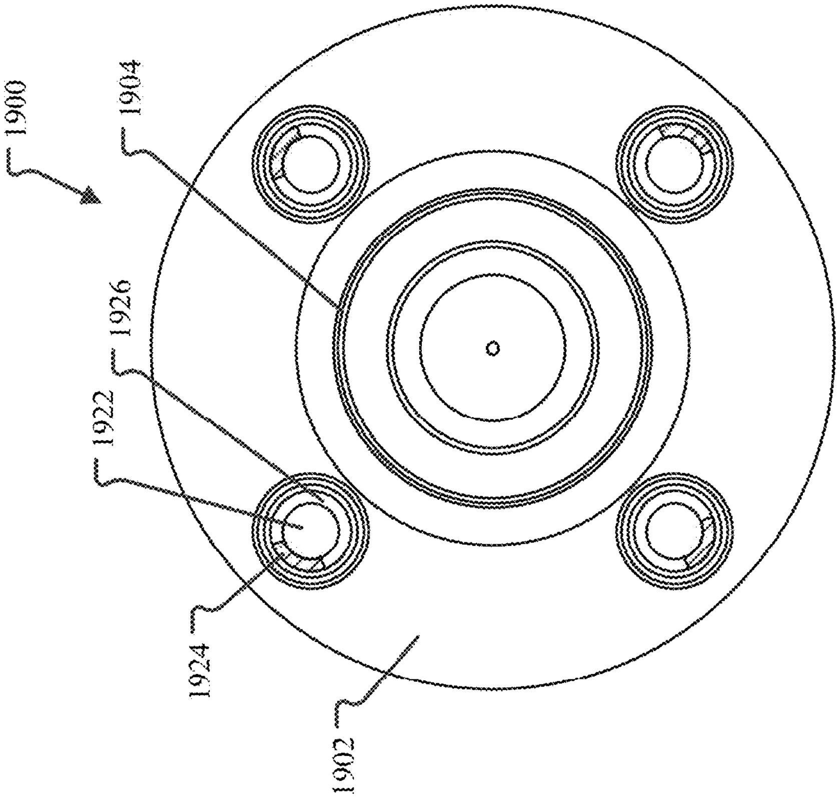
Figure 19D:
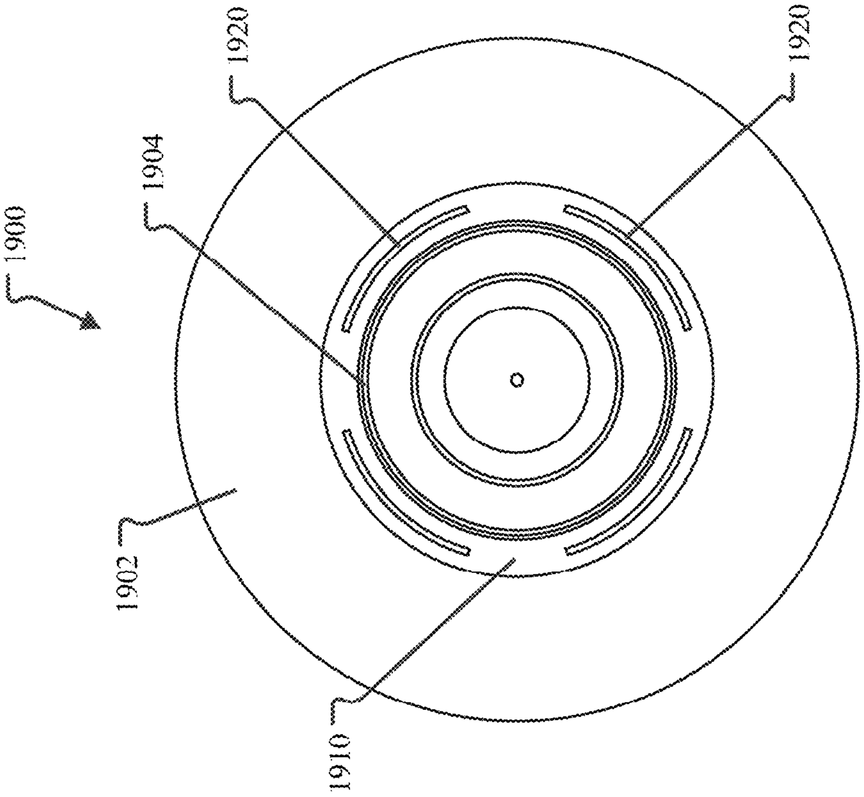

FIG. 19D is a plan view of the reactor 1900 illustrating yet another alternative to reactivity control using this design. In the embodiment shown, control elements 1920, which may be neutron reflectors or neutron absorbers, may be inserted into the coolant duct 1910 formed between the reflector 1902 and the outside surface of the reactor vessel 1904. Similar to control rods, these control elements 1920 are illustrated as four separate arcuate plates which may be raised or lowered within the coolant duct 1910. If the elements 1920 are made of absorbing material then insertion of the elements 1920 causes the reactivity of the reactor 1900 to be reduced. If the elements are reflectors or material made of reflective material then insertion of the elements 1920 into the coolant duct 1910 may increase the reactivity of the reactor 1900 and removal may decrease the reactivity of the reactor. Although illustrated as four arcuate plates, any number or shape of elements 1920 may be used including, for example, cylindrical rods, or planar plates sized to fit within the coolant duct.

FIG. 19E illustrates yet another embodiment of reactor control. FIG. 19E is a plan view of the reactor 1900 showing the use of control drums 1922 in the reflector. Similar to the control drums described above, the control drums 1922 may rotate within a control drum recess provided in the reflector 1902 in order to expose an absorbing face 1924 or reflecting face 1926 on the control drum to the reactor core.

The different forms of reactor control in FIGS. 19A-E could be used separately or together in any combination. For example, the arcuate control elements of FIG. 19D could be used in conjunction with a separable reflector 1902 that could change from the configuration shown in FIG. 19A to that shown in FIG. 19B or 19C. As another example, the reflector of FIG. 19A could include one or more control drums as shown in FIG. 19E and also be lowerable into the position shown in FIG. 19B. Any and all combinations are possible.

FIGS. 19A-19C illustrate a further aspect of this design related to the reactor vessel 1904. In an embodiment, the reactor vessel 1904 is designed to be free to change size and shape in response to thermal expansion. In the embodiment shown, the reactor vessel 1904 is supported from below by a support structure 1932 or stand. In the embodiment shown in FIG. 19A the support structure 1932 includes a lower axial reflector 1912. The lateral wall the reactor vessel 1904 is not constrained in movement, but rather is allowed to change in diameter by providing ducts on either side of the wall of the reactor vessel.

In the embodiment shown, the base of the reactor vessel 1904 is provided with generally convex, conical, or frustoconical shape to assist with directing the flow of the salt from the downcomer duct into the center of the reactor core 1906. The shape has several other benefits including providing more strength than a flat surface and accommodating thermal expansion better than a flat bottom. In an alternative embodiment (not shown) a second displacement component may be provided in the bottom of the vessel as a lower axial reflector and also provide the convex shape for directing the flow of fuel salt.

As discussed above, to allow for free thermal expansion of the reactor vessel 1904 the vessel 1904 may simply be cradled by the support structure 1932 as opposed to rigidly attached. In an alternative embodiment, the vessel 1904 may be suspended from above via the pump flange. The displacement component 1914 may be suspended from the top of the vessel 1904, from the vessel head if one is provided, or from the pump assembly. In an alternative embodiment, the displacement component 1914 may be loosely contained within the vessel 1904 and resting on the bottom vessel 1904 via a downcomer wall, one or more struts, or other elements provided to maintain the displacement component 1914 in the proper position in the vessel 1904 without the displacement component 1914 being rigidly attached to the vessel.

Figure 20:
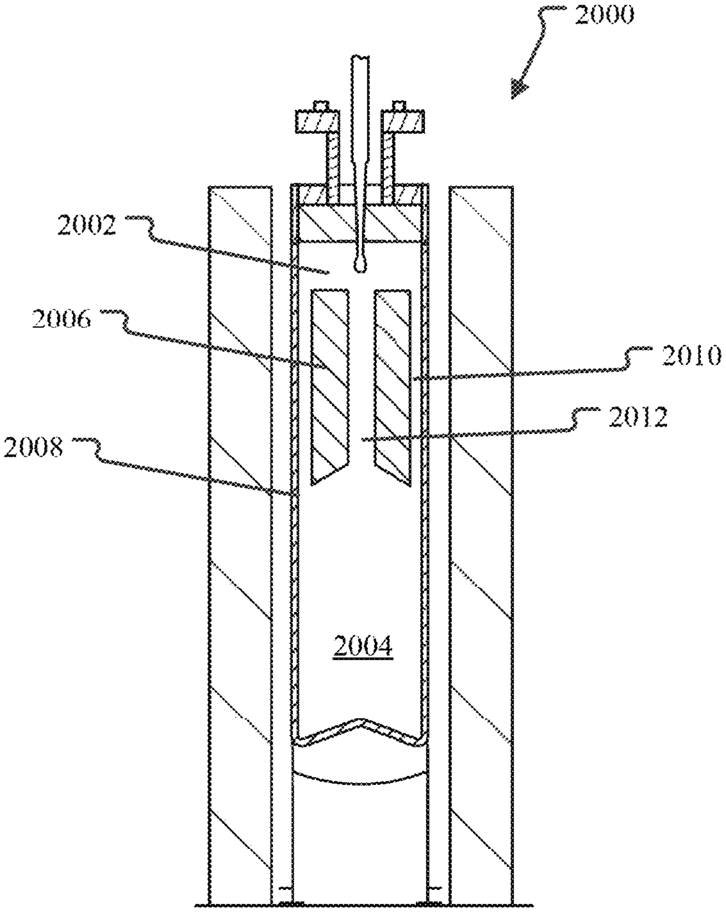
FIG. 20 illustrates an embodiment of a low power reactor design adapted to reduce the reactivity change associated with flowing delayed neutron precursors.

FIG. 20 illustrates an embodiment of a low power reactor design adapted to reduce the reactivity change associated with flowing delayed neutron precursors. A delayed neutron is a neutron emitted by an excited fission product nucleus during beta disintegration after the fission that created the product nucleus. Typically, neutrons generated later than $10^{-14}$ seconds after the fission are considered delayed neutrons. Delayed neutrons are normally not an important design criteria in a molten salt reactor designed to generate power. In power generating designs, at any given time there typically is a significant amount of fuel salt outside of the reactor core traveling through the fuel salt cooling circuit through the heat exchangers. In these designs, delayed neutrons have little effect on the reactivity of the reactor because most of the delayed neutrons have been emitted before the fuel salt has completed a circuit through the heat exchangers and returned to the reactor core. In fact, even though it is normally a design criterion to minimize the amount of fuel salt outside of the reactor core (because of the high cost of fuel salt), power-generating molten salt reactors that circulate fuel salt through shell-and-tube heat exchangers require so much salt to be outside the reactor core for heat transfer purposes that the effect of delayed neutrons on reactivity is ignored.

In the test reactor designs proposed herein, however, delayed neutrons could significantly affect the reactivity of the reactor. While normally, because of the high cost of fuel salt, a reactor design criterion is to minimize the amount of fuel salt outside of the reactor core, it has been determined that in these low-power test reactor designs the fuel salt volume outside of the reactor core may need to be increased beyond that amount which may be required for heat transfer purposes. Essentially, a reservoir of fuel salt outside of the reactor core but within the fuel salt flow circuit that serves no heat transfer purpose is provided solely for the purpose of increasing the volume of fuel salt in the fuel salt circuit outside of the reactor core. One way of looking at this reservoir is that it artificially increases the residence time of the fuel salt in the fuel salt circuit outside of the reactor core with no attendant heat transfer benefit.

FIG. 20 illustrates an embodiment of providing a delayed neutron reservoir 2002 in the fuel salt circuit outside of the reactor core 2004. The reactor 2000 is similar to that shown in FIG. 19 having a reactor vessel 2008 enclosing a displacement component 2006 and a free volume filled with fuel salt including a reactor core 2004. A delayed neutron reservoir 2002 of fuel salt is created outside of the reactor core 2004 by changing the size of the displacement component 2006 to manage the reactivity associated with delayed neutrons.

In the embodiment shown, the reservoir 2002 above the displacement component 2006. However, the reservoir 2002 could be located anywhere in the fuel salt flow path that is outside of the reactor core 2004. By increasing the volume of fuel salt outside of the reactor core 2004 the majority of the delayed neutrons can be prevented from affecting the reactivity of the fission in the reactor core 2004.

In an embodiment, the delayed neutron reservoir 2002 is sized based on the total volume of salt in the reactor vessel 2008, $V_{tot}$, relative to the volume of salt in the reactor core, $V_{core}$. In this embodiment, the volume of the reservoir 2002 is increased until the desired ratio of $V_{core}/V_{tot}$ is achieved. It has been determined that a target ratio of $V_{core}/V_{tot}$ of from 75-99% (i.e., $V_{core}/V_{tot}$ is from 0.75-0.99) is beneficial and that ratios of $V_{core}/V_{tot}$ from 95-85% and from 92-88% and from 91-89% are contemplated. Considering that the total volume of salt in the reactor vessel 2008, $V_{tot}$, is made up of the volume of the reactor core, $V_{core}$, the volume of the reservoir, $V_{res}$, and the volume of salt in the fuel salt circuit but outside of the reactor core and the reservoir, $V_{cir}$ (note $V_{cir}$ includes the volume of salt in the heat transfer downcomer duct 2010 and the upcomer duct 2012 but, depending on the design, does not include the expansion volume in a riser as the expansion volume is not normally part of the flow circuit and does not change the residence time of the fuel salt outside of the reactor core 2004). In an alternative embodiment, the delayed neutron reservoir 2002 is sized so that the ratio of $V_{core}/V_{tot}$ is less than 95%, less than 91%, less than 90%, about 90%, less than 89%, less than 85% or even less than 75%. In an embodiment, a minimum ratio of $V_{core}/V_{tot}$ is 50%.

FIGS. 21 and 22 illustrate alternative designs for manipulating the flow of fuel salt as it circulates through the interior of the reactor vessel. Fuel salt flow was generally described above as having vertical flow up through the upcomer duct and vertical flow down in the downcomer duct. This is the simplest flow regime and represents the shortest residence time of fuel salt in the downcomer heat exchange ducts and near the surface interior surface of the reactor vessel. However, other flow regimes are possible that alter the heat transfer aspects of the reactor.

Figures 21A, 21B:
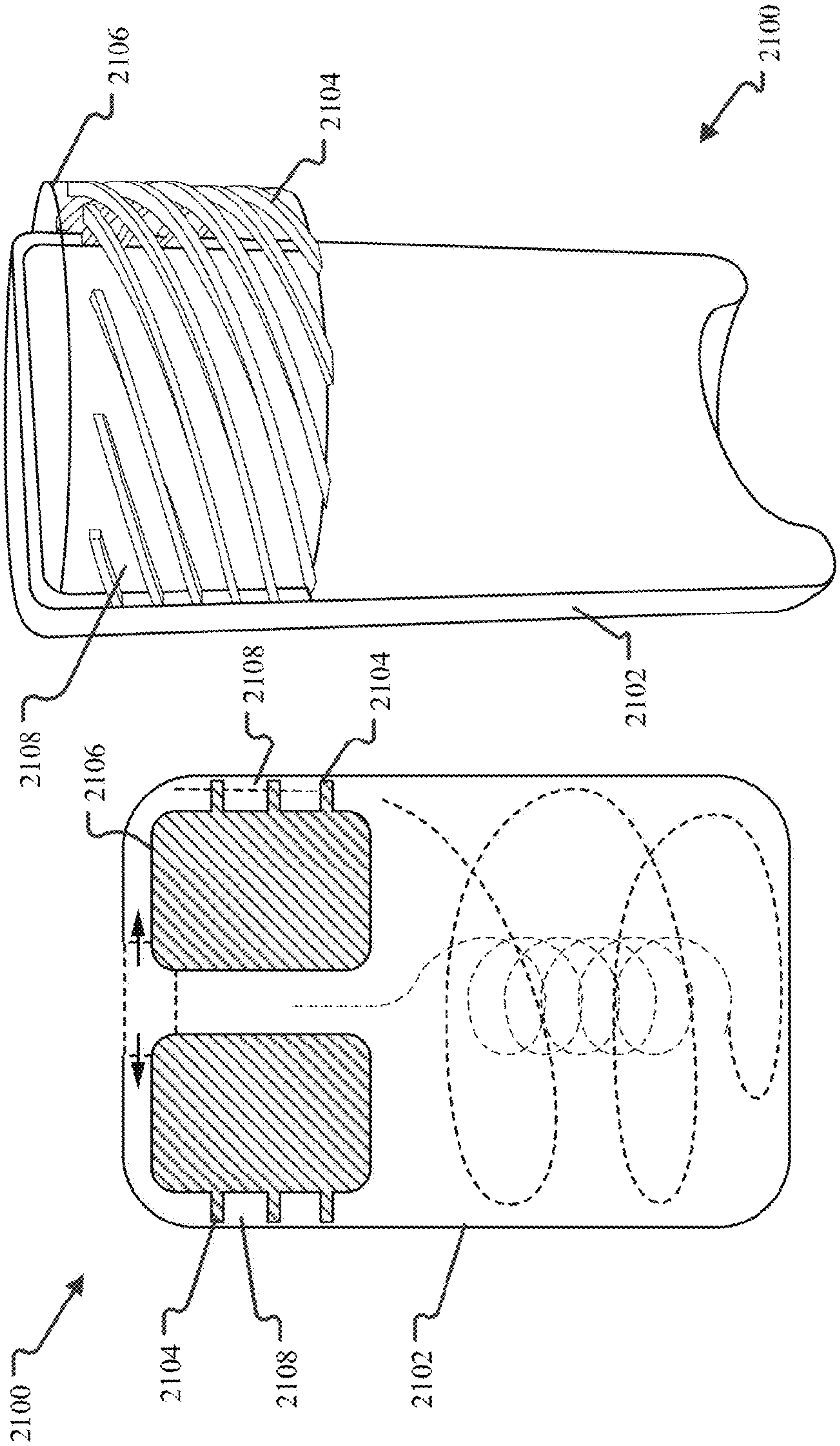
FIGS. 21A and 21B illustrate an embodiment of a reactor in which transverse swirling flow is induced in the fuel salt flowing along the interior surface of the lateral sides of the reactor vessel.

FIGS. 21A and 21B illustrate two views of an embodiment of a reactor 2100 in which transverse swirling flow (illustrated by the dashed line) is induced in the fuel salt flowing along the interior surface of the lateral sides of the reactor vessel 2102. In the embodiment shown, vanes 2104 are provided on the surface of the displacement component 2106 in the downcomer duct 2108 to direct the flow of fuel salt tangentially downward along the interior surface of the reactor vessel instead of straight downward. FIG. 21A is an illustration of a cross-section of the reactor 2100 while FIG. 21B is a cutaway view showing the vanes 2104 on the displacement component 2106.

In the embodiment shown, a series of vanes 2104 are provided similar to the threads on a screw within the downcomer duct 2108 between the displacement component 2106 and the interior surface of the reactor vessel 2102. The vanes 2104 could be attached to the displacement component 2106, the interior surface of the reactor vessel 2102, or a combination of both. The vanes 2104 could extend the entire width of the downcomer duct 2108, thus connecting the reactor vessel 2104 with the displacement component 2106 or the vanes 2104 could only partially extend into the downcomer duct 2108. In effect, the swirling flow increases the travel time of salt around the interior surface of the reactor vessel 2102 before the salt reaches the bottom of the vessel and then flows upwardly through the reactor core. Modeling indicates the swirling motion continues within the core as the fuel salt is heated which also improves the uniformity of heating of the fuel salt leaving the reactor core.

Figure 22A:
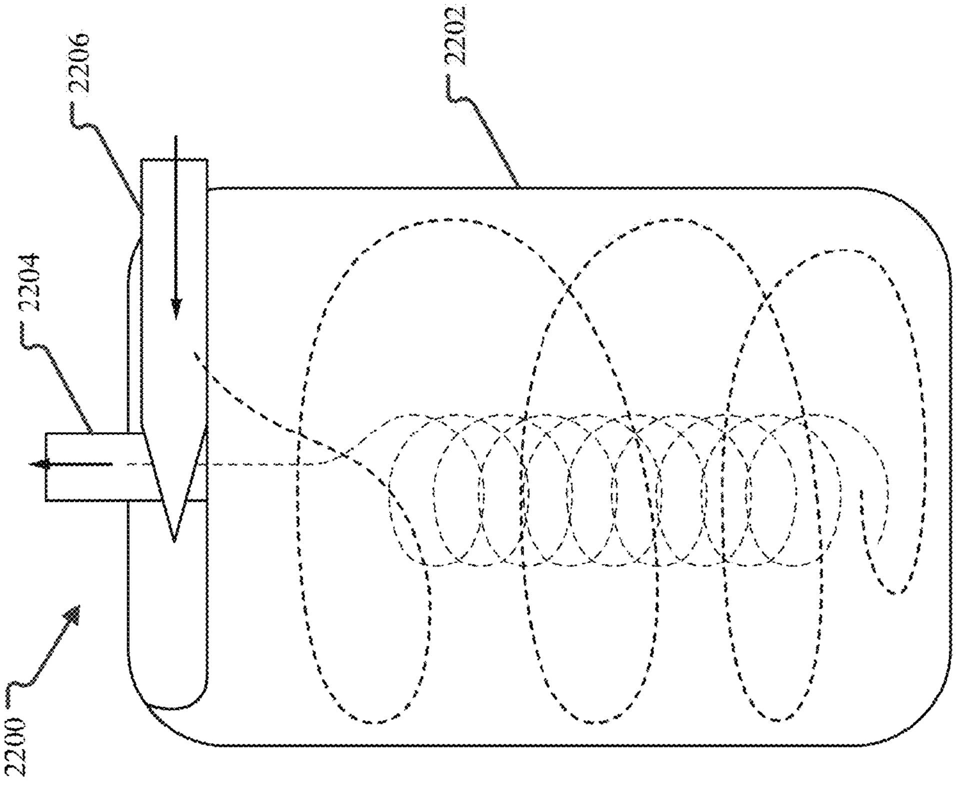
FIGS. 22A and 22B illustrate an alternative embodiment of a reactor design with a swirling fuel salt flow around the interior surface of the reactor vessel.
Figure 22B:
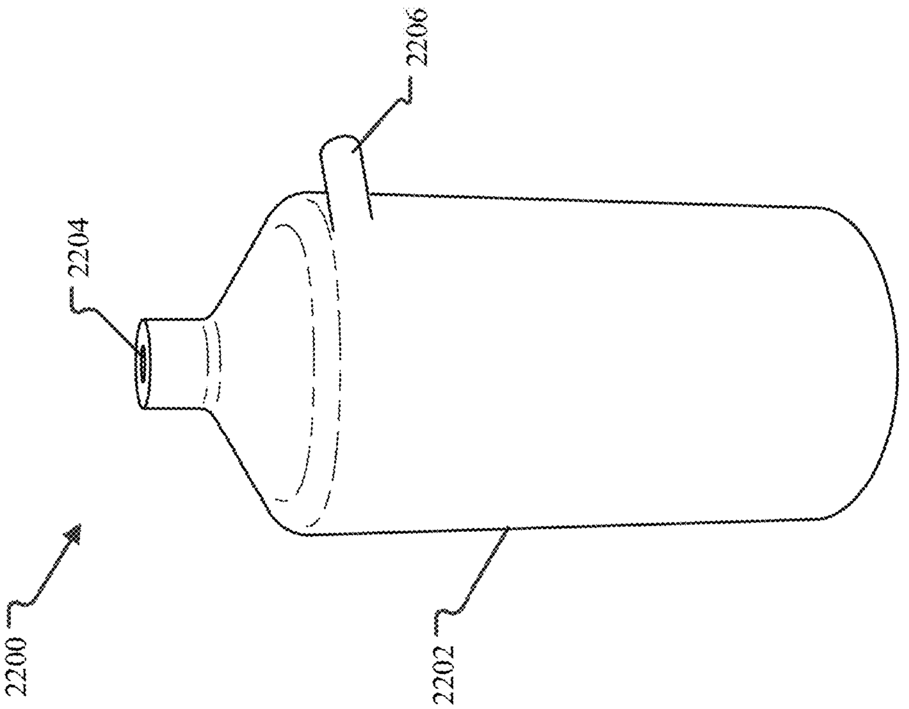

FIGS. 22A and 22B illustrate an alternative embodiment of a reactor design with a swirling fuel salt flow around the interior surface of the reactor vessel. In this embodiment, fuel salt is removed from the reactor vessel 2202 from a central outlet port 2204 and re-injected through an injection port 2206 that is tangential to the side of the reactor vessel 2202. FIG. 22A is an illustration of a cross-section of the reactor 2200 showing the induced salt flow in dashed line while FIG. 22B is a perspective view showing the outlet port 2204 and injection port 2206. By directing the flow of fuel salt tangentially along the interior surface of the reactor vessel swirling fuel salt flow may also be induced.

In an alternative embodiment two or more injection ports 2206 may be used. The injection port 2206 may be angled slightly downward or may be horizontal as shown.

FIGS. 21A, 21B, 22A, and 22B illustrate only two examples of how swirling flow of fuel salt along the interior surface of the reactor vessel may be achieved. Other methods of creating the swirling motion in the salt flow are possible such as providing vanes along the interior surface of the reactor vessel or providing one or more directed nozzles or jets within the outlets of the pump and any suitable method may be utilized herein.

Notwithstanding that the numerical ranges and parameters setting forth the broad scope of the technology are approximations, the numerical values set forth in the specific examples are reported as precisely as possible. Any numerical values, however, inherently contain certain errors necessarily resulting from the standard deviation found in their respective testing measurements.

Notwithstanding the appended claims, the disclosure is also defined by the following clauses:

1. A molten fuel nuclear reactor comprising:
   - a reactor vessel having an interior surface and an exterior surface;
   - a displacement component within the reactor vessel, the interior surface of the reactor vessel and the displacement component together defining a reactor core that, when containing a molten nuclear fuel, can achieve criticality, a central upcomer duct, and a downcomer duct in fluid communication with the reactor core and the central upcomer duct; and
   - a radial reflector around the reactor vessel;
   - a coolant duct between the reactor vessel and the radial reflector; and
   - the interior surface of the reactor vessel in thermal communication with the downcomer duct and the exterior surface of the reactor vessel in thermal communication with the coolant duct whereby heat from molten nuclear fuel in the downcomer duct is transferred through the reactor vessel from the interior surface of the reactor vessel to the exterior surface and thereby to a coolant in the coolant duct.
2. The nuclear reactor of clause 1 further comprising:
   - a lower axial reflector below the reactor vessel.
3. The nuclear reactor of clauses 1 and 2 wherein the displacement component incorporates neutron reflecting material to reflect neutrons from the reactor core back into the reactor core.
4. The nuclear reactor of any of clauses 1-3, wherein the downcomer duct is fluidly connected to the reactor core to receive heated molten fuel from a first location in the reactor core and discharge cooled molten fuel to a second location in the reactor core different from the first location.

5. The nuclear reactor of any of clauses 1-4, wherein the displacement component includes a central penetration therethrough which defines the central upcomer duct and a draft tube.

6. The nuclear reactor of any of clauses 1-5 further comprising:
   at least one vane attached to the displacement component that directs molten nuclear fuel diagonally along the interior surface of the reactor vessel.

7. The nuclear reactor of any of clauses 1-6 further comprising:
   a vessel head assembly sealing a top of the reactor vessel.

8. The nuclear reactor of any of clauses 1-7, wherein the radial reflector further comprises:
   a drum well for receiving a control drum; and
   a control drum including a body of neutron reflecting material at least partially faced with a neutron absorbing material, the control drum rotatably located within the drum, wherein rotation of the control drum within the drum well changes a reactivity of the nuclear reactor.

9. The nuclear reactor of clause 7 further comprising:
   an access port in the vessel head assembly in fluid communication with the reactor core.

10. The nuclear reactor of any of clauses 1-9, wherein the radial reflector is moveable relative to the reactor vessel whereby reactivity of the nuclear reactor can be changed by moving the radial reflector.

11. The nuclear reactor of clause 10, wherein the radial reflector is a plurality of reflector elements and moving the radial reflector includes moving a first one of the plurality of reflector elements.

12. The nuclear reactor of any of clauses 1-11 further comprising:
   an impeller that draws molten nuclear fuel into the impeller from the reactor core and drives the molten nuclear fuel into the downcomer duct.

13. The nuclear reactor of clause 12 further comprising:
   a shield plug between the impeller and the reactor core.

14. The nuclear reactor of any of clauses 1-13, wherein the downcomer duct is fluidly connected to the reactor core to receive heated molten fuel from a first location in the central upcomer duct and discharge cooled molten fuel to a second location in the reactor core.

15. The nuclear reactor of any of clauses 1-14 further comprising:
   a control element within the coolant duct that can be moved to control reactivity of the nuclear reactor.

16. The nuclear reactor of clause 15, wherein the control element includes either or both of neutron reflecting material and neutron absorbing material and is selected from an arcuate plate, a planar plate, or a rod.

17. The nuclear reactor of any of clauses 1-16, wherein the cooling system further comprises:
   a primary cooling circuit including the coolant duct, a heat exchanger, and a coolant blower, the coolant blower configured to circulate the coolant through the primary cooling circuit whereby heat from heated coolant from the coolant duct is transferred via the heat exchanger to air; and
   a heat rejection system including an air blower that directs air through the heat exchanger to a vent to an ambient atmosphere.

18. The nuclear reactor of any of clauses 1-17, wherein the molten nuclear fuel includes one or more fissionable fuel salts selected from $PuCl_3$, $UCl_4$, $UCl_3F$, $UCl_3$, $UCl_2F_2$, $ThCl_4$, and $UClF_3$, with one or more non-fissile salts selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$.

19. The nuclear reactor of any of clauses 1-18, wherein a ratio of the volume of molten nuclear fuel in the reactor core, $V_{cor}$, to the total volume of molten nuclear fuel in the reactor vessel, $V_{tot}$, is from 75-99%.

20. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is from 85-95%.

21. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is from 88-92%.

22. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is from 89-91%.

23. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is less than 95%.

24. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is less than 91%.

25. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is about 90%.

26. The nuclear reactor of any of clauses 1-18, wherein the ratio of the volume of molten nuclear fuel in the reactor core, $V_{cor}$, to the total volume of molten nuclear fuel in the reactor vessel, $V_{tot}$, is less than 90%.

27. A nuclear reactor comprising:
   a reactor vessel having a reactor core in the form of an open volume at the bottom of the reactor vessel that, when containing a molten nuclear fuel, can achieve criticality;
   a radial reflector outside of the reactor vessel;
   a displacement component within the reactor vessel above the reactor core, the displacement component defining an upcomer duct in the form of an open channel through the displacement component in fluid communication with reactor core;
   a downcomer heat exchange duct between the displacement component and the reactor vessel, the downcomer heat exchange duct in fluid communication with the upcomer duct and the reactor core;
   the reactor vessel having an interior surface and an exterior surface, the interior surface in contact with the downcomer heat exchange duct such that the downcomer heat exchange duct is in thermal communication with the exterior surface; and
   a thermoelectric generator having a first surface and a second surface, the thermoelectric generator configured to generate electricity from a temperature difference between the first surface and the second surface, wherein the first surface of the thermoelectric generator is in thermal communication with the exterior surface of the reactor vessel and the second surface of the thermoelectric generator is exposed to a coolant duct between the radial reflector and the reactor vessel.

28. A molten fuel nuclear reactor comprising:

a reactor core volume that, when containing a molten nuclear fuel, can achieve criticality from the mass of molten nuclear fuel;

a reactor vessel containing the reactor core volume, the reactor vessel in thermal communication with the reactor core;

a radial reflector spaced apart from and around the reactor vessel; and a coolant duct between the radial reflector and the reactor vessel, the coolant duct in thermal communication with the reactor core.

The following paragraphs referencing FIGS. 23-30 describe alternative embodiments of a test reactor. One alternative embodiment shows the use of an external loop for circulating molten fuel between the top of the reactor core and the bottom of the core instead of using an internal downcomer duct as shown above. In one embodiment, the external loop is simply a U-shaped pipe external to the reactor vessel that takes molten fuel from the top of the reactor core and returns it to the bottom of the core.

In the embodiments shown, as discussed in greater detail below the heat generated by the test reactor is not beneficially captured but rather dissipated via the air conditioning system that maintains the temperature of the room within which the test reactor is located. The excess heat generated by the fission reaction is not actively managed, i.e., there is no use of a heat exchanger to actively circulate a coolant to assist in the removal of heat from the fuel salt. At steady state, all excess heat generated by the reactor travels from the fuel salt through the components of the reactor and radiates into the environment of the room that contains the reactor. This design is considered a test reactor in that there is no recapture of the power generated by the reactor during normal operation.

Figure 23A:
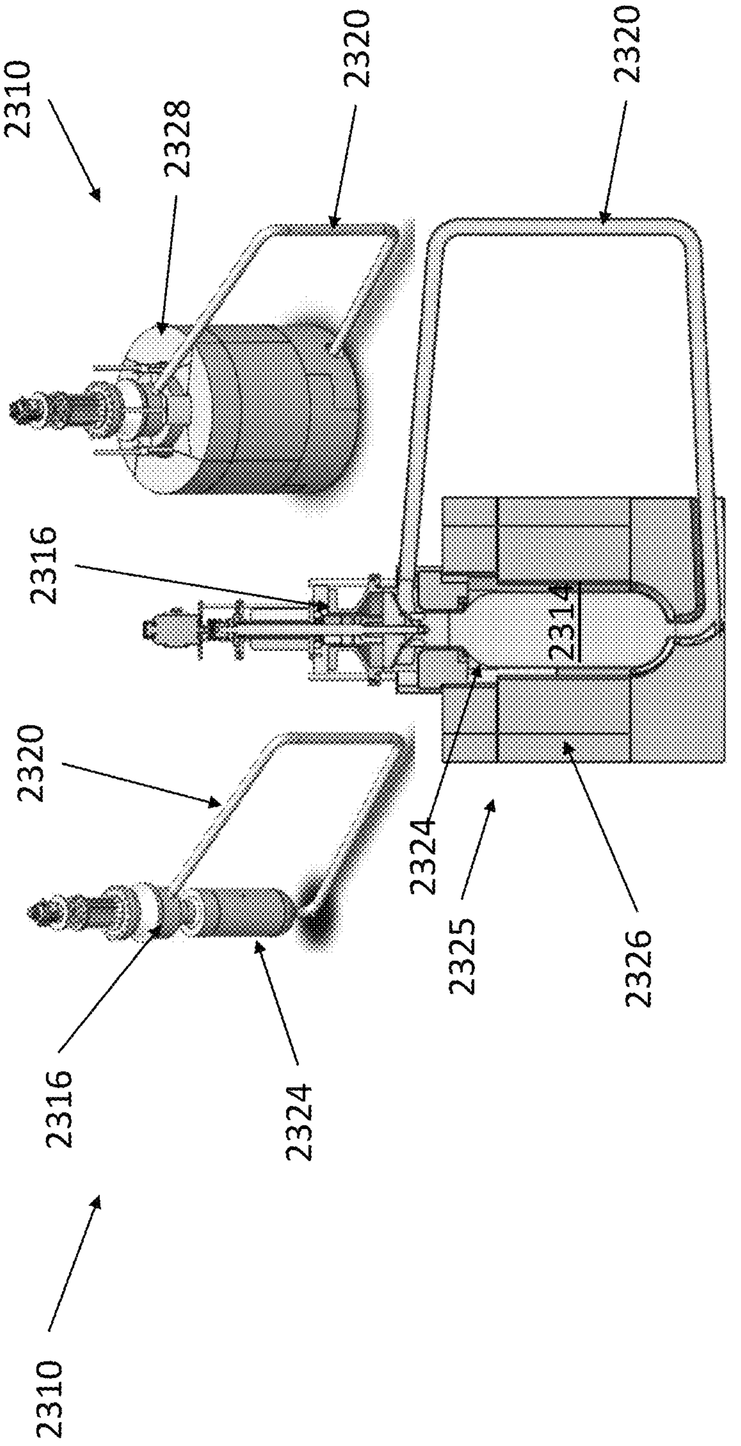
FIGS. 23A-23E illustrate examples reactor systems, according to examples of the current disclosure.

FIGS. 23A-23E illustrate examples reactor systems, according to examples of the current disclosure. In FIG. 23A, reactor system 2310 includes a reactor core or chamber 2314 and an external loop 2320 configured to circulate molten salts and/or molten reactor fuel to and from the reactor core or chamber 2314. Specifically, the external loop 2320 is configured to circulate molten salts and/or molten reactor fuel from a bottom portion of the reactor core or chamber 2314, up through the reactor core 2314 to a pump 2316 located above the reactor core or chamber 2314. FIG. 23A also illustrates a view of the reactor system 2310 that shows the modular reflector system 2328 encompassing the vessel or shell 2324 that includes a reactor core (not shown). The reactor 2310 also includes an external loop 2320 configured to circulate molten salts and/or molten reactor fuel in and out of the vessel or shell 2324 encompassed by the modular reflector system 2328. As described in greater detail in the cross-section 2325 of this example embodiment, the vessel or shell 2324 is encompassed by the modular reflector system 2328, and the external loop 2320 circulates molten salts and/or molten reactor fuel between a bottom portion of the vessel or shell 2324 and a pump 2316 coupled to the vessel or shell 2324.

The reactor core 2314, during operation, is a central, open channel that contains a volume of molten fuel where the density of fast neutrons (neutrons with energy of 0.5 MeV or greater) is sufficient to achieve criticality. The size and shape of the channel is defined by the reactor vessel 2324. The reflector assembly of the modular reactor system 2328 surrounds the reactor core 2314 and acts to reflect fast neutrons generated in the core 2314 back into the core 2314, thereby increasing the fast neutron density. The reflector assembly is discussed in greater detail with reference to subsequent figures.

The size of the reactor core or chamber 2314 and vessel 2324 may be selected based on the type of fuel being used, that is, the volume is sufficient to hold the necessary amount of molten fuel to achieve critical mass in the reactor core or chamber 2314. In an embodiment, during operation, the reactor core or chamber 2314 is unmoderated, that is, the reactor core or chamber 2314 contains no moderator rods or other moderator elements so as not to reduce the energy of fast neutrons in the core. In one embodiment, the reactor core or chamber 2314 contains only molten fuel. That reactor core or chamber 2314 can achieve criticality from the molten fuel within the core itself is one aspect that separates the fast reactor designs herein from thermal reactors and from fast reactors that use a collection of individual fuel pins that, during operation, each contain a small amount of nuclear fuel insufficient to achieve criticality on their own, but when collected into a fuel assembly in sufficient numbers can form a critical mass.

Figure 23B:
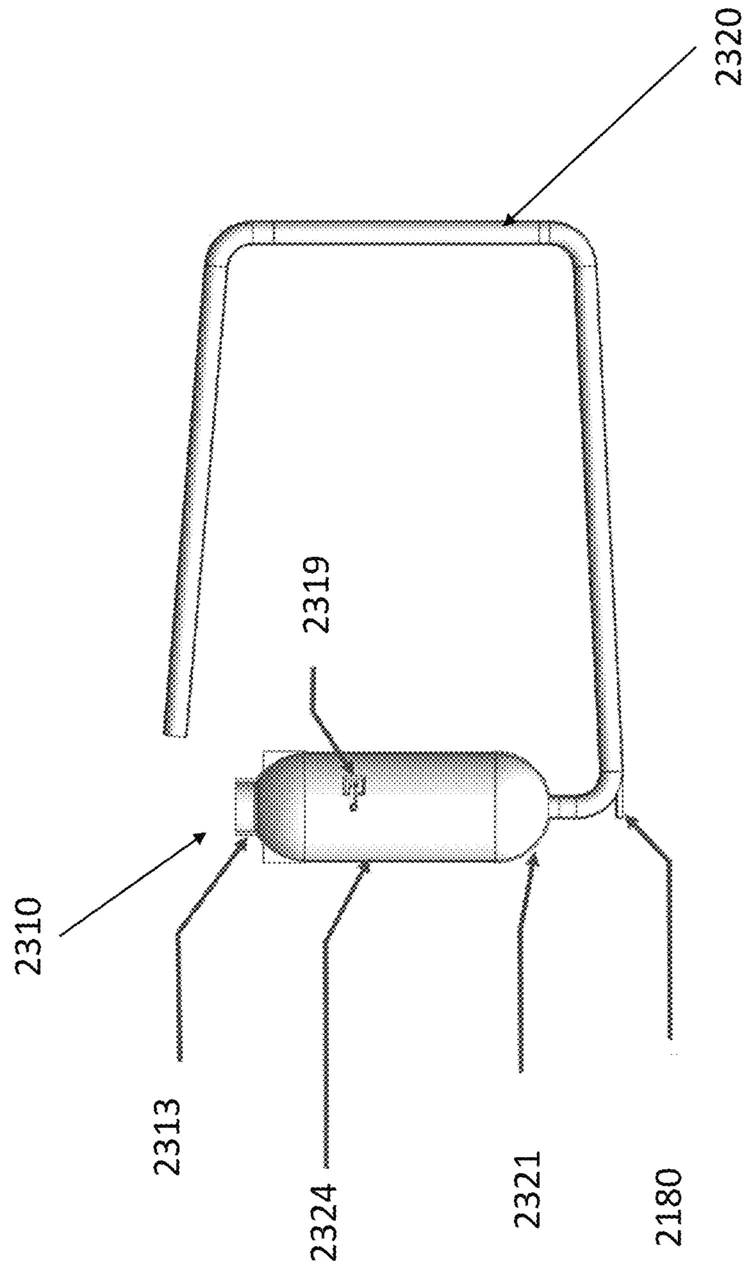

FIG. 23B illustrates an example embodiment of the current disclosure, similar to the example embodiment 2310 discussed above with respect to FIG. 23A. In FIG. 23B, the reactor 2310, shown in a vertical cross section, includes a vessel shell 2324 defining the reactor core located therein, the shell 2324 having an upper head 2313 and a lower head 2321. For example, the shell 2324 may be manufactured by being rolled and welded, and both the upper head 2313 and the lower head 2321 may be manufactured by being forged and machined. In the embodiment shown, the upper head 2313 and the lower head 2321 are connected by a cylindrical middle portion of the shell 2324. In alternative embodiments, the sides of the middle portion of the shell 2324 may be angled to form a frustum shape so that the upper head 2313 and lower head 2321 are different sizes.

In various examples, the reactor 2310 may also include a fill/drain tube 2180 at a lower end thereof, the drain tube being fluidically coupled to an external loop line 2320 that connects to a pump (not shown). In various examples, the external loop line 2320 may be any suitable size or material depending on the fuel salt being used and power output of the reactor 2310. In examples, the fill/drain tube 2180 is coupled to the external loop line 2320 and connects to the lowest point of the fuel salt circuit (i.e., the loop line 2320, the reactor vessel 2324 and the pump), and is configured to allow molten salts and/or molten reactor fuel (not shown) to flow in and out of the reactor core inside the shell 2324.

In the reactor 2310 shown, the reactor 2310 also includes an irradiation tube 2319 formed in an outside surface of the vessel or shell 2324. The irradiation tube 2319 is a tube that penetrates one side of the vessel 2324 but is sealed from the reactor core. The irradiation tube 2319 is configured to provide an access point for the insertion of sensing equipment into the reactor core without requiring contact of the sensing equipment with the fuel salt. For example, the irradiation tube 2319 may have a standard pipe size and may be welded to the shell 2324. In the cross section of the embodiment illustrated, a portion of the tube 2319 is shown where it contacts the far side of the interior of the shell 2324. A stabilizing connection illustrated as a square plate at the irradiation tube 2319 is provided on the interior of the shell 2324 to support the tube and fix the distal end of the tube in place within the reactor vessel 2324.

Figure 23C:
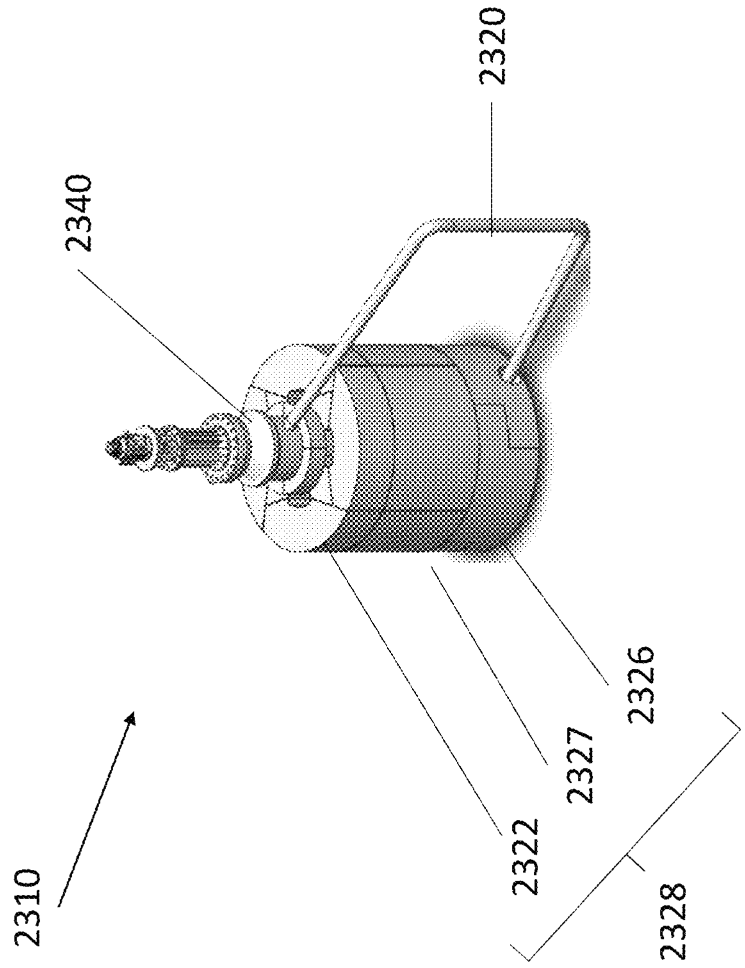

FIG. 23C illustrates the exterior of a nuclear reactor 2310, where the reactor vessel (not shown) is encompassed within an external neutron reflector 2328. In various example embodiments, the external neutron reflector 2328 includes a plurality of modular pieces 2322, 2327 and 2326 that are coupled together to reflect neutrons exiting the encompassed reactor core back into the reactor core. In an embodiment, the material of the external neutron reflector 2328, or of the modular pieces 2322, 2327 and 2326. The reflector material within the modular reflector pieces may be Pb, Pb—Bi alloy, Zr or Zr alloy, steel, iron, graphite, beryllium, tungsten carbide, SiC, BeO, MgO, $ZrSiO_4$, PbO, $Zr_3Si_2$, and $Al_2O_3$ or any combination thereof. For example, in the embodiment shown in FIG. 23C one or more modular pieces 2322, 2327, 2326 may be a vessel-like structure consisting of the outer shell of steel (as described above) filled with a different reflector material, such as MgO. The reflector pieces may be filled with bricks (e.g., sintered bricks), compacted powder or a combination of the two. The shell of modular reflector pieces may be made of 316 H stainless steel ASTM N0630, ASTM B167, ASTM B166, ASTM B574, ASTM B444 or any other steel, now known or later developed, that has sufficient strength, heat, and neutronic damage resistance for the design purpose.

The external neutron reflector 2328 may include several upper reflector pieces 2322, radial reflector pieces 2327, and lower reflector pieces 2326. The pieces may be freestanding and interlocking when assembled. In other examples, the external neutron reflector 2328 may have a dedicated support structure, further discussed below. In this example, the reactor 2310 also includes an external loop line 2320 configured to circulate molten fuel in and out of the reactor 2310, the external loop line 2320 connected a bottom portion of the reactor 2310 to a pump 2316 coupled to an upper portion of the reactor 2310.

Figure 23D:
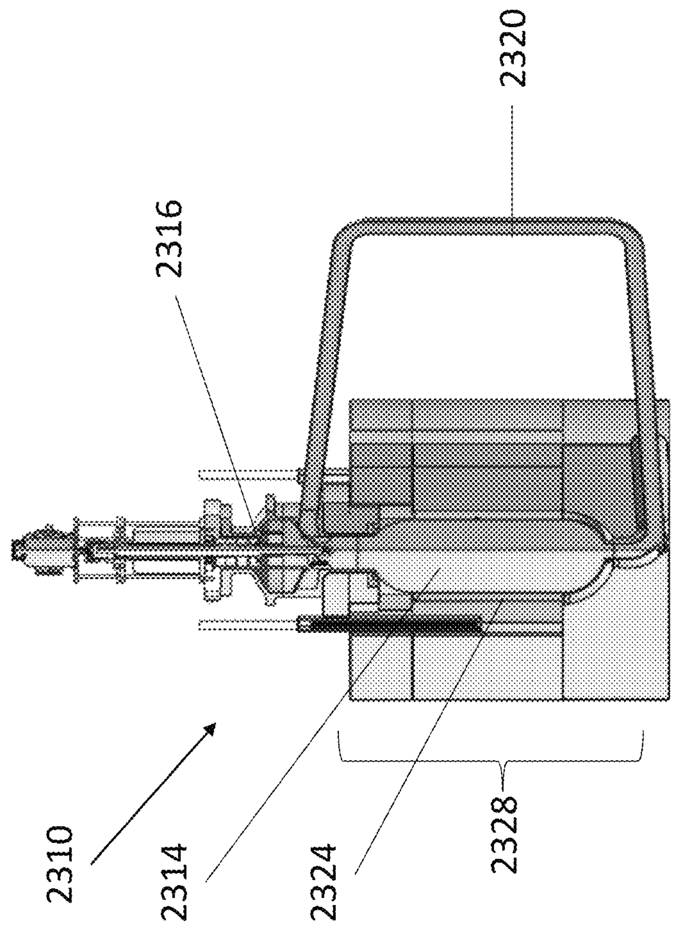

FIG. 23D illustrates a reactor system 2310, according to various example embodiments. For example, the reactor system 2310 may include a reactor core 2314 inside a vessel or shell 2324 encompassed by an external neutron reflector 2328 which includes modular reflectors such as, e.g., an upper reflector, a radial reflector, and a lower reflector. In examples, the vessel or shell 2324 is coupled to an external loop line 2320 that is configured to circulate molten salts and/or molten reactor fuel between a bottom portion of the vessel or shell 2324 and a pump 2316 coupled to an upper portion of the vessel or shell 2324 so that the molten salt may cool down the reactor core 2314 located inside the vessel 2324. In various examples, the vessel or shell 2324 may have a diameter of up to 0.54 m, may accommodate a deadweight load therethrough of 3.2 MT, with a fuel flow path velocity of up to 3.8 m/s and fuel in core velocity of up to 0.14 m/s.

In an embodiment, the neutron reflector 2328, also referred to as shielding vessel 2328, provides additional neutron shielding around the reactor core as an added level of safety and may also serve as a secondary containment vessel in case of a rupture in the reactor core 2314. In an embodiment, the reactor core 2314 and the neutron reflector 2328 are made of solid steel. Based on the operating conditions, which will at least in part be dictated by the fuel selection, any suitable high temperature and corrosion resistant steel, such as 316H stainless, HT-9, a molybdenum alloy, a zirconium alloy (e.g., ZIRCALOY™), SiC, graphite, a niobium alloy, nickel or alloy thereof (e.g., HASTELLOY™ N, INCONEL™ 617, or INCONEL™ 625), or high temperature ferritic, martensitic, or stainless steel and the like may be used. Materials suitable for use as shielding includes steel, borated steel, nickel alloys, MgO, and graphite. For example, in an embodiment all molten fuel-contacting (salt-wetted) components may be made of or cladded with INCONEL™ 625 (UNS designation No6625) to reduce the corrosion of those components.

In the embodiment shown, one or more pumps 2316 are provided to circulate the molten fuel. In an alternative embodiment, the reactor system 2310 is designed to operate under natural circulation and no pump is provided. During operation heated fuel is circulated between the reactor core 2314 where fission heat is generated and the interior surface of the vessel or shell 2324 where the fuel is cooled and the fission heat is removed.

In an embodiment, individual components of the neutron reflector 2328 include a reflector structure, or container, that forms the external surfaces of the component and, thus, the shape of that part of the reflector assembly. The internal volume of the reflector structures are filled, in whole or in part, with reflector material. For example, in an embodiment bricks and/or compacted powder of reflector material are contained within the reflector structures. The reflector structure may be made of steel or any other suitably strong, temperature-resistant, and corrosion-resistant material, as described above with reference to the reactor vessel. The reflector material within the reflector structure may be Pb, Pb—Bi alloy, zirconium, steel, iron, graphite, beryllium, tungsten carbide, SiC, BeO, MgO, $ZrSiO_4$, PbO, $Zr_3Si_2$, and $Al_2O_3$ or any combination thereof.

For example, in the embodiment shown in FIG. 23C the radial reflector 2327 may be single structure consisting of the outer shell of steel (as described above) filled with reflector material. In an embodiment MgO is used as the reflector material in the form of bricks (e.g., sintered bricks), compacted powder, or a combination of the two and the reflector structures themselves are made of 316 H stainless steel with fuel-exposed surfaces clad with INCONEL™ 625. The reflector assembly components are designed to accommodate thermal expansion mis-match and swelling, which results from change in temperature and neutron radiation. For a reflector material such as MgO, the neutron reflector fill material may be processed as a powder, which typically has a 66-85% of theoretical density limit. Secondary operations such as reduction in area from drawing and annealing, and vibratory compaction can produce higher densities.

Figure 23E:
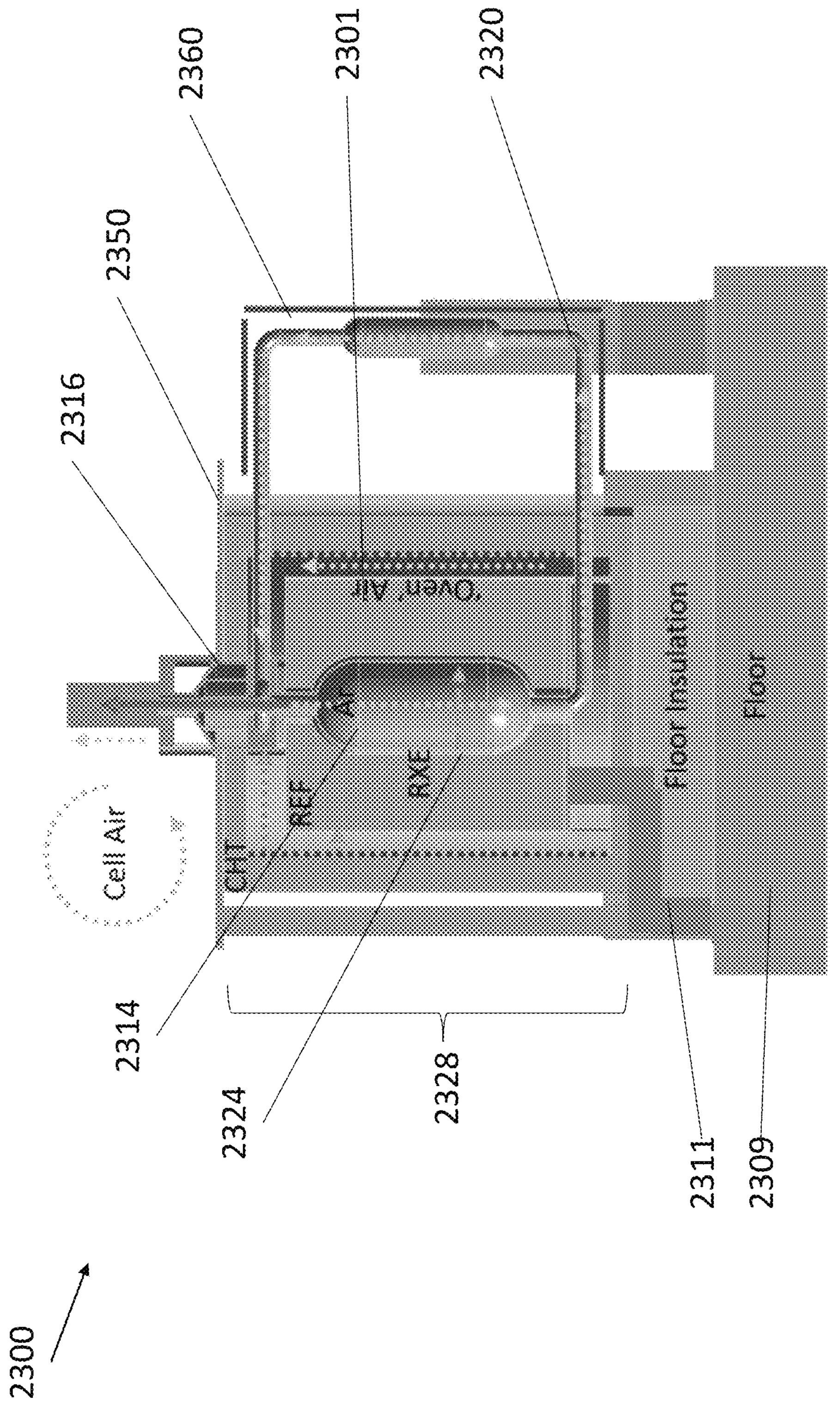

FIG. 23E illustrates a reactor system 2300, according to various example embodiments. For example, the reactor system 2300 includes a reactor core 2314 enclosed within an external neutron reflector 2328 and coupled to an external loop line 2320, the reactor core 2314 and neutron reflector 2328 being inside an oven or furnace 2301. In this example, the reactor core 2314 is inside a vessel or shell 2324, and the vessel or shell 2324 is suspended above a floor 2309 and thermally insulated from the floor 2309 via a floor insulation layer 2311 therebetween.

In example embodiments, the reactor system 2300 also includes a pump 2316 that is fluidically coupled to the vessel or shell 2324 and that is configured to circulate molten salt from the upper portion of the vessel 2324 through the external loop line 2320 and back into the vessel 2324 at the lower intake. In various examples, the pump 2316 is located outside of the vessel or shell 2324 and on the fluid path of the loop line 2320. In this example, the external neutron reflector 2328 is made of, or include, concrete, and the example configuration maintains a maximum temperature of the concrete to be lesser than 100° C. In various examples, the reactor system 2300 may be supported by a support structure 2350, and the external loop line 2320 and pump 2316 may be disposed in an insulating structure 2360 so as to maintain control of the temperature therein.

Figure 24A:
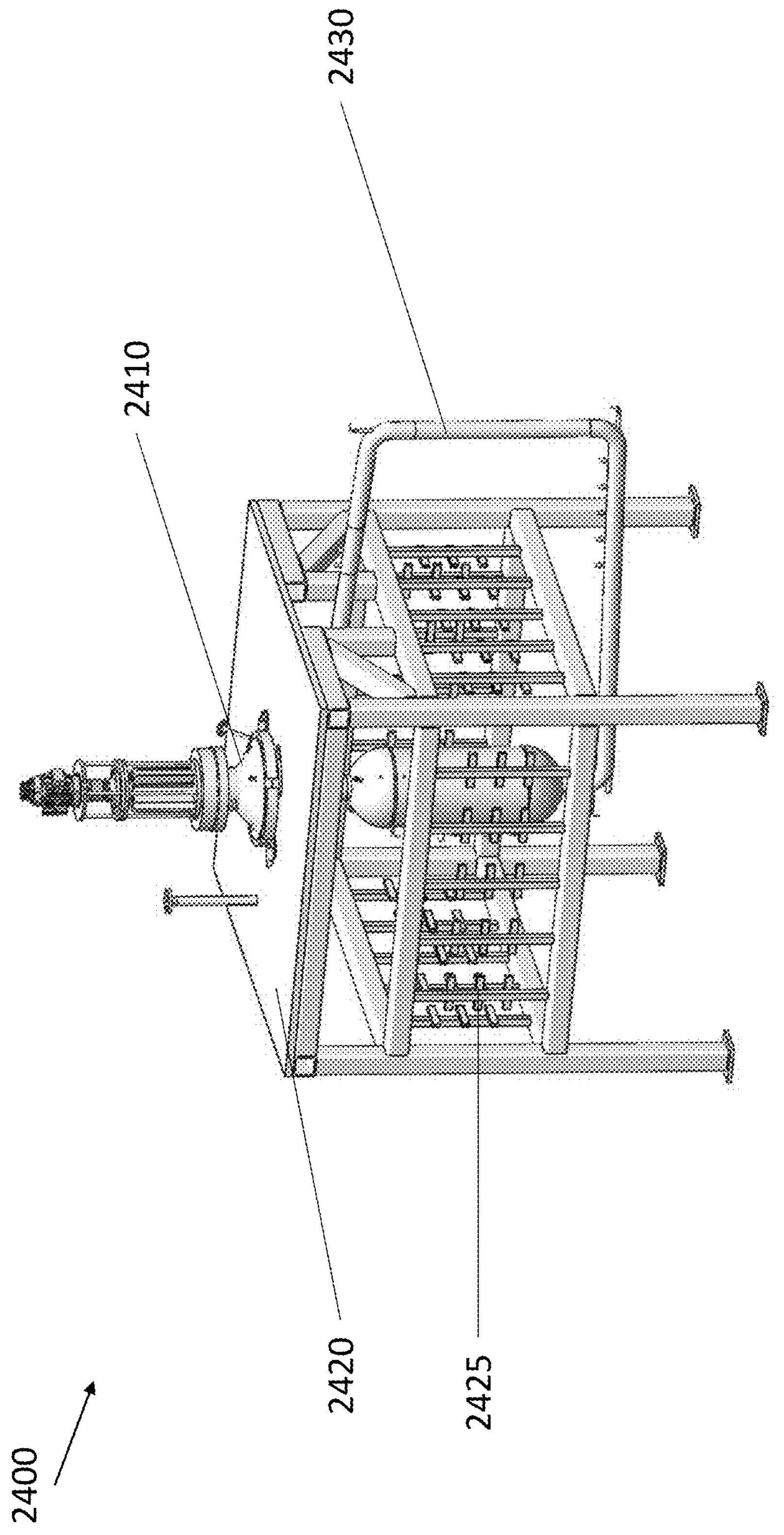
FIGS. 24A-24F are illustrations of a reactor arrangement with a modular neutron reflector, in accordance with various examples of the disclosure.
Figure 24B:
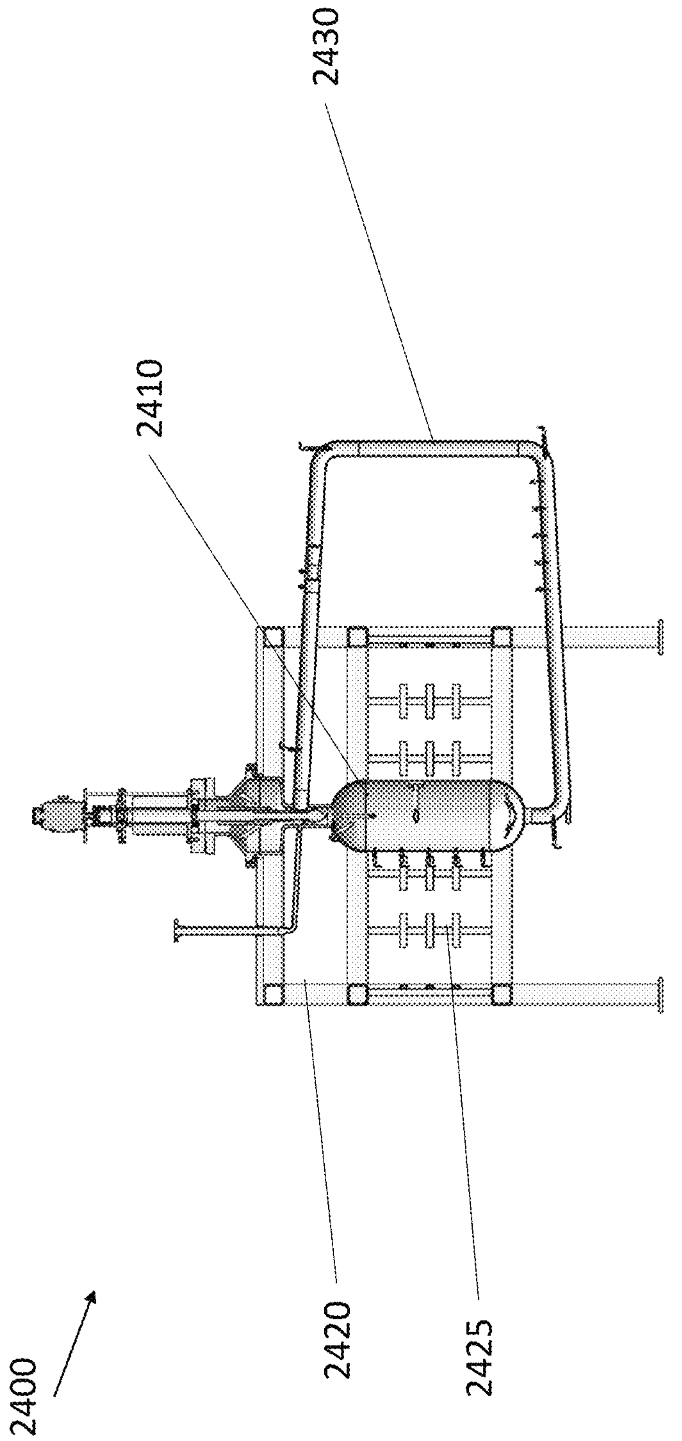

FIGS. 24A-24F are illustrations of a reactor arrangement 2400 with a modular neutron reflector, in accordance with various examples of the disclosure. In FIGS. 24A-24B, a reactor system 2410 such as, e.g., the reactor systems 2310 discussed above, is coupled to a heating structure 2420 including a plurality of heating panels 2425. In examples, the reactor system 2410 includes a plurality of control rods 2415. In other examples, the reactor system 2410 includes an external loop line 2430, the external loop line 2430 being similar to, e.g., external loop line 2320 discussed above, and having substantially the same function in relation to the reactor system 2410 as the external loop line 2320 has with the reactor system 2310.

Figure 24C:
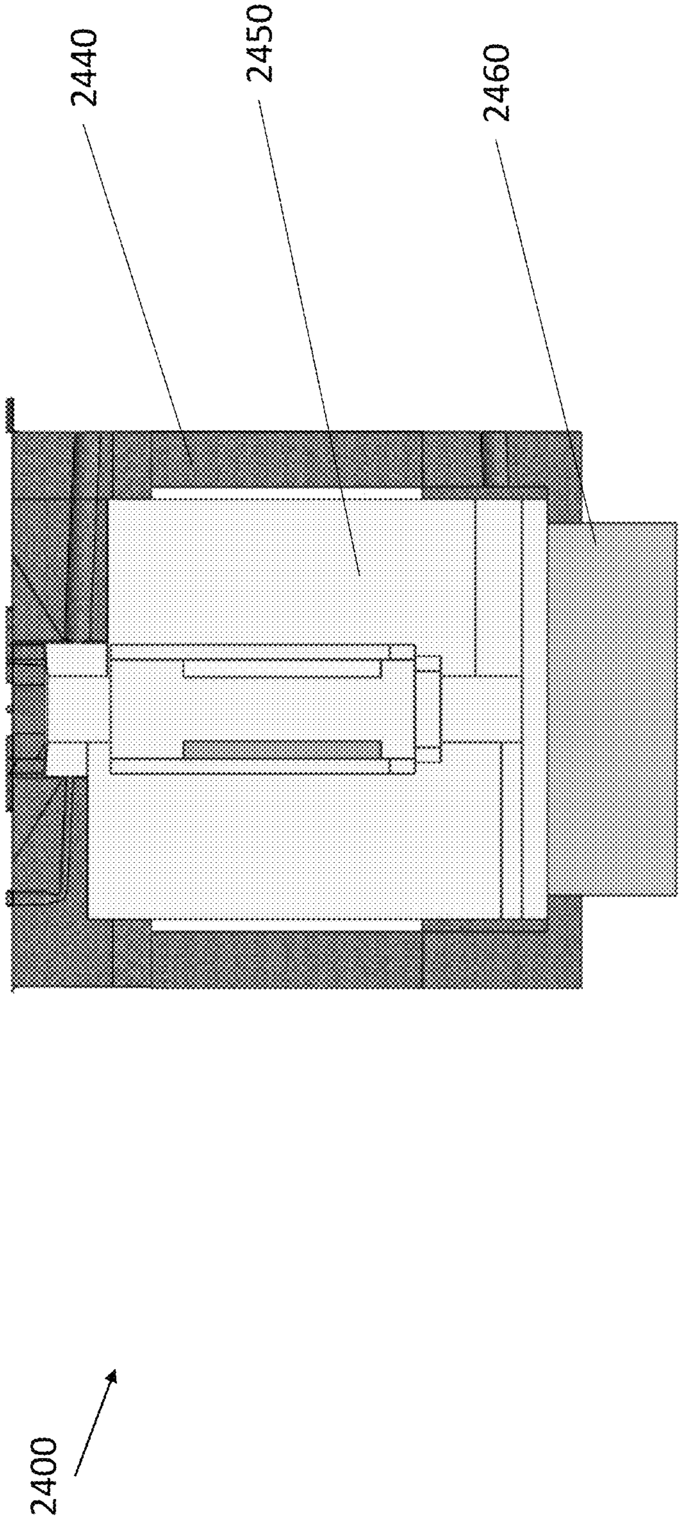
Figure 24D:
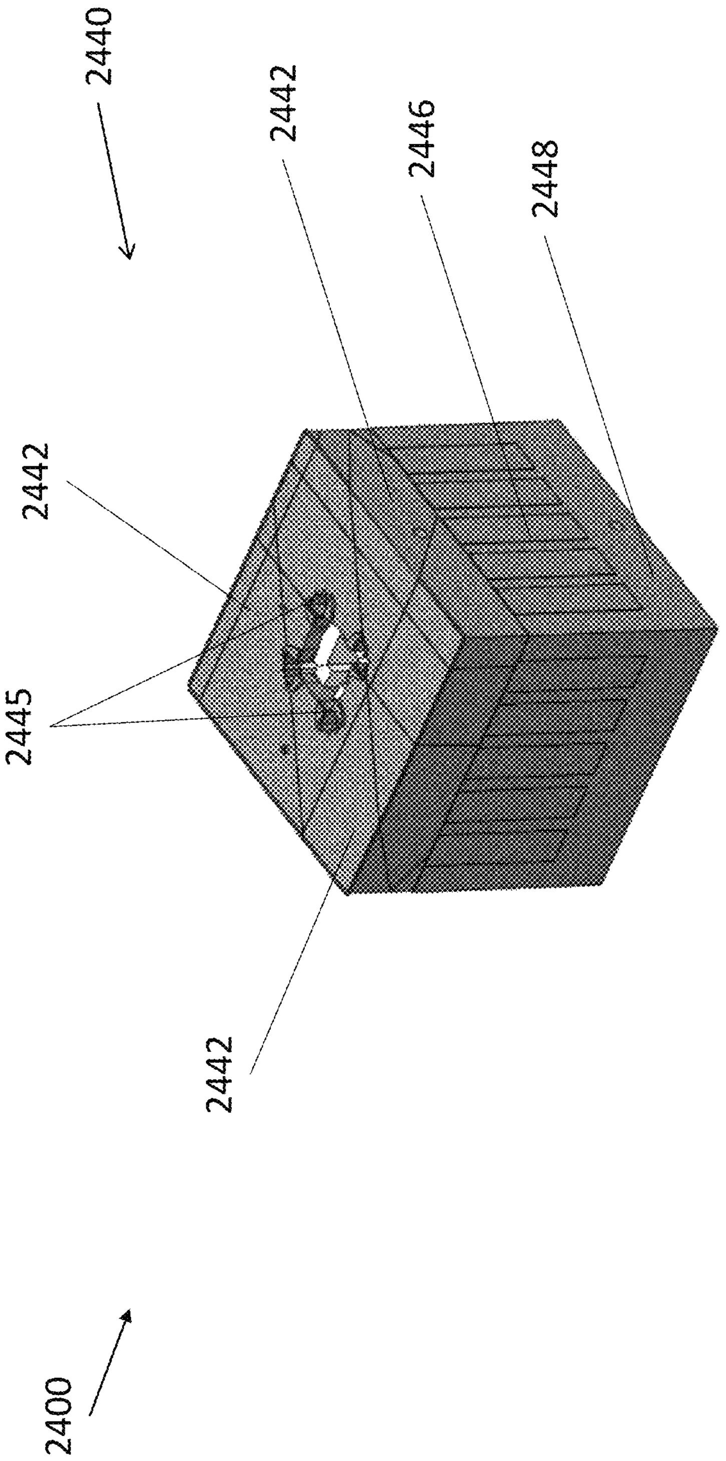

FIG. 24C is a cross-section of a modular neutron reflector 2440, according to various examples of the disclosure. For example, the modular neutron reflector 2440 is configured to enclose a reactor therein in the space 2450, and including an insulating support 2460 to provide both support and insulation to a reactor system enclosed within the modular neutron reflector 2440. FIG. 24D is a perspective view of the modular neutron reflector 2440, according to various examples of the disclosure. For example, the modular neutron reflector 2440 includes a plurality of modules 2442-2448. In examples, the modular neutron reflector 2440 includes one or more upper nuclear reflectors 2442, a radial reflector 2446 and a lower reflector 2448. In other examples, the modular neutron reflector 2440 includes a plurality of control access ports 2445.

Figure 24E:
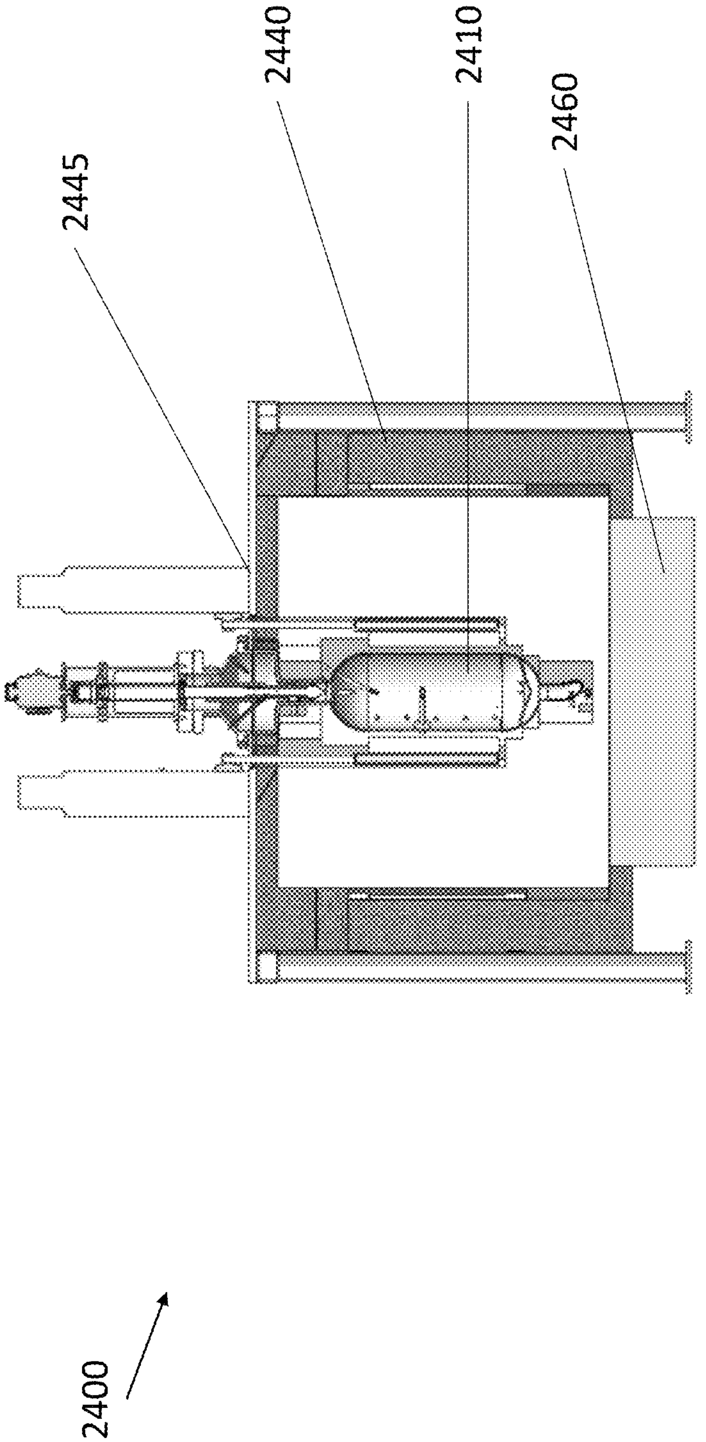
Figure 24F:
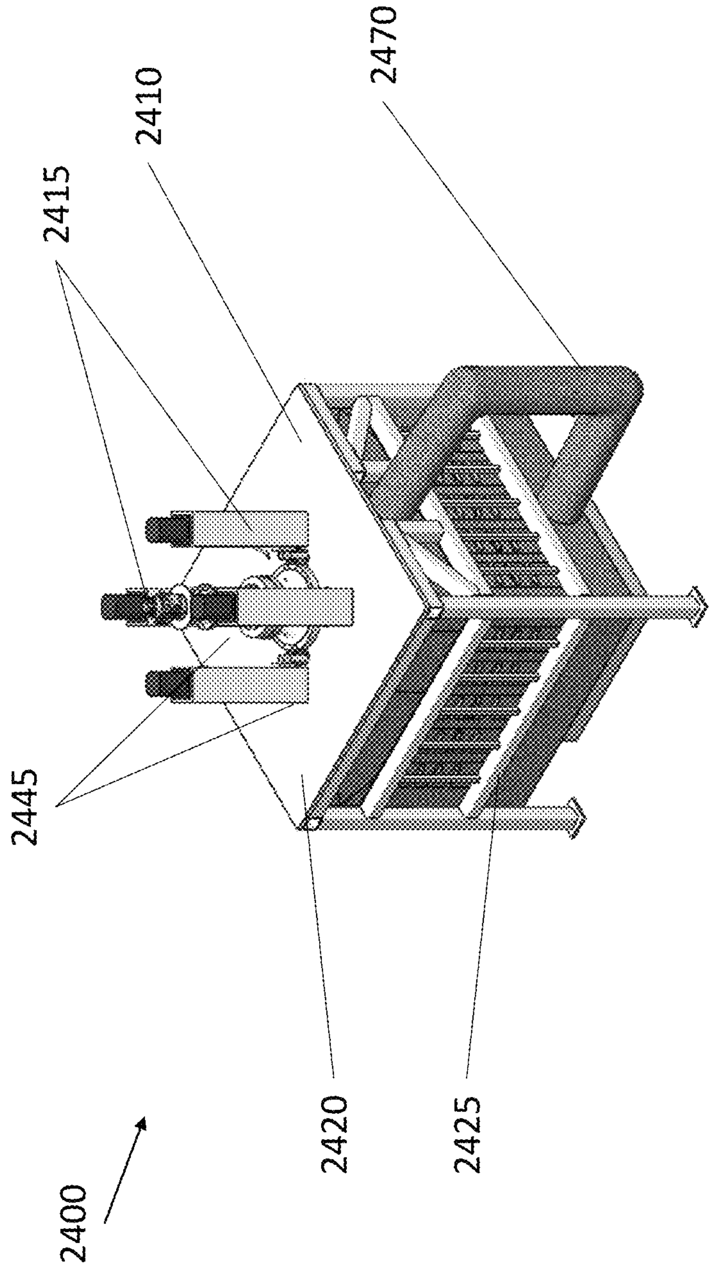

FIG. 24E is a cross-section illustrating the reactor arrangement 2400 in operation, according to various examples of the disclosure. For example, the modular neutron reflector 2440 encloses a reactor system 2410 supported by insulating support 2460 and includes one or more control access ports 2445. FIG. 24F is a perspective view illustrating the reactor arrangement 2400. In examples, the modular neutron reflector 2440 is coupled to a heating structure 2420 and enclosing a reactor system 2410. In various examples, the reactor system 2410 is coupled to the heating structure 2420, the heating structure 2420 including the heating panels 2425. In various examples, the modular neutron reflector 2440 includes an insulating portion 2470 that covers the external loop line (not shown) of the reactor system 2410. In examples, the reactor system 2410 includes a plurality of control rods 2415 located in corresponding control access ports 2445.

Figure 25:
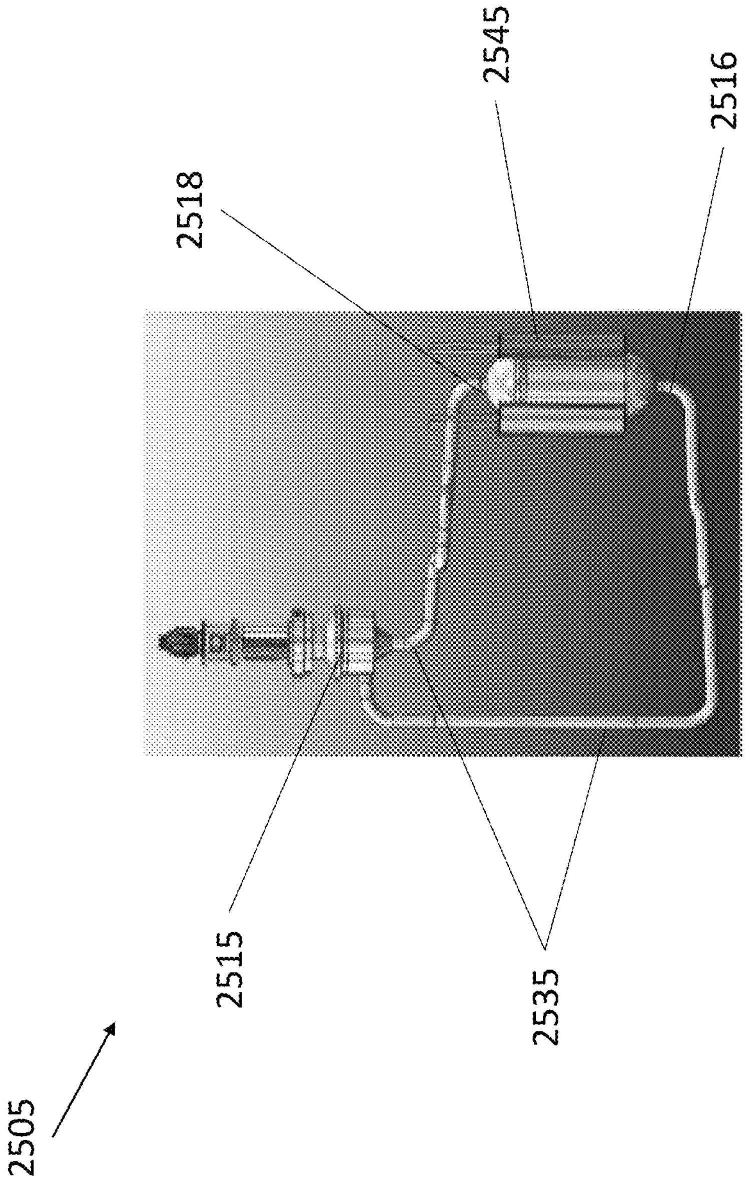
FIG. 25 illustrates a reactor system according to various examples of this disclosure.

FIG. 25 illustrates a reactor system 2505, according to various examples of this disclosure. In FIG. 25, the reactor system 2505 includes a reactor core 2545 coupled to an impeller housed in housing 2310 via external loop line 2535. In examples, the loop line 2535 circulates molten salts and/or molten reactor fuel in and out of the reactor core 2545 via a pump (not shown) housed in housing 2515. In this example, an outlet 2518 of the reactor core 2545, which is the portion of the reactor core 2545 that is configured to circulate the molten salts and/or molten reactor fuel into the reactor core 445 via the loop line 2535 under action of the pump, is located at an uppermost portion of the reactor core 2545, and another outlet 2516 at a lowermost portion of the reactor core 2545 is configured to circulate the molten reactor fuel or salts out of the reactor core 2545.

Figure 26:
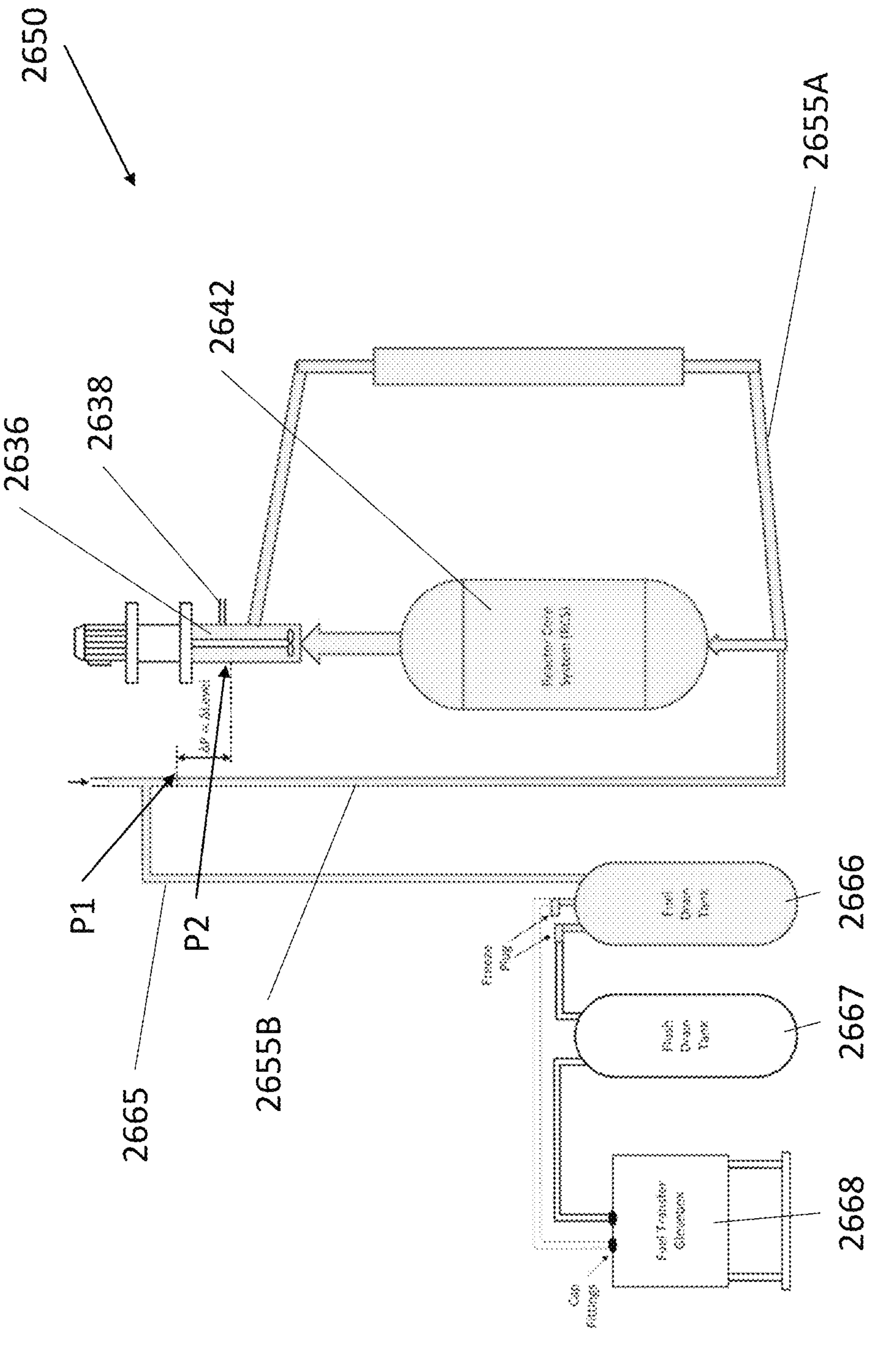
FIG. 26 illustrates a reactor arrangement according to various examples of this disclosure.

FIG. 26 illustrates a reactor 2650, according to various examples of this disclosure. The reactor 2650 includes a vessel or shell 2642 that includes a reactor core or chamber therein and that is coupled to a first portion of loop line 2655A, the first portion of loop line 2655A being configured to circulate molten salts and/or molten reactor fuel in and out of the vessel or shell 2642 under action of the pump 2636. This example shows a single standpipe 2655B for the reactor. In this configuration, there is a level offset P2-P1 with the pump level when flowing. For example, the level offset P1-P2 may be measured, calibrated, and used as a level-based flow rate measurement. In example embodiments, the vessel or shell 2642 is also coupled to a salt supply line 2665, the salt supply line 2665 being configured to supply molten salts and/or molten reactor fuel into the reaction chamber via a supply line 2655B. In various examples, the second portion of supply line 2655B is fluidically coupled to the bottom portion of the vessel or shell 2642 and to the salt supply line 2665.

In examples, the salt supply line 2665 is fluidically coupled to a fuel salt overflow/drain tank 2666, a flush salt drain tank 2667, and a fuel transfer glovebox 2668, in addition to the second portion of supply line 2655B. The flush salt (e.g., a non-nuclear salt compatible with the fuel salt) may be used to prepare the reactor system for receiving the fuel salt. Flush salt may also be used to flush the reactor system 2650 after removal of the fuel salt. Flush salt may be further be used to dilute the fuel salt to reduce the fuel salt's fissile material density and, thus, its reactivity.

In various examples, the level of fuel salt in the second portion of supply line 2655B, indicated by point P1, is higher than a level of fuel salt at a cover gas system 2636 above the vessel or shell 2642, indicated by point P2. A cover gas system 2636 is illustrated above the vessel or shell 2642. As discussed above, the cover gas system 2636 maintains the pressure of the cover gas in the headspace above the fuel salt in the head of the vessel or shell 2642 and also cleans the cover gas. The system 2636 may include a pump or blower (not shown) for pressure control and any number of vessels for raw gas storage, contaminant removal and contaminant storage. In other example, the cover gas system 2636 may also include a gas pressure relief valve 2638.

Figure 27A:
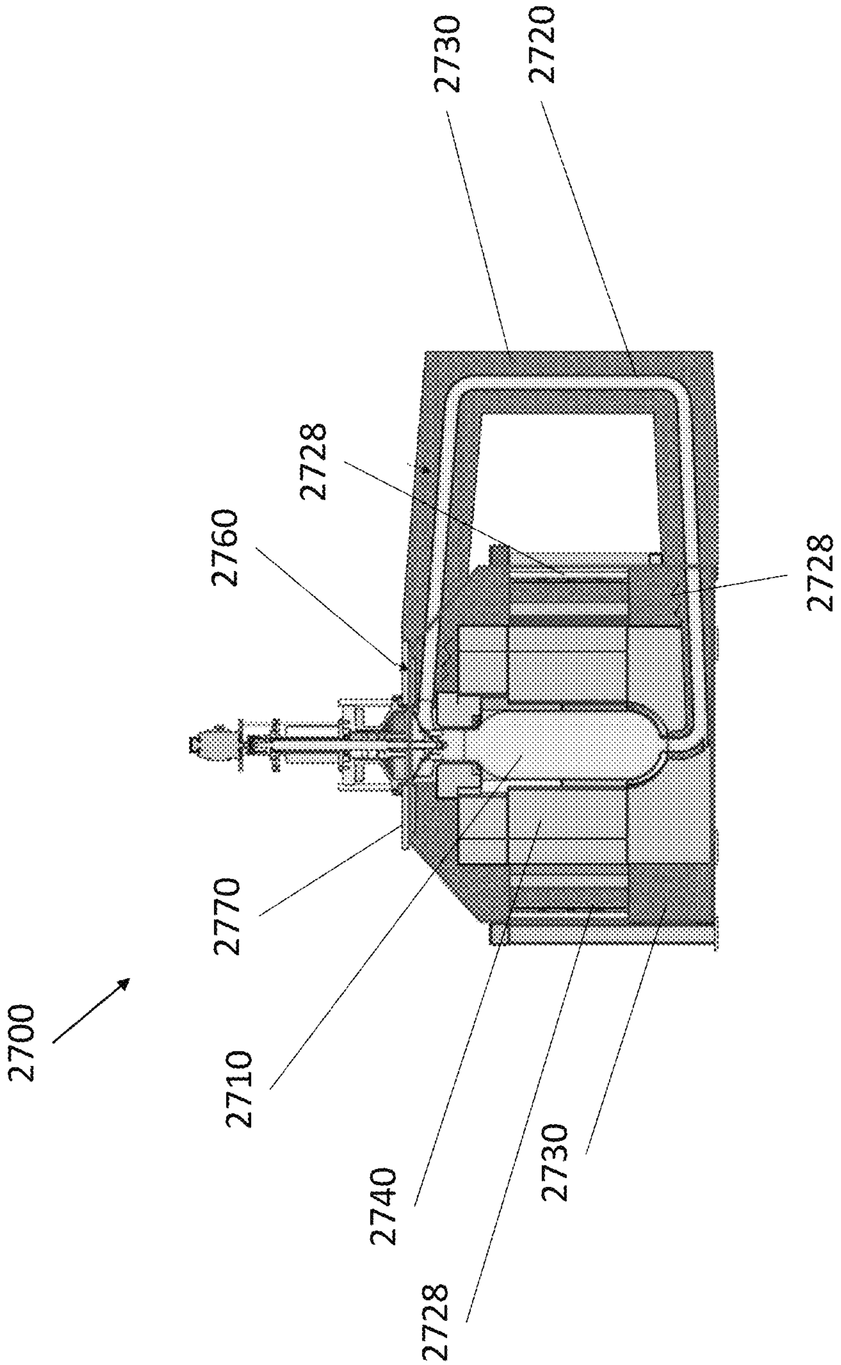
FIGS. 27A and 27B illustrate a reactor arrangement according to various examples of the present disclosure.
Figure 27B:
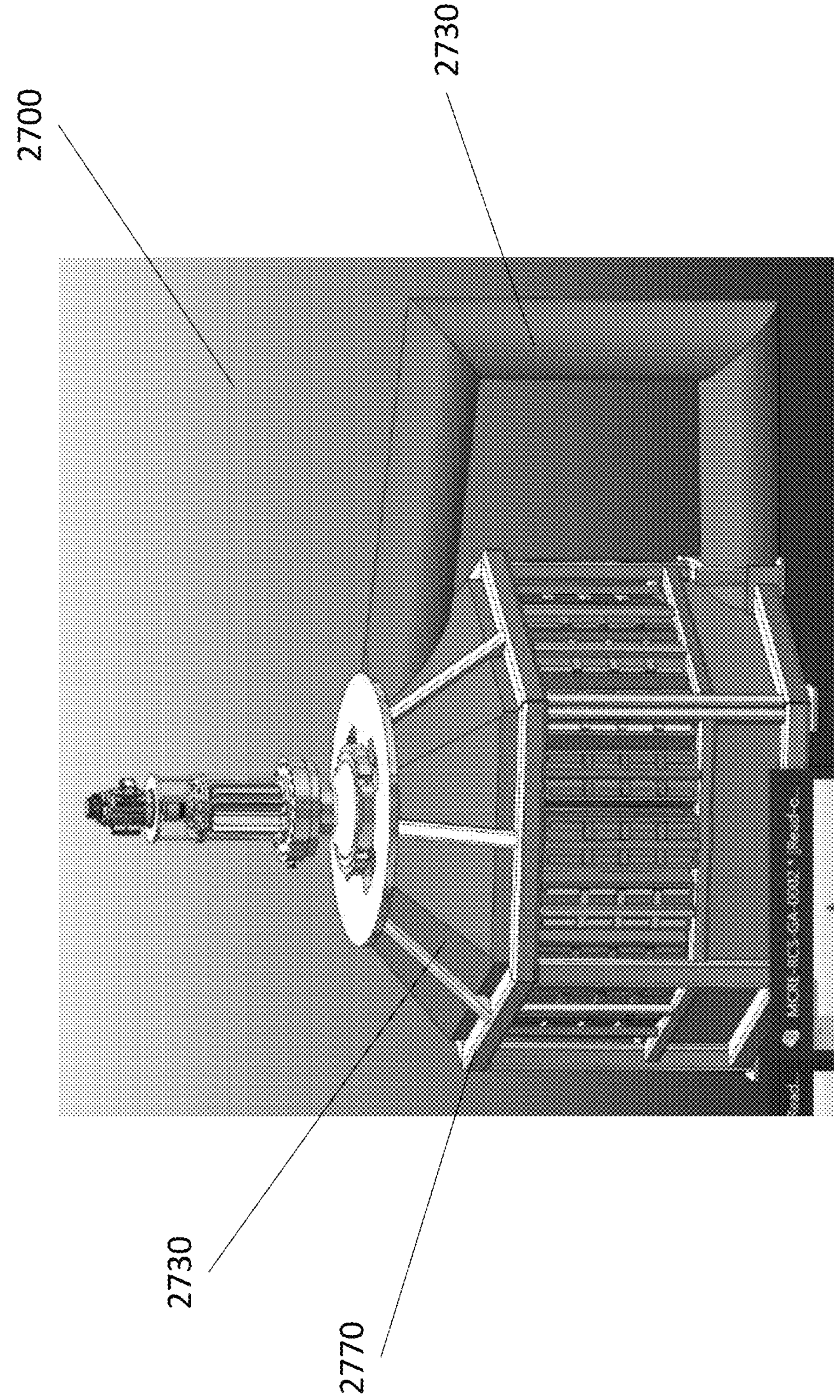

FIGS. 27A and 27B illustrate a reactor arrangement according to various examples of the present disclosure. In FIG. 27A, the reactor 2700 includes a reactor vessel 2710 defining a chamber that forms the reactor core when in operation. The vessel 2710 is fluidly coupled to a loop line 2720 configured to circulate molten salts and/or molten reactor fuel into and out of the vessel 2710. During operation, hot molten fuel salt in the reactor core, warmed by the ongoing fission of the nuclear material in reactor core, is circulated from the top of the reactor vessel, through the pump and into the upper leg of the loop line 2720. The molten salt then flows around the loop line 2720 and back into the reactor vessel 2710 at the bottom of the vessel 2710.

In embodiments, some or all of the exterior surface loop line 2720 is covered with a heater 2728 and insulation 2730 configured to maintain or set a temperature throughout the length of the loop line 2720. One or more heaters 2728 may also be used to heat some or all of the exterior surface of the reactor vessel 2710, the pump chamber or any other portion of the reactor.

In an embodiment, the heater 2728 is a heat trace. A heat trace is an electrical system used to maintain or raise the temperature of pipes and vessels. The electric heating is achieved by utilizing a resistant element that is run alongside the piping or vessel. Current heat trace technology utilizes a self-regulating polymer including a semi-conductive heating matrix that controls the wattage of the element. The heat trace may be in the form of a tape or cable that is wound around the exterior surface of the reactor vessel and the loop line. Alternative heater technologies, such as a heating jacket into which a heated fluid is circulated, may also be used or may be used instead of the heat trace. The exterior of the heater 2728 or the reactor as a whole may be encompassed in insulation 2730 to slow heat loss from the reactor vessel 2710 and external loop line 2720.

In this aspect, the reactor vessel 2710 and external loop line 2720 may be considered to be within a furnace 2760 that is capable of heating the salt within to operational temperatures. The furnace may encompass some or all of the external loop line 2720 as well as the reactor vessel 2710 depending on where the heaters 2728 and insulation 2730 are located. In the embodiment shown, the furnace 2760 is around the reactor vessel 2710 and only a portion of the upper and lower parts of the external loop line 2720. In an alternative embodiment, the furnace may encompass all of the salt containing components.

In FIG. 27A, the reactor 2700 includes an external neutron reflector assembly 2740, which may be modular and consist of a number of individual reflector components as discussed in greater detail elsewhere. In the embodiment shown, the neutron reflector 2740 is within the furnace 2760 and is heated by the heaters and surrounded by insulation 2730. Heaters may be incorporated into the neutron reflector components or between the individual components. In various examples, the insulation 2730 may be made of, or include, ceramic wool or another insulating material, and may have a sufficient thickness to achieve the desired salt temperatures.

FIG. 27B is a perspective view of the reactor 2700 discussed above with respect to FIG. 27A showing the exterior surfaces of an embodiment of the reactor 2700. The majority of the exterior surface of the reactor 2700 covers the insulation 2730 around the external loop line 2720 and the reactor vessel 2710.

In the embodiment shown, the reactor 2700 also includes one or more heating panels 2770 configured to heat the vessel 2710. The vessel 2710 is coupled to the heating panels 2770 and illustrated as having a space between the components of the reflector assembly 2740 and the exterior surface of the vessel 2710. In various examples, the heating panel 2770 may have a symmetric polyhedral shape with the reactor core being coupled to an apex of the heating panels 2770, as illustrated in FIG. 27B.

In an embodiment, the reactor 2700 in FIGS. 27A and 27B maintains the reactor vessel 2710 and external loop line 2720 in an airtight enclosure filed with an inert gas such as argon (Ar). The airtight enclosure may be partially or completely formed by the exterior reactor components such as the external neutron reflector 2740 and the insulation 2730. Alternatively, an airtight cover (not shown) may surround the exterior of the components of the reactor 2700. Regardless, in the embodiment any void spaces within the reactor 2700 around the salt containing equipment are filed with inert gas. To the extent that there is ever a leak of molten salt from the vessel 2710 or the loop line 2720, the airtight enclosure provides an additional system of containment and prevents any molten fuel or fission products from exiting the reactor 2700.

Figure 28A:
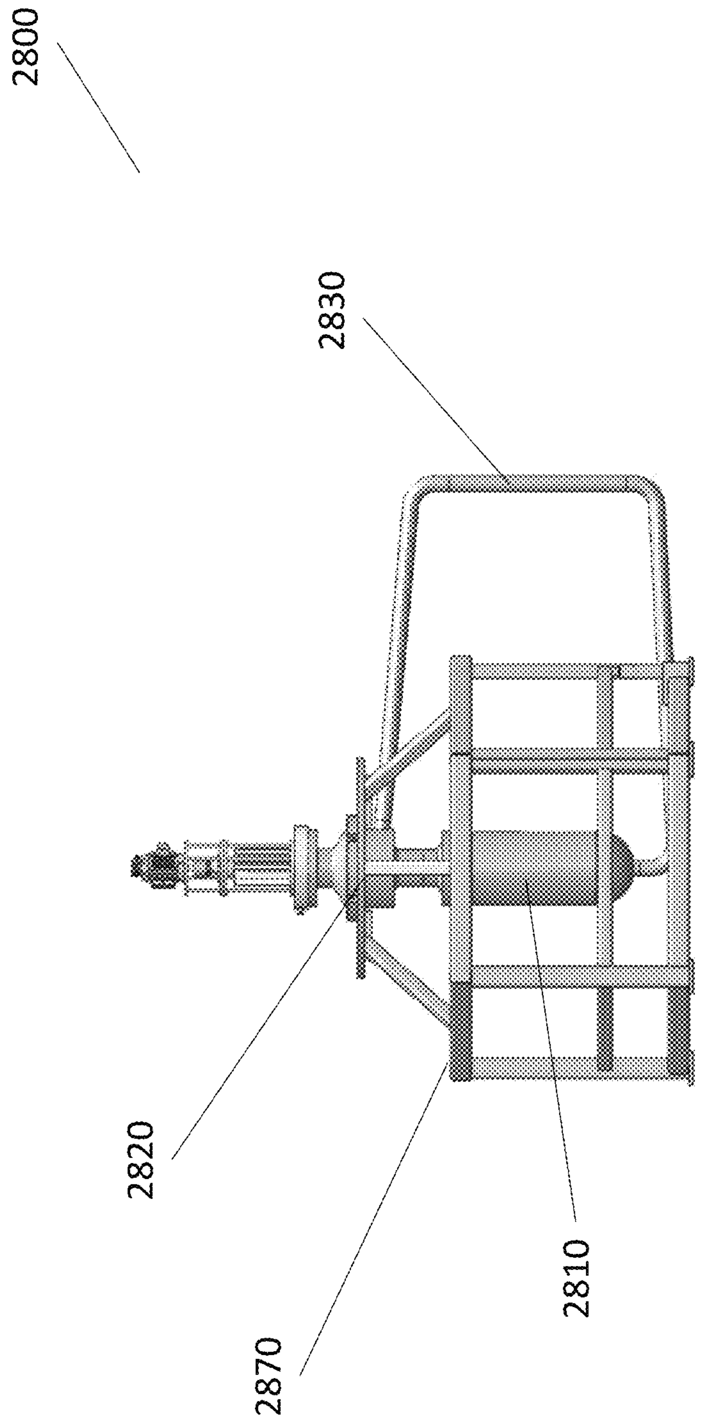
FIGS. 28A and 28B illustrate a reactor arrangement according to various examples of the present disclosure.
Figure 28B:
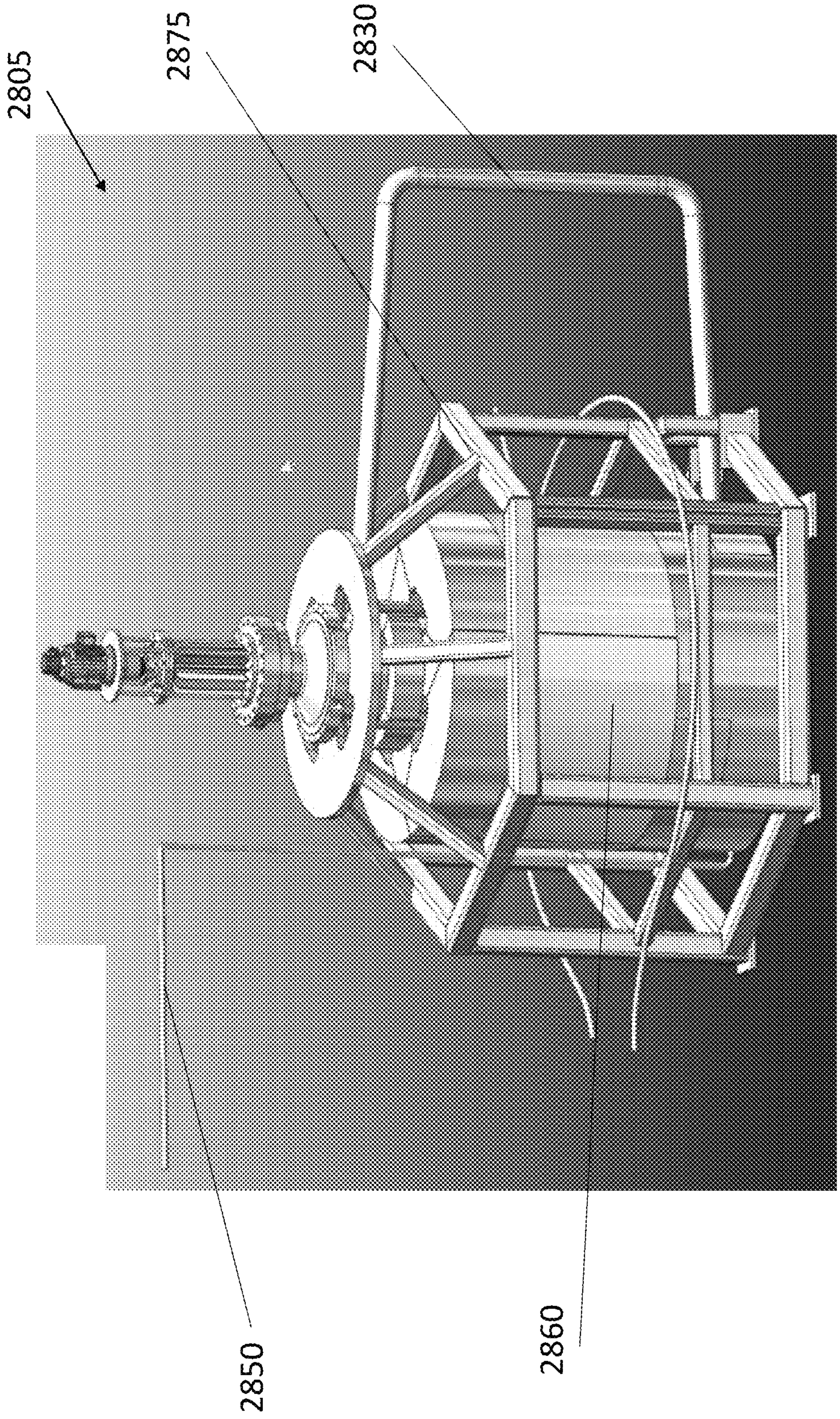

FIGS. 28A and 28B illustrate a reactor arrangement according to various examples of the present disclosure. For example, FIG. 28A illustrates a reactor 2800, according to various example embodiments. In examples, the reactor 2800 includes a vessel or shell 2810 including a reactor core (not known) supported by a symmetric polyhedral-shaped support structure 2870. The reactor 2800 may also include a pump 2820 coupled to the vessel or shell 2810 that is fluidically coupled to an external loop line 2830 configured to circulate molten salts and/or molten reactor fuel in and out of the vessel or shell 2810. For example, the symmetric polyhedral-shaped support structure 2870 may include a ring girder and a support underneath, and may be coupled to the pump housing 2820.

FIG. 28B is a perspective view of a reactor 2805, according to various examples. In FIG. 28B, the reactor core (not shown) is fluidically coupled to external loop line 2830 and to a supply line 2850 configured to supply reactor fuel to the reactor 2805. The reactor core may also be covered by a modular neutral reflector 2860, and be supported by a symmetric polyhedral-shaped support structure 2875 similar to the support structure 2870 discussed above with respect to FIG. 28A.

Figure 29:
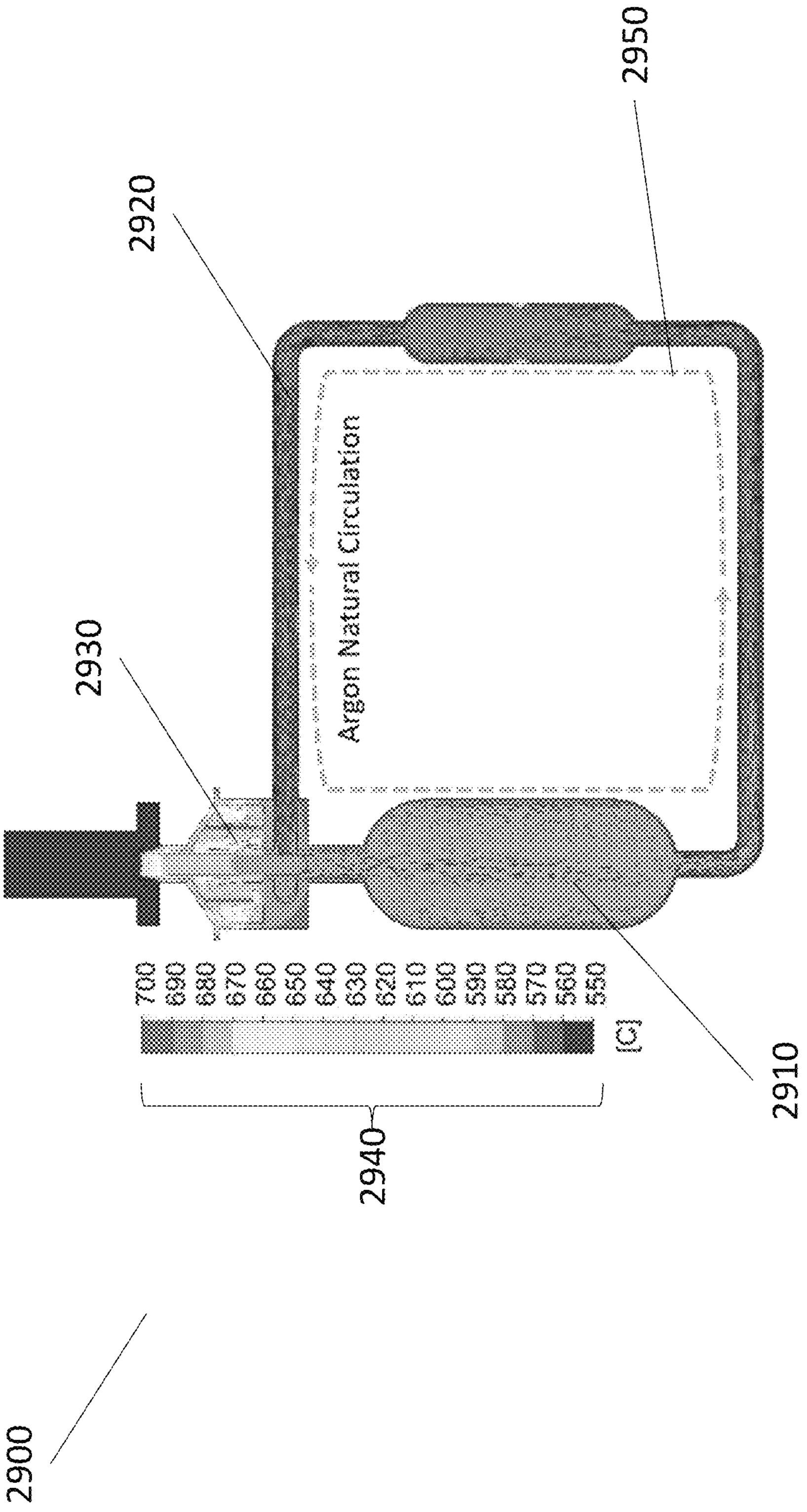
FIG. 29 is an illustration of the thermal configuration of a reactor system according to various examples of the disclosure.

FIG. 29 is an illustration of the thermal configuration of a reactor system according to various examples of the disclosure. In FIG. 29, a reactor 2900 includes a vessel or shell 2910 that defines a reactor core, the vessel or shell 2910 being fluidically coupled to an external loop line 2920. In examples, an external pump 2930 may be on the fluid path of the external loop line 2920, and causes the circulation of Argon gas to travel into and out of the vessel or shell 2910. In other examples, a pump may be provided anyway in the loop line 2920 and not above the vessel 2910 as shown. Also in FIG. 29, a temperature scale 2940 provides an indication of the temperature of the Argon gas circulating in the external loop line 2920 based on one model of a steady operational state of the reactor 2900. Based on the temperature scale 2940, the temperature of the molten salt while travelling in the external loop line 2920 and the pump is in a range of 670° C.-700° C. while the reactor core is critical.

Figure 30A:
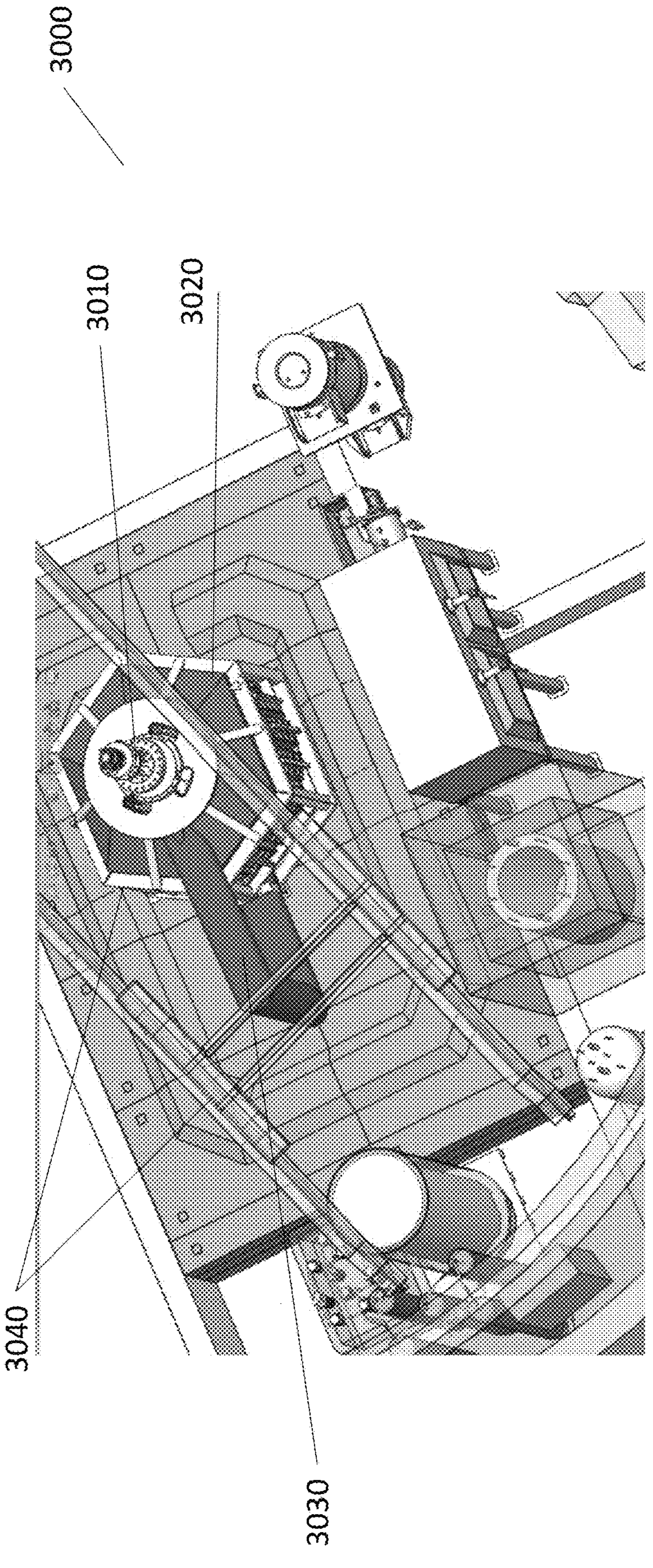
FIGS. 30A and 30B are perspective views of a reactor arrangement according to various examples.
Figure 30B:
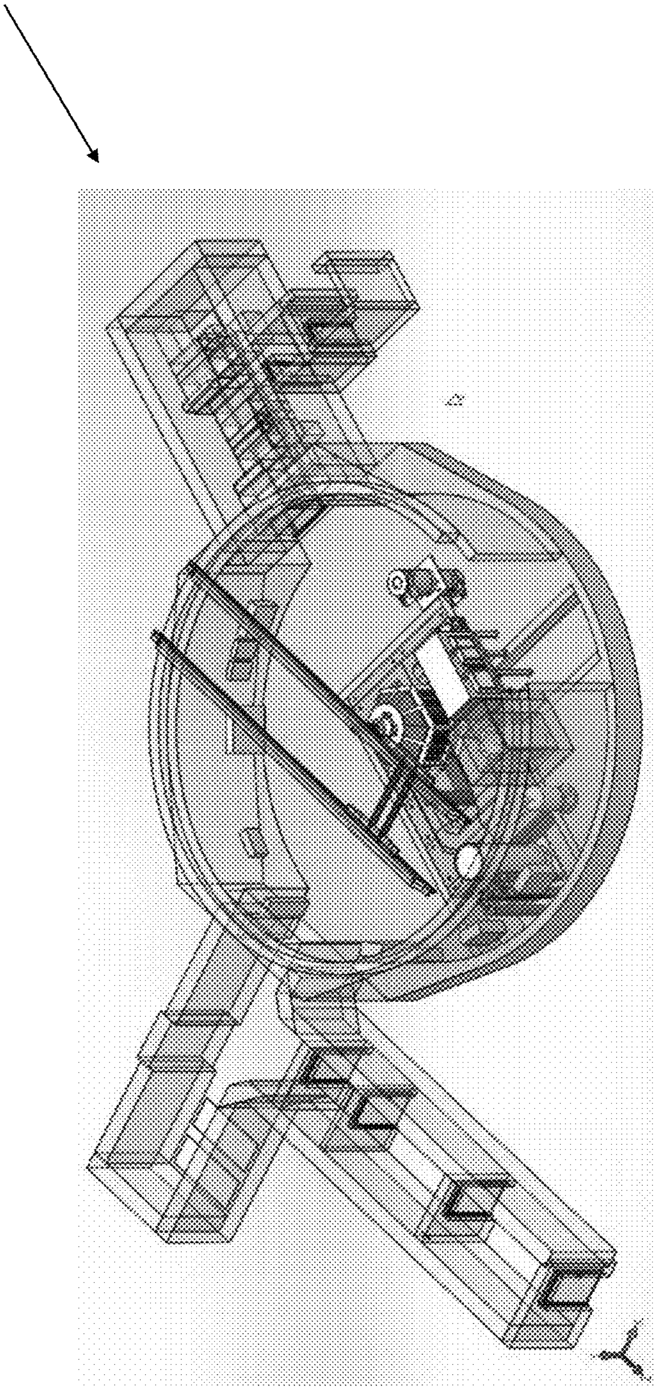

FIGS. 30A and 30B are perspective views of a reactor 3000, according to various examples. For example, the reactor 3000 may include a reactor core 3010 supported by a support structure 3070. In examples, the reactor 3010 is arranged within a trace heat 3020, and an exterior loop line (not shown) configured to circulate molten salts in and out of the reactor core 3020 is covered by a trace heat 3030, both trace heats 3020 and 3030 are configured to maintain or control the temperature therein. In various examples, the reactor core 3000 and the trace heats 3020 and 3030 are supported by a support structure 3040 that may be, e.g., a symmetric polyhedral-shaped support structure similar to the structure 2870 discussed above with respect to FIGS. 28A-28B.

Figure 31A:
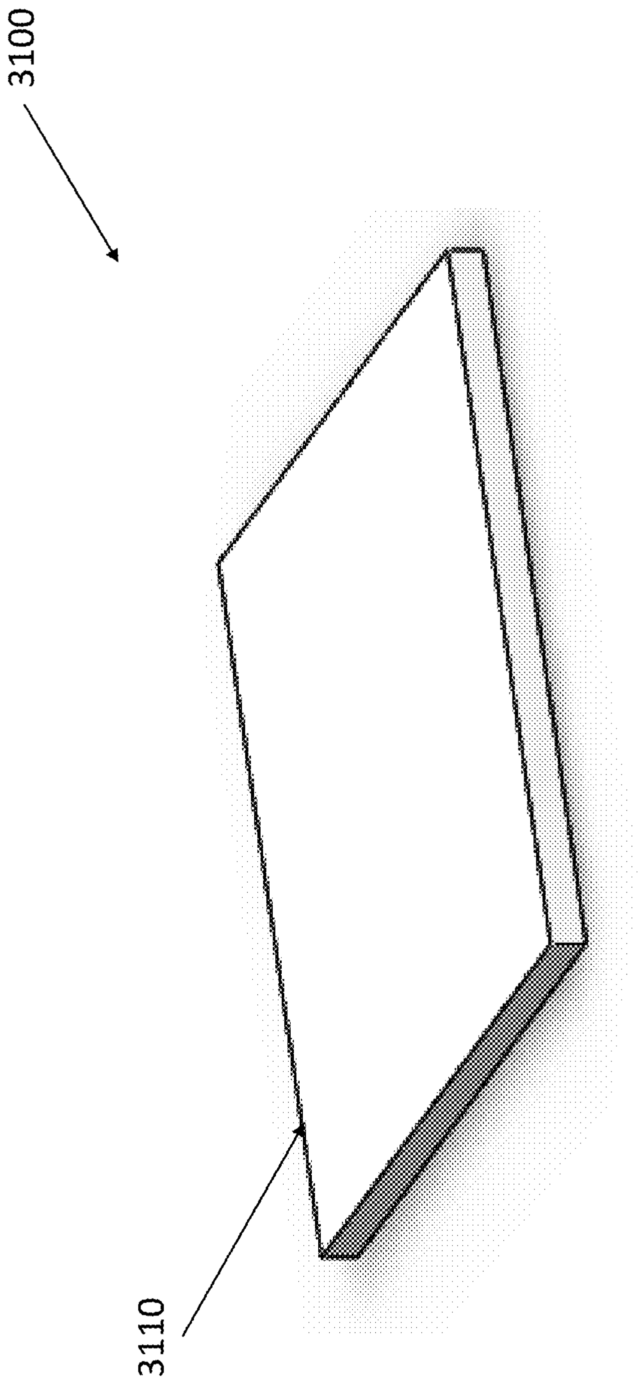
FIGS. 31A-31J are perspective views of a modular neutron reflector during various stages of assembly, according to various examples of the disclosure.
Figure 31B:
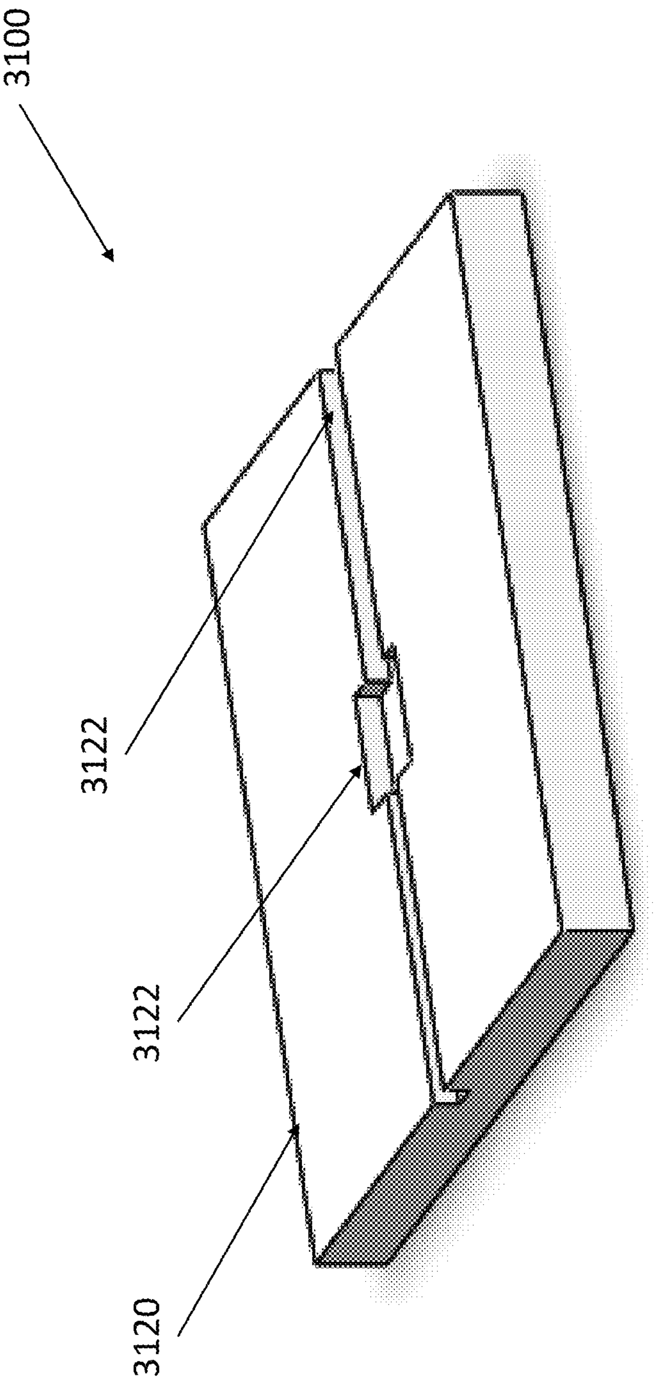
Figure 31C:
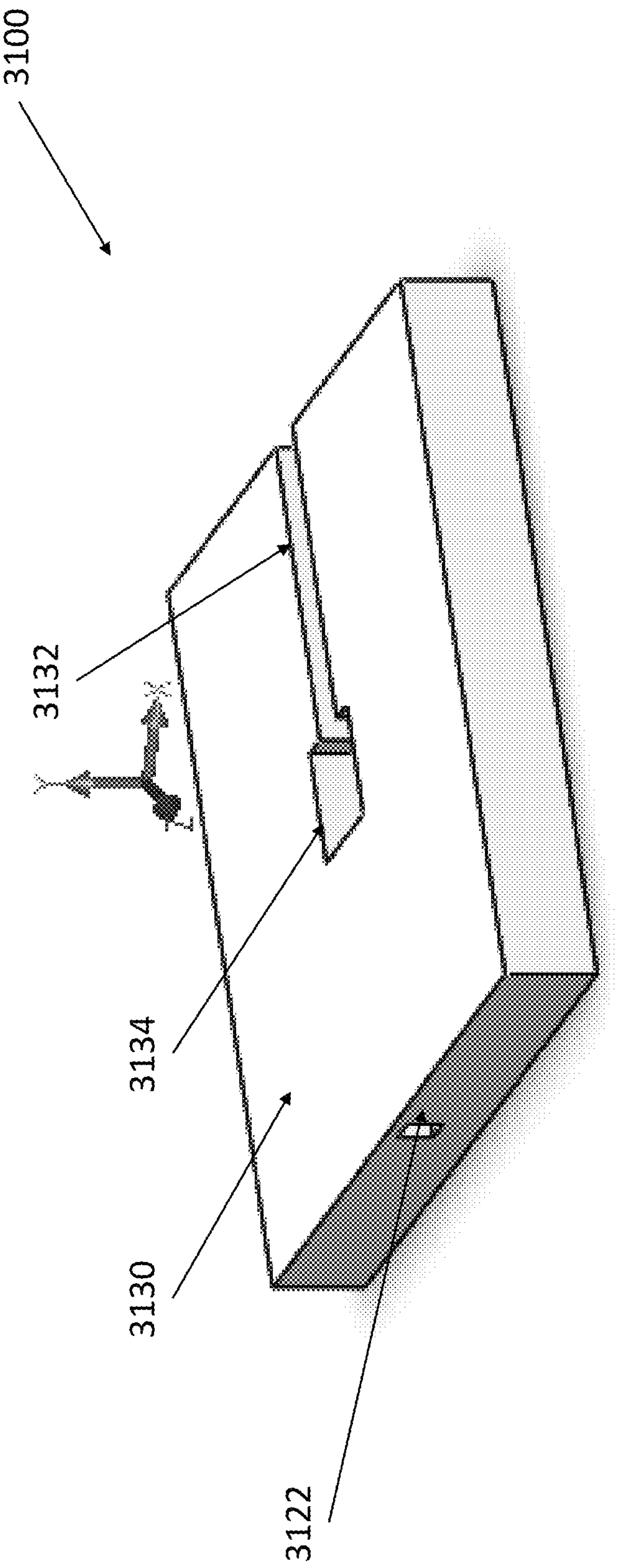
Figure 31D:
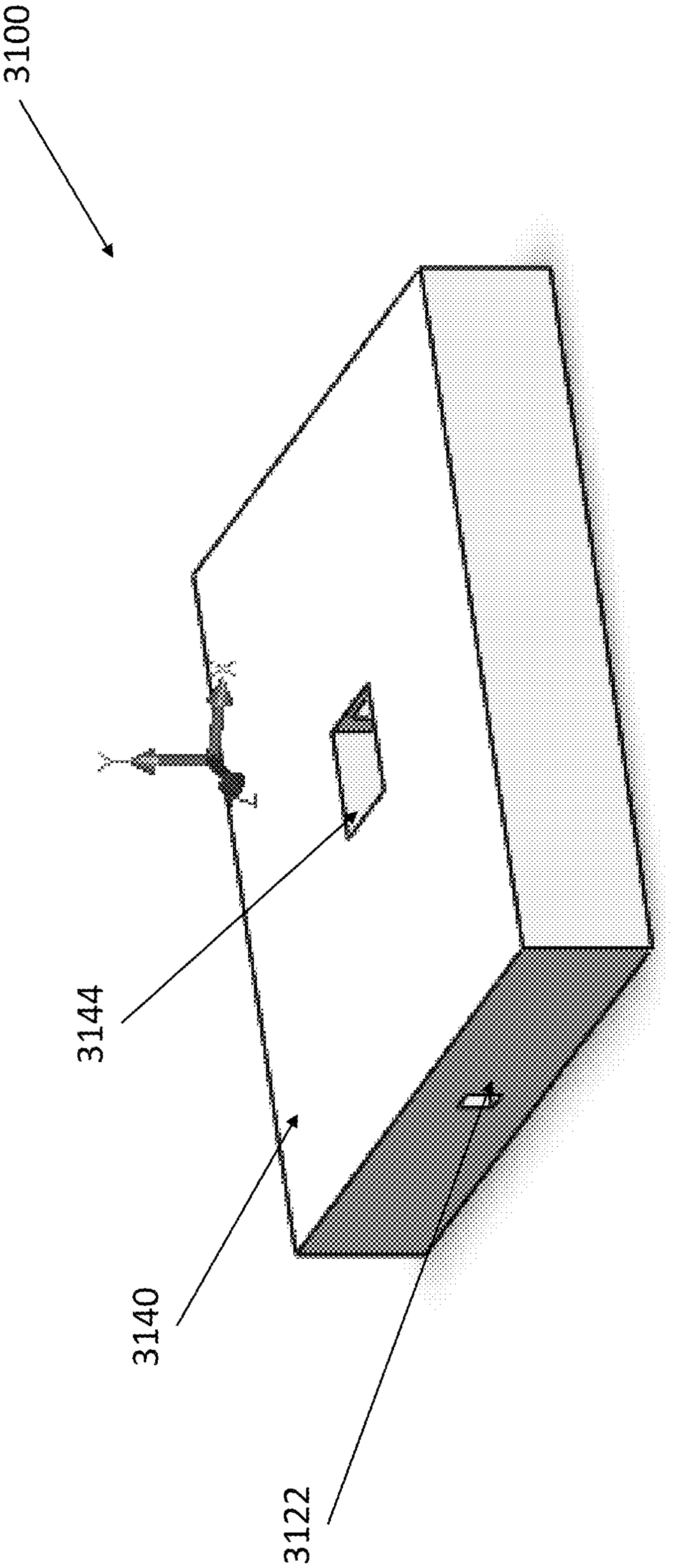
Figure 31E:
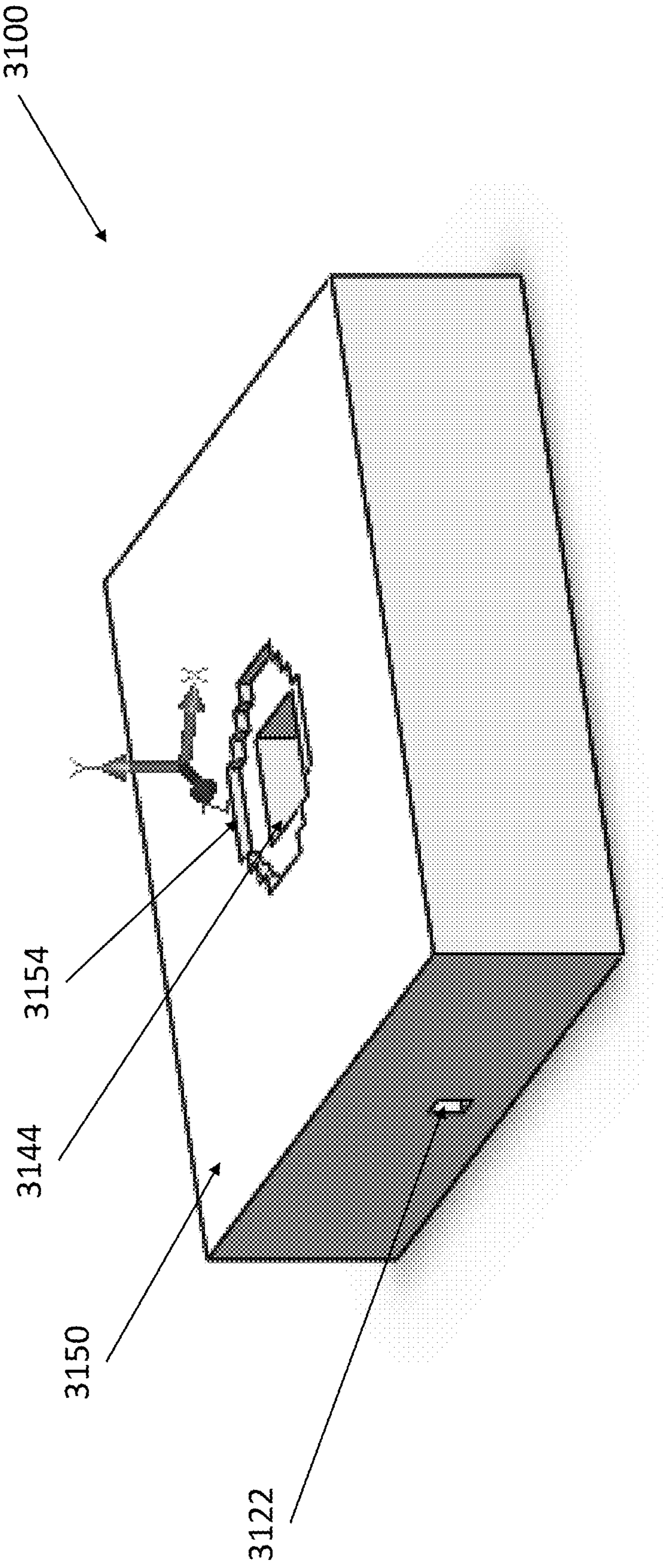
Figure 31F:
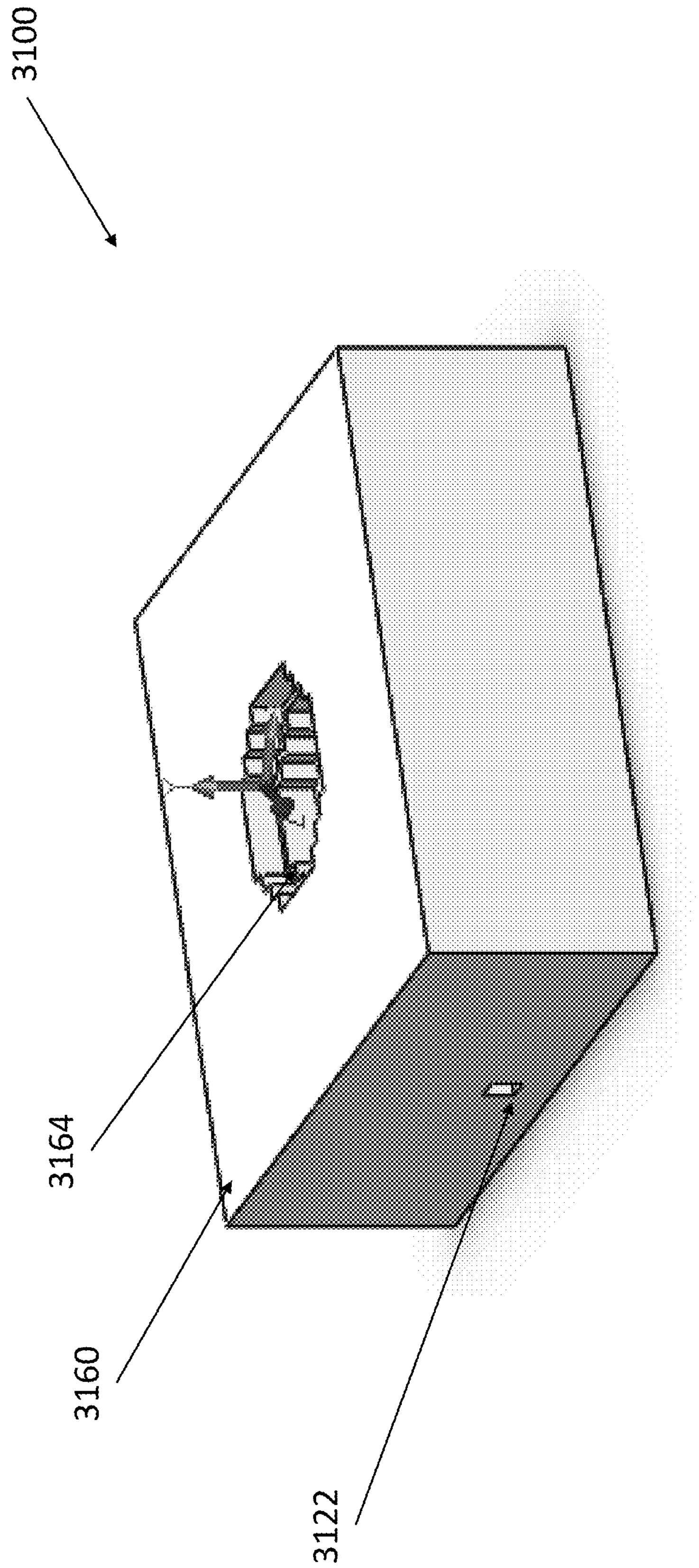

FIGS. 31A-31J are perspective views of a modular neutron reflector, also referred to as stack brick reflector, during various stages of assembly, according to various examples of the disclosure. In FIGS. 31A-31J, a modular neutron reflector 3100 is shown in various stages of assembly. In FIG. 31A, a first portion or module 3110 of the modular neutron reflector 3100 is illustrated. Additional portions or modules 3120-3180 are provided to assemble the modular neutron reflector 3100. For example, FIG. 31B illustrates a module 3120 formed over module 3110 and that includes a ridge 3122 and an opening 3124, the opening 3124 constituting, e.g., an access port to allow the inclusion of a control rod. In another example, FIG. 31C illustrates another module 3130 formed over module 3120, the module 3130 including opening 3134 and ridge 3132. As module 3130 is formed over module 3120, the ridge 3122 remain visible underneath the module 3130. In other example, FIG. 31D illustrates another module 3140 formed over module 3130, the module 3140 including an opening 3144. In yet another example, FIG. 31E illustrates module 3150 formed over module 3140, the module 3150 including an opening 3154. In examples, the opening 3150 may be larger than the opening 3144 of module 3140. In yet another example, FIG. 31F illustrates module 3160 formed over module 3150. In example, module 3160 includes an opening 3164 that may be, e.g., about the same size of the opening 3154 formed in module 3150.

Figure 31G:
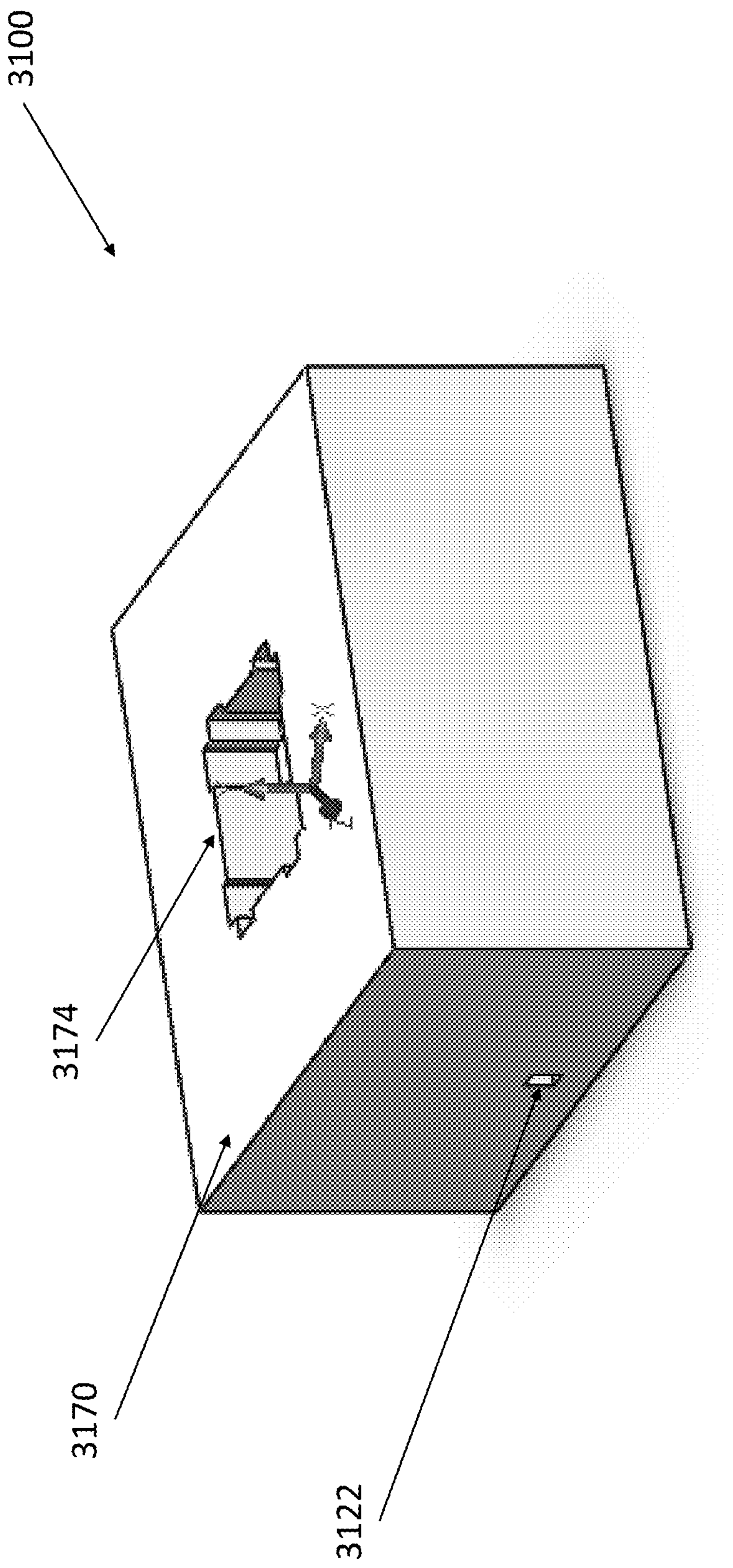
Figure 31H:
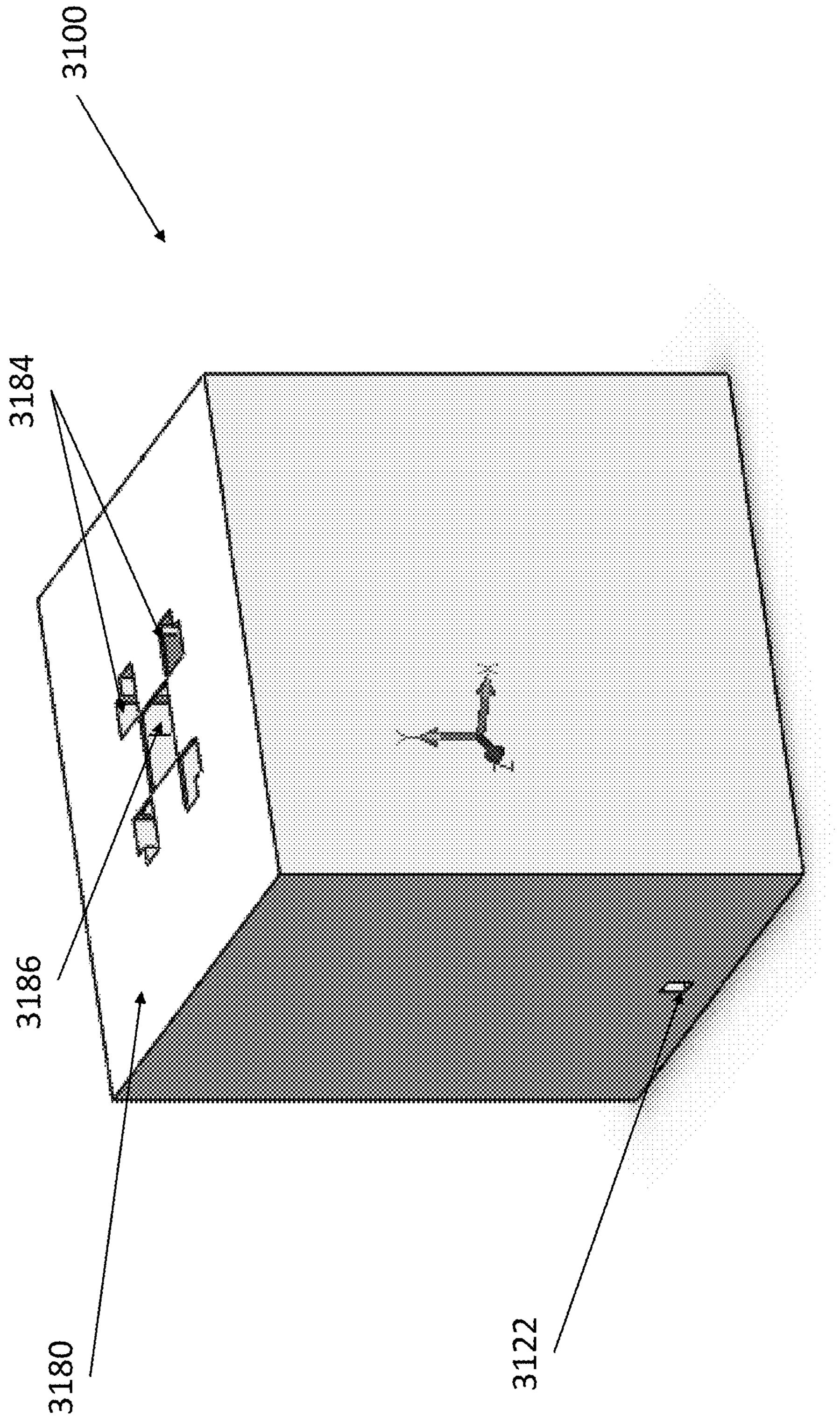
Figure 31I:
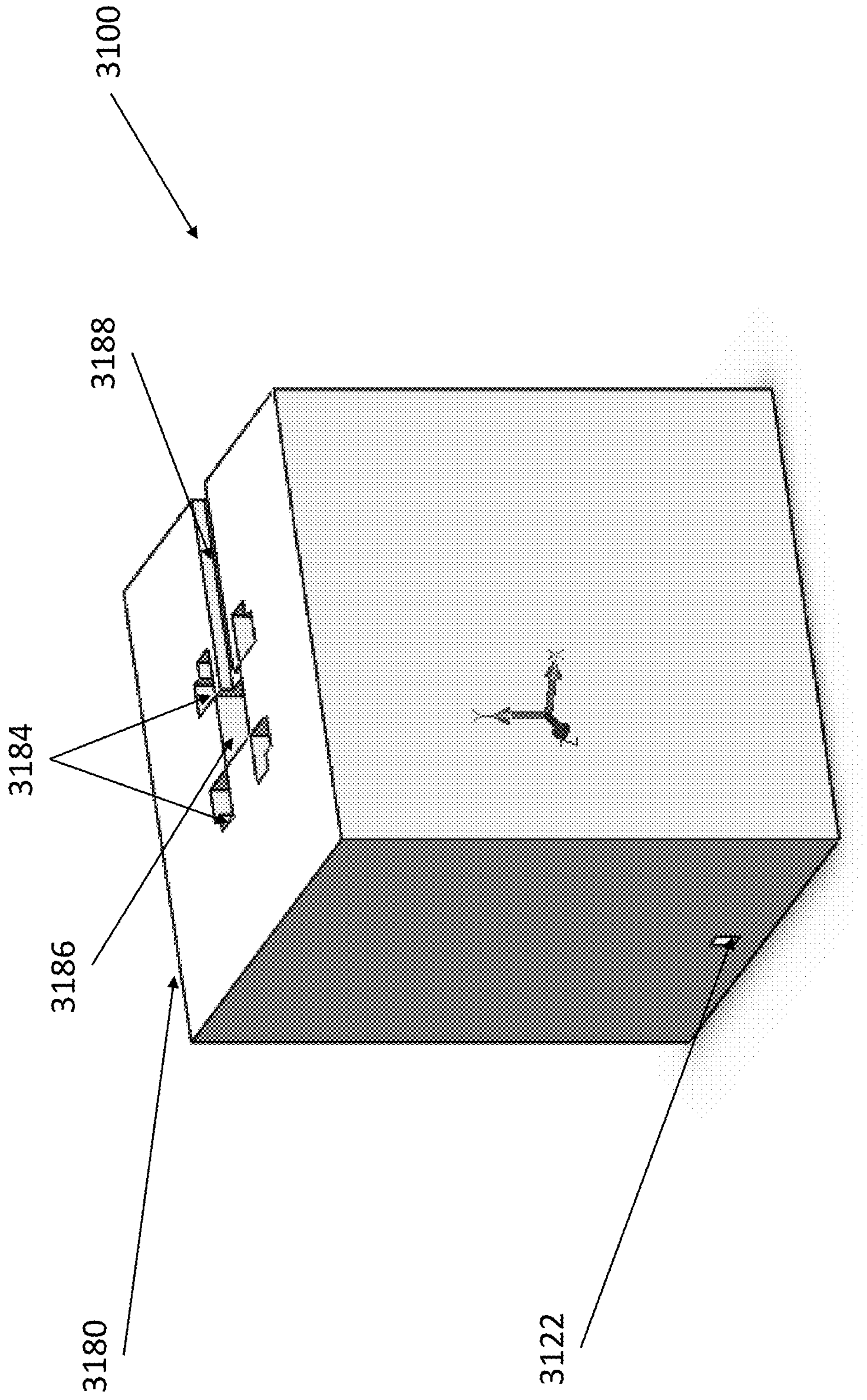
Figure 31J:
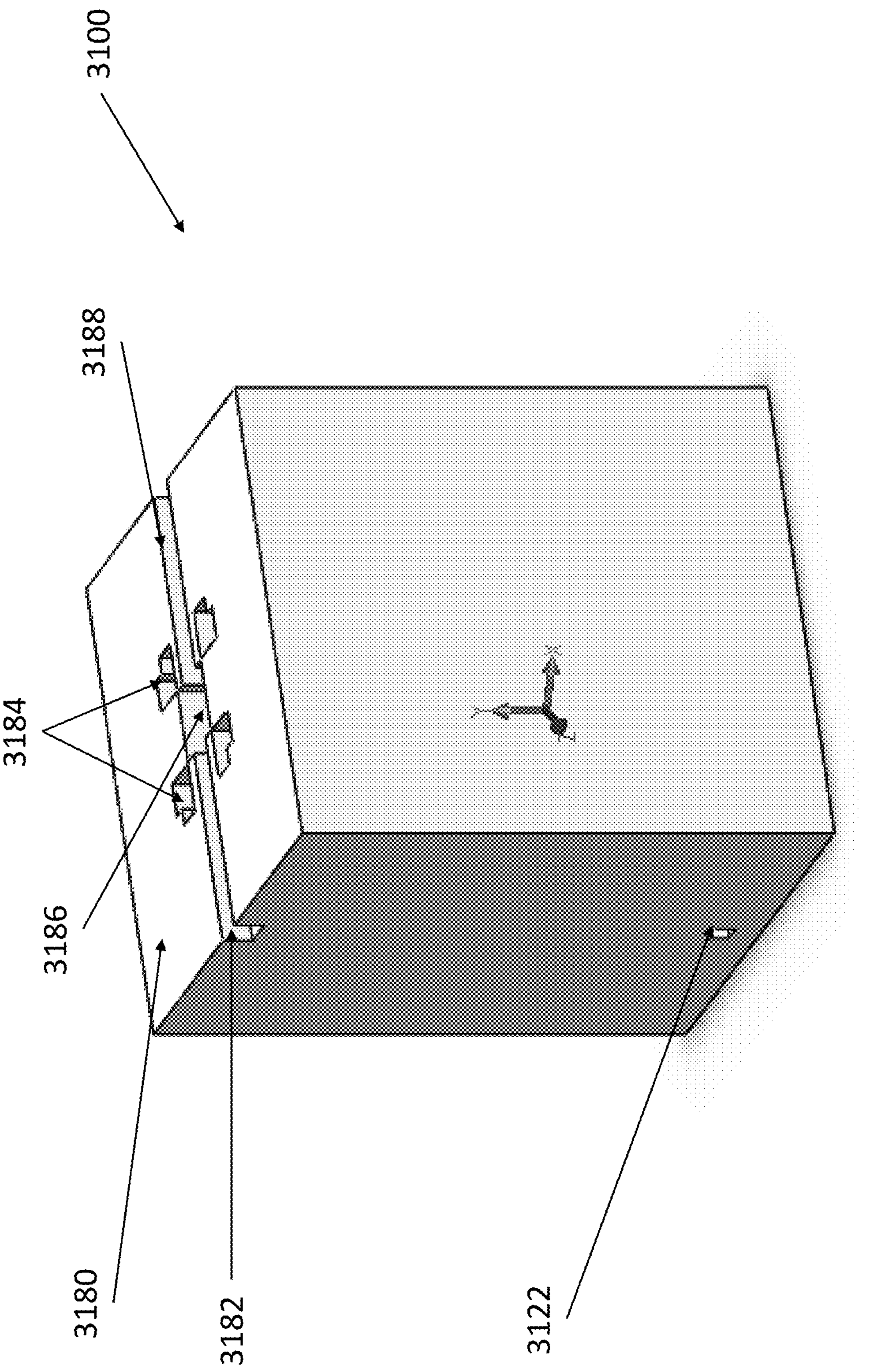

In other examples, FIG. 31G illustrates module 3170 formed over module 3160. For example, module 3170 may have an opening 3174 formed therein. In another example, FIG. 31H illustrates module 3180 formed over module 3170. In examples, module 3180 includes a plurality of openings 3184. For example, the openings 3184 may include several openings formed symmetrically around a central opening 3186. For example, the openings 3184 may include four openings 3184 formed around central opening 3186. FIG. 31I is another illustration of module 3180 where a ridge 3188 is formed on an upper portion of the module 3180. For example, the ridge 3188 may connect the central opening 3186 to a side of the module 3180. FIG. 31J is another illustration of module 3180, where an additional ridge 3182 is formed on an upper portion of the module 3180. For example, the ridge 3182 may connect the central opening 3186 to a side of the module 3180 that is opposite to the side where the ridge 3188 is formed. In various examples, the modular neutron reflector 3100 may be assembled as indicated in FIGS. 31A-31J via the assembly of a plurality of modules 3110-3180.

In various examples, the molten salt, or fuel salt, that is circulated in and out of the reaction chamber of a reactor according to the various examples may be or include a combination of 67 mol % NaCl and 33 mol % $UCl_3$, and the fuel salt combination may have a density at 650° C. of about 3226 $kg/m^3$. Other examples of fuel salts may be used herein such as, e.g., fluoride fuel salt and fluoride-chloride fuel salts. Examples of nuclear fuel salts include mixtures of one or more fissionable fuel salts such as $PuCl_3$, $UCl_4$, $UCl_3F$, $UCl_3$, $UCl_2F_2$, $ThCl_4$, and $UClF_3$, with one or more non-fissile salts such as NaCl, $MgCl_2$, $CaCl_2$, $BaCl_2$, KCl, $SrCl_2$, $VCl_3$, $CrCl_2$, $TiCl_4$, $ZrCl_4$, $ThCl_4$, $AcCl_3$, $NpCl_4$, $AmCl_3$, $LaCl_3$, $CeCl_3$, $PrCl_3$, and $NdCl_3$. For example, $PuCl_3$—NaCl, $UCl_3$—NaCl and $UCl_3$—$MgCl_2$ salts are contemplated.

Although the techniques introduced above and discussed in detail below may be implemented for a variety of molten nuclear fuels, the designs in this document will be described as using a molten fuel salt and, more particularly, a molten chloride salt of plutonium and sodium chlorides. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Before the low power, fast spectrum nuclear reactor designs and operational concepts are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the nuclear reactor only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

As used herein, two components may be referred to as being in "thermal communication" when energy in the form of heat may be transferred, directly or indirectly, between the two components. For example, a wall of container may be said to be in thermal communication with the material in contact with the wall. Likewise, two components may be referred to as in "fluid communication" if a fluid is transferred between the two components. For example, in a circuit where liquid is flowed from a compressor to an expander, the compressor and expander are in fluid communication. Thus, given a sealed container of heated liquid, the liquid may be considered to be in thermal communication (via the walls of the container) with the environment external to the container but the liquid is not in fluid communication with the environment because the liquid is not free to flow into the environment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

Notwithstanding the appended claims, the disclosure is also defined by the following clauses:

1. A nuclear reactor comprising:
   a vessel encompassing a reactor core, the reactor core configured to receive molten fuel and achieve criticality of the molten fuel via fission therein;
   an external loop line configured to circulate molten fuel therein, the external loop line being coupled to a bottom portion of the reactor core on one end thereof and to an upper portion of the nuclear reactor above the reactor core on another end thereof; and
   a pump configured to circulate the molten fuel through the reactor core and the external loop line.
2. The nuclear reactor of clause 1, wherein the vessel is configured so that heat generated by fission in the molten fuel transfers into an external environment around the nuclear reactor without generating power therein.
3. The nuclear reactor of clause 1, further comprising a neutron reflector encompassing the vessel, the neutron reflector comprising a plurality of modular portions coupled to each other.
4. The nuclear reactor of clause 3, wherein the neutron reflector comprises an upper reflector, a lower reflector, and a radial reflector.
5. The nuclear reactor of clause 1, wherein the pump is located on a fluid path of the external loop line.
6. The nuclear reactor of clause 1, wherein the pump is coupled to an upper portion of the vessel.
7. The nuclear reactor of clause 1, wherein the vessel comprises an irradiation tube.
8. The nuclear reactor of clause 1, further comprising an insulating floor supporting the reactor, and a floor supporting the insulating floor.
9. The nuclear reactor of clause 1, further comprising:
   a salt supply line coupled to the external loop line; and
   a fuel salt drain tank and a fuel salt flush tank coupled to the salt supply line;
   wherein the salt supply line is at a higher level than the vessel.
10. The nuclear reactor of clause 1, further comprising a first trace heat insulator covering a length of the external loop line, the first trace heat insulator being configured to insulate an outside of the length of the external loop line from heat of the molten fuel circulating therein.
11. The nuclear reactor of clause 10, wherein the first trace heat insulator has an inert gas circulating therein, the inert gas circulating outside of the external loop line.
12. The nuclear reactor of clause 11, wherein the inert gas comprises Argon.
13. The nuclear reactor of clause 10, further comprising a second trace heat insulator covering an outside surface of the vessel, the second trace heat insulator being configured to insulate an outside of the vessel from heat generated therein by the fission.
14. The nuclear reactor of clause 1, further comprising a support structure coupled to the vessel, the support structure being configured to provide structural stability to the nuclear reactor.
15. The nuclear reactor of clause 14, wherein the support structure has a symmetric polyhedral shape.
16. The nuclear reactor of clause 15, wherein the vessel is coupled to an apex of the symmetric polyhedral shape.
17. The nuclear reactor of clause 1, wherein the vessel comprises an irradiation tube configured to provide an access point of a sensing device into the reactor core.
18. The nuclear reactor of clause 1, wherein the external loop line extends outside of the vessel in two dimensions.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. For example, while the above reactor systems are shown as being general cylindrical in design with the reactor cores, radial reflectors, and reactor vessels being circular or annular in cross section, the cross section may be any shape including a circle, a square, a hexagon, a pentagon, an octagon, or any polygon. In addition, the shape or diameter of the cross section could change in difference locations of the reactor system. For example, a reactor core may be frustoconical in shape such as those described in U.S. Published Patent Application No. 2017/0216840, which application is incorporated herein by reference. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A nuclear reactor system comprising:
a vessel encompassing a reactor core, the reactor core configured to receive molten fuel and achieve criticality of the molten fuel via fission therein, the vessel comprising a vessel exterior surface;
an external loop line external to the vessel and comprising a loop line exterior surface, the external loop line being:
   configured to circulate molten fuel;
   fluidly coupled to a bottom portion of the vessel at a first end of the external loop line;
   fluidly coupled to an upper portion of the vessel above the reactor core at a second end of the external loop line; and
   configured to:
      receive the molten fuel from the vessel at the first end;
      allow the molten fuel to circulate through the external loop line; and
      allow the molten fuel to return to the vessel at the second end;
a pump configured to circulate the molten fuel through the reactor core and through the external loop line;
one or more heaters external to the vessel and configured to provide heat to at least a portion of the loop line external surface and at least a portion of the vessel exterior surface; and a neutron reflector encompassing the vessel exterior surface, wherein the neutron reflector is heated by the one or more heaters.

2. The nuclear reactor system of claim 1, wherein the vessel comprises one or more heat transfer elements on the vessel exterior surface, such that heat generated by fission in the molten fuel transfers into an external environment around the vessel.

3. The nuclear reactor system of claim 1, wherein the neutron reflector comprises a plurality of modular pieces coupled to each other.

4. The nuclear reactor system of claim 3, wherein the plurality of modular pieces comprise at least one upper reflector piece, at least one lower reflector piece, and at least one radial reflector piece.

5. The nuclear reactor system of claim 1, wherein the pump is located on a fluid path of the external loop line.

6. The nuclear reactor system of claim 1, wherein the pump is coupled to an upper portion of the vessel.

7. The nuclear reactor system of claim 1, wherein the vessel comprises an irradiation tube; the irradiation tube including:

an access end penetrating a first side of the vessel; and an opposite distal end fixed at an interior of the vessel at a second side of the vessel, wherein the irradiation tube is sealed from the molten fuel.

8. The nuclear reactor system of claim 7, further comprising a sensing device, wherein the irradiation tube is configured to provide an access point for the sensing device into the reactor core, wherein the sensing device does not contact the molten fuel.

9. The nuclear reactor system of claim 1, further comprising a floor insulation layer supporting the vessel, and a floor supporting the floor insulation layer, the vessel being thermally insulated from the floor by the floor insulation layer.

10. The nuclear reactor system of claim 1, further comprising:

a standpipe fluidly connected to the external loop line;

a salt supply line coupled at a first end to the standpipe;

a fuel salt drain tank and a fuel salt flush tank fluidly coupled to the salt supply line at a second end of the salt supply line; and a cover gas system connected to the vessel and positioned above the vessel, wherein a level of molten fuel within the standpipe is higher than a level of molten fuel at the cover gas system.

11. The nuclear reactor system of claim 1, further comprising insulation covering at least part of the one or more heaters, wherein:

the one or more heaters comprises a first heater, the first heater and the insulation cover a length of the external loop line; and the insulation comprises ceramic wool.

12. The nuclear reactor system of claim 11, wherein the first heater includes a heating jacket through which a heated fluid is circulated.

13. The nuclear reactor system of claim 11, wherein the first heater comprises an electrical heat trace system.

14. The nuclear reactor system of claim 11, wherein the one or more heaters comprises a second heater, the second heater being configured to provide heat to at least a portion of an outside surface of the vessel.

15. The nuclear reactor system of claim 1, further comprising a support structure coupled to the vessel, the support structure being configured to provide structural stability to the nuclear reactor system.

16. The nuclear reactor system of claim 15, wherein the support structure has a symmetric polyhedral shape.

17. The nuclear reactor system of claim 16, further comprising a pump coupled to an upper portion of the vessel, the pump having a pump housing, wherein the pump housing is coupled to the support structure.

* * * * *